United States Patent
Yoshihara et al.

(10) Patent No.: US 8,512,801 B2
(45) Date of Patent: Aug. 20, 2013

(54) ANTIREFLECTION FILM AND METHOD FOR MANUFACTURING THE SAME

(75) Inventors: Toshio Yoshihara, Okayama (JP); Tomoyuki Horio, Chiba (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 52 days.

(21) Appl. No.: 13/177,676

(22) Filed: Jul. 7, 2011

(65) Prior Publication Data

US 2011/0268875 A1   Nov. 3, 2011

Related U.S. Application Data

(62) Division of application No. 12/185,378, filed on Aug. 4, 2008, now abandoned.

(30) Foreign Application Priority Data

Aug. 2, 2007 (JP) .................................. 2007-202415
Aug. 1, 2008 (JP) .................................. 2008-199372

(51) Int. Cl.
B05D 5/06 (2006.01)

(52) U.S. Cl.
USPC .......................................... 427/164; 427/162

(58) Field of Classification Search
USPC .................................................. 427/162–169
See application file for complete search history.

(56) References Cited

U.S. PATENT DOCUMENTS

2006/0263607 A1* 11/2006 Izumi et al. .................. 428/412

FOREIGN PATENT DOCUMENTS

| JP | 2000-178469 A | 6/2000 |
| JP | 2003-147268 A | 5/2003 |
| JP | 2005-09778 A | 4/2005 |
| JP | 2007-69471 A | 3/2007 |

OTHER PUBLICATIONS

Office Action in corresponding Japanese Application No. 2008-199372 dated Jul. 31, 2012.

* cited by examiner

*Primary Examiner* — David Turocy
*Assistant Examiner* — Michael G Miller
(74) *Attorney, Agent, or Firm* — Sughrue Mion, PLLC

(57) ABSTRACT

There are provided an antireflection film for use primarily in displays such as LCDs, which exhibits both antifouling properties and mar-proofness, as well as a process for its production,
the antireflection film comprising at least one functional layer and a low refractive index layer laminated in that order on a transparent base material, wherein the at least one functional layer contains leveling agent A in contact with the low refractive index layer, the low refractive index layer containing in addition to leveling agent B, the leveling agent A that has migrated from the at least one functional layer, further wherein the migrated leveling agent A and leveling agent B are uniformly distributed at the surface of the low refractive index layer, and
the process for its production including: coating a functional layer-forming composition containing leveling agent A onto a transparent base material or a functional layer preformed thereover; half-curing it to form a functional layer in contact with the low refractive index layer; further coating the half-cured functional layer with a low refractive index layer-forming composition containing leveling agent B; and then completing the curing to form a low refractive index layer, whereby the leveling agent A migrates into the surface of the low refractive index layer, resulting in uniform distribution of the leveling agent A and leveling agent B at the surface of the low refractive index layer.

3 Claims, 6 Drawing Sheets

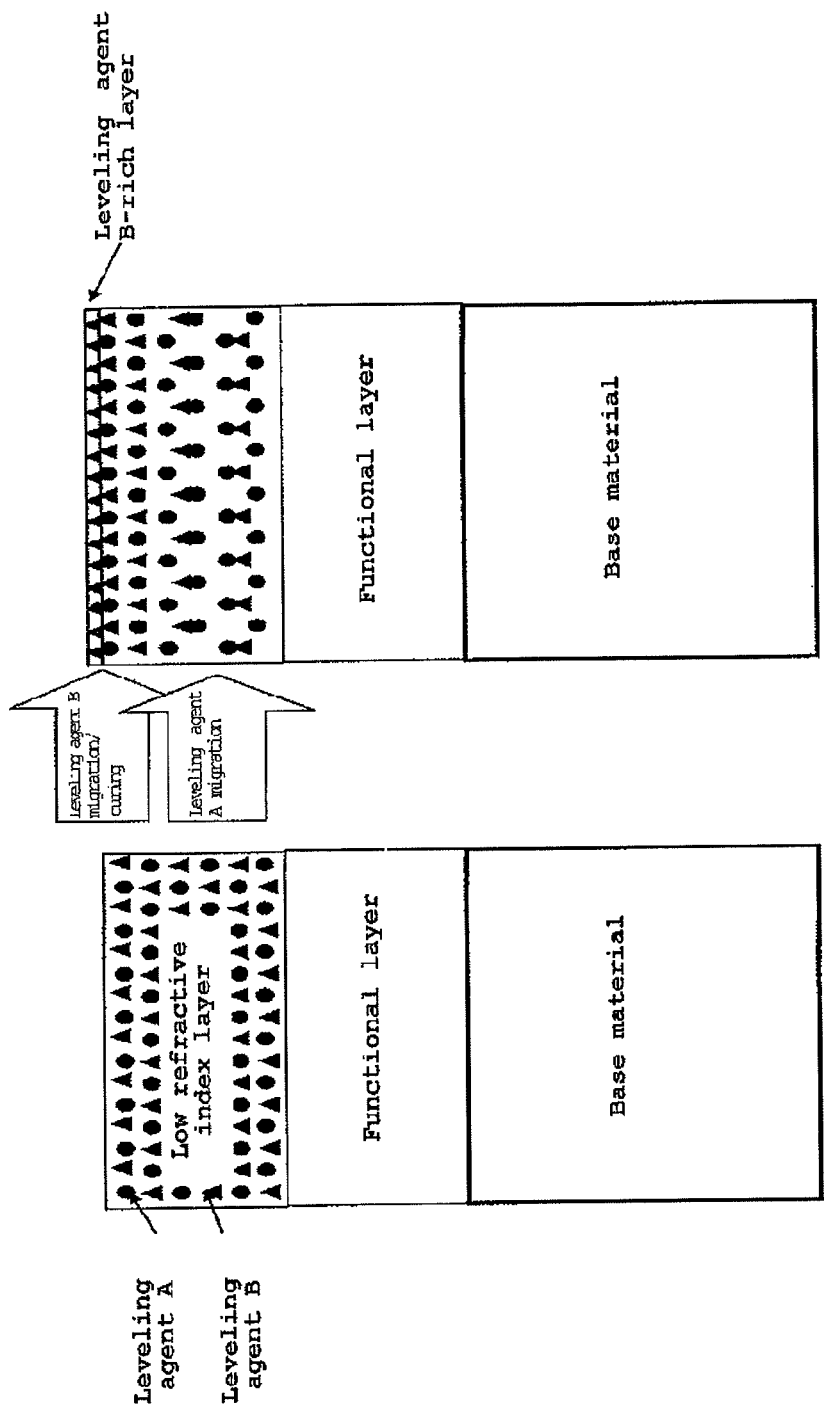

ANTIREFLECTION FILM AND METHOD FOR MANUFACTURING THE SAME

CROSS-REFERENCE TO RELATED APPLICATIONS

This is a Divisional application of U.S. Ser. No. 12/185,378 filed Aug. 4, 2008, which claims priority on Japanese Patent Application No. 2007-202415 filed on Aug. 2, 2007, and Japanese Patent Application No. 2008-199372 filed on Aug. 1, 2008, the disclosures of which are hereby incorporated by reference in its entirety.

BACKGROUND OF THE INVENTION

1. Field of the Invention

The present invention relates to an antireflection film mounted on the front sides of display devices (image display devices) such as liquid crystal displays (LCD), organic and inorganic electroluminescence displays (ELD), field emission displays (FED), cathode ray tube display devices (CRT) and plasma displays (PDP).

2. Related Background Art

In the displays mentioned above, it is required to reduce reflection of light rays irradiated from external light sources such as fluorescent lamps in order to increase the visibility of the display surfaces.

Antireflection films are already known that have a base material/hard coat layer/low refractive index layer structure as the basic layers.

When such an antireflection film is applied for a display surface to prevent damage to the display surface, the low refractive index layer surface of the antireflection film must also have antifouling properties, including fingerprint wiping. It is extremely important for such an antireflection film to have surface flatness on the hard coat layer, in order to avoid formation of film thickness variation in the anti-reflection layer that can cause color streaks and defects.

In an antireflection film having such a hard coat layer, often the surface of the hard coat layer is flattened (by leveling to create a smooth surface), and a silicon compound (silicon-based leveling agent) or fluorinated compound (fluorine-based leveling agent) is added to the hard coat layer-forming resin composition to impart an antifouling property, thus forming a hard coat layer. The silicon compound (silicon-based leveling agent) has the function of imparting to the layer surface slidability and antifouling properties against markers in addition to fingerprints, for improved mar-proofness. The fluorinated compound (fluorine-based leveling agent), on the other hand, has the function of providing the layer surface with improved antifouling properties including fingerprint wiping.

SUMMARY OF THE INVENTION

However, silicon compounds (silicon-based leveling agents) and fluorinated compounds (fluorine-based leveling agents) have very poor compatibility, and phase separation readily occurs.

Phase separation generates areas where the silicon compound (silicon-based leveling agent) is aggregated on the surface of the low refractive index layer and areas where the fluorinated compound (fluorine-based leveling agent) is aggregated (opaque areas) to render the surface opaque, which increase the haze of the antireflection film, thus leading to a problem of lowering the visibility of the display surface. It has, therefore, been impossible to combine sufficient amounts of fluorinated compounds with silicon compounds to impart antifouling properties.

Although the slidability of the surface is improved by addition of silicone oil to the low refractive index layer in Patent document 1, silicone has high affinity for fingerprints and thus has a drawback that fingerprints sticking to the surface cannot be wiped off. Patent document 2 proposes adding to the low refractive index layer, a fluorinated compound that forms a covalent bond with part of the binder component; but although fluorinated compounds are effective for improving fingerprint wiping, they have affinity for other types of fouling such as markers and thus has a drawback that marker ink attaching to the surface cannot be wiped off. Also, Patent document 3 teaches that adding silicone oil to a low refractive index layer comprising a monomer copolymer including vinylidene fluoride and hexafluoropropylene can impart mar-proofness and fingerprint wiping, but the soft nature of fluorine-containing binders prevents adequate mar-proofness from being obtained, while the compatibility with silicone is lower with higher molecular weights; therefore, haze increases and it is difficult to obtain a uniform film.

[Patent document 1] Japanese Unexamined Patent Publication No. 2003-147268
[Patent document 2] Japanese Unexamined Patent Publication No. 2005-99778
[Patent document 3] Japanese Unexamined Patent Publication No. 2000-178469

The present invention has been accomplished with the aim of solving the problems described above, and the main object of the invention is to provide an antireflection film obtained by combining two or more leveling agents (particularly, silicon-based leveling agent and fluorine-based leveling agent) to be included in the low refractive index layer, to maintain the haze of the low refractive index layer to a low level while providing the low refractive index layer on the antireflection film surface with excellent antifouling properties, fingerprint wiping and mar-proofness, as well as a process for its production.

As a result of much diligent research aimed at solving the aforementioned problems, the present inventors have completed this invention upon finding that if, instead of mixing two or more leveling agents, a leveling agent A having neither functional groups that react under ionizing radiation nor polar groups that react under heat is included in a functional layer-forming composition, a binder and a leveling agent B that is reactive with at least the binder are included in a low refractive index layer-forming composition, and the functional layer-forming composition is coated onto a transparent base material or a preformed functional layer, it is then half-cured to form a functional layer in contact with the low refractive index layer (different from the preformed functional layer), and further the low refractive index layer-forming composition is coated onto the half-cured functional layer and fully cured to form a low refractive index layer, the leveling agent A migrates into the surface of the low refractive index layer resulting in uniform distribution of the leveling agent A and the leveling agent B on the surface of the low refractive index layer, so that the leveling agents are uniformly distributed without aggregation or opacity, thus allowing the combined properties of leveling agents A and B to be adequately exhibited while maintaining low haze for the low refractive index layer.

Specifically, the features of the invention that solve the problems described above are the following two points.

The antireflection film of the invention is an antireflection film comprising at least one functional layer and a low refractive index layer laminated in that order on a transparent base material, characterized in that the at least one functional layer is in contact with the low refractive index layer and comprises a binder and a leveling agent A having neither functional groups that react under ionizing radiation nor polar groups that react under heat, and the low refractive index layer comprises, in addition to a binder and a leveling agent B that is crosslinked at least with the binder, the leveling agent A that has migrated from the at least one functional layer, and that the migrated leveling agent A and the leveling agent B are uniformly distributed on the surface of the low refractive index layer.

Throughout the present specification, the term "non-reactive" may be used to mean having neither functional groups that react with ionizing radiation nor polar groups that react with heat. Also throughout the present specification, the term "reactive" will be used to mean having functional groups that react with ionizing radiation or polar groups that react with heat.

The process for production of an antireflection film according to the invention is a process for production of an antireflection film comprising at least one functional layer and a low refractive index layer laminated in that order on a transparent base material, characterized by coating the transparent base material or a functional layer preformed thereover with a functional layer-forming composition comprising a leveling agent A having neither functional groups that react under ionizing radiation nor polar groups that react under heat, and a binder, and half-curing it to form a functional layer in contact with the low refractive index layer, and further coating the functional layer in half-cured state with a low refractive index layer-forming composition comprising a binder and a leveling agent B which is reactive at least with the binder, and then completing the curing to form the low refractive index layer.

The functional layer in contact with the low refractive index layer in the antireflection film of the invention may be a primer layer, antistatic layer, high refractive index layer, anti-glare layer or hard coat layer, or a layer that simultaneously exhibits these functions.

The leveling agent has the function of improving the flatness (smoothness) of the surface of the layer containing the leveling agent, and appropriate selection of the type of leveling agent will help impart the surface of the functional layer (for example, the aforementioned layer such as a hard coat layer) or low refractive index layer with slidability that can contribute to enhanced antifouling properties and mar-proofness. If the leveling agent in the low refractive index layer and hard coat layer is a type such as mentioned above, aggregation of two (or more) types of leveling agents in the low refractive index layer will be avoided, thus providing an effect of preventing transparency reduction due to layer opacity or haze increase.

Leveling agent A in the antireflection film of the invention is non-reactive, and it is preferably a non-reactive fluorine-based leveling agent. More preferably, it is a fluorinated compound with a fluorinated alkyl group represented by the formula $F(CF_2)_{2n}CH_2CH_2$— (where n is an integer of 1-10). Most preferably, the fluorinated alkyl group is a perfluoro group.

Leveling agent B in the antireflection film of the invention has reactivity at least for the binder in the low refractive index layer, and it is preferably a reactive silicon-based leveling agent. More preferably, it is a compound represented by the following chemical formula (1).

[Chemical Formula 1]

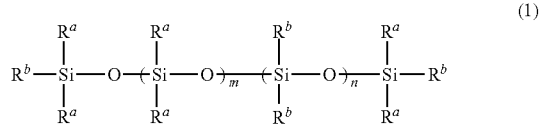

(wherein $R^a$ represents a $C_{1-20}$ alkyl group, $R^b$ represents a $C_{1-20}$ alkyl, $C_{1-3}$ alkoxy or polyether-modified group which is either unsubstituted or substituted with an amino, epoxy, carboxyl, hydroxyl, acryloyl and/or methacryloyl group, and each $R^a$ and $R^b$ may be the same or different; m represents an integer of 0-200; and n represents an integer of 0-200).

Most preferably, the leveling agent A in the antireflection film of the invention is a non-reactive fluorine-based leveling agent and the leveling agent B is a reactive silicon-based leveling agent. In this case, the fluorine-based leveling agent as leveling agent A will easily migrate from the functional layer in contact with the low refractive index layer, into the low refractive index layer, and the low refractive index layer will therefore contain the non-reactive fluorine-based leveling agent and the reactive silicon-based leveling agent, thus being imparted with an antifouling property, fingerprint wiping and mar-proofness.

The low refractive index layer in the antireflection film of the invention preferably further contains reactive hollow particles that are crosslinked with the binder in order to reduce the refractive index of the low refractive index layer. The low refractive index layer in the antireflection film of the invention preferably still further contains reactive solid particles that are crosslinked with at least the binder in order to improve the hardness of the low refractive index layer.

The hard coat layer in the antireflection film of the invention preferably further contains reactive inorganic fine particles that are crosslinked with at least the binder, preferably with solid particles as the reactive inorganic fine particles, in order to improve the hardness of the hard coat layer.

In the antireflection film according to the invention, preferably the film thickness of the functional layer is from 0.1 μm to 30 μm, and the leveling agent A is present at from 0.01 wt % to 5 wt % based on the total weight of the binder of the functional layer.

In the antireflection film according to the invention, preferably the film thickness of the low refractive index layer in the antireflection film according to the invention is from 0.05 μm to 0.15 μm, and the film thickness of the hard coat layer is from 5 μm to 30 μm, in order to obtain sufficient antireflection and mar-proofness.

Particularly, satisfactory antifouling properties can be obtained for the antireflection film of the invention if the water contact angle of the low refractive index layer surface is 95°-120°.

In the antireflection film according to the invention, a migration layer that is composed of the mingled functional layer (particularly hard coat layer) and low refractive index layer is preferably present at their boundary. If a migration layer is present, the component forming the low refractive index layer will infiltrate the region of the functional layer adjacent to the migration layer while the component forming the functional layer will infiltrate the region of the low refractive index layer adjacent to the migration layer, thus increasing the adhesiveness between the functional layer and the low refractive index layer.

For the process for production of an antireflection film according to the invention, the functional layer in contact with the low refractive index layer may be a primer layer, antistatic layer, high refractive index layer, anti-glare layer or hard coat layer, or a layer that simultaneously exhibits these functions.

In the process for production of an antireflection film according to the invention, the leveling agent A migrates to the surface of the low refractive index layer so that the leveling agent A and the leveling agent B are uniformly distributed on the surface of the low refractive index layer.

In the process for production of an antireflection film according to the invention, the leveling agent A is non-reactive, and it is preferably a non-reactive fluorine-based leveling agent. More preferably, it is a fluorinated compound with a fluorinated alkyl group represented by the formula $F(CF_2)_{2n}CH_2CH_2$— (where n is an integer of 1-10). Most preferably, the fluorinated alkyl group is a perfluoro group.

In the process for production of an antireflection film according to the invention, the leveling agent B has reactivity at least with the binder in the low refractive index layer, and it is preferably a reactive silicon-based leveling agent. More preferably, it is a compound represented by the following chemical formula (1).

[Chemical Formula 2]

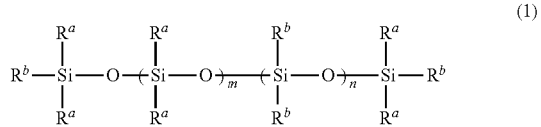

(1)

(wherein $R^a$ represents a $C_{1-20}$ alkyl group, $R^b$ represents a $C_{1-20}$ alkyl, $C_{1-3}$ alkoxy or polyether-modified group which is either unsubstituted or substituted with an amino, epoxy, carboxyl, hydroxyl, acryloyl and/or methacryloyl group, and each $R^a$ and $R^b$ may be the same or different; m represents an integer of 0-200; and n represents an integer of 0-200).

In the process for production of an antireflection film according to the invention, most preferably the leveling agent A is a non-reactive fluorine-based leveling agent and the leveling agent B is a reactive silicon-based leveling agent. In this case, the non-reactive fluorine-based leveling agent as leveling agent A will easily migrate from the functional layer in contact with the low refractive index layer, into the low refractive index layer, and the low refractive index layer will therefore contain the non-reactive fluorine-based leveling agent and the reactive silicon-based leveling agent, in particular having the non-reactive fluorine-based leveling agent and reactive silicon-based leveling agent uniformly distributed at its surface, and thus being imparted with antifouling properties, fingerprint wiping and mar-proofness.

In the process for production of an antireflection film according to the invention, the low refractive index layer-forming composition preferably further comprises reactive hollow particles that have crosslinking reactivity with at least the binder in order to reduce the refractive index of the low refractive index layer.

In the process for production of an antireflection film according to the invention, the low refractive index layer-forming composition preferably further comprises reactive solid particles that have crosslinking reactivity with at least the binder, in order to improve the hardness of the low refractive index layer.

For the process for production of an antireflection film according to the invention, in order to ensure that the leveling agent A and the leveling agent B are uniformly distributed at the surface of the low refractive index layer, it is preferred to form a migration cured layer (cured migration layer) at the interface between the low refractive index layer and the functional layer. The cured migration layer is effective for ensuring that the leveling agent A and the leveling agent B are uniformly distributed at the surface, thus imparting an antifouling property and mar-proofness to the surface of the low refractive index layer.

In the process for production of an antireflection film according to the invention, preferably the surfaces of the reactive hollow particle and the surfaces of the reactive solid particles are modified with crosslink-forming groups which comprise a bonding group for the particle surfaces, a spacer portion and an ionizing radiation curable group, and preferably the crosslink-forming groups of the reactive hollow particle surfaces and the crosslink-forming groups of the reactive solid particle surfaces either have the same structure or, even if they have differing structures, the structures are similar in that the ionizing radiation curable groups have the same backbone and differ only in the presence or absence of one $C_{1-3}$ hydrocarbon group, the bonding groups for the particle surfaces have the same backbone and differ only in the presence or absence of one $C_{1-3}$ hydrocarbon group, and the spacer portions have the same backbone and differ only in the presence or absence of one $C_{1-3}$ hydrocarbon group or one functional group with 1-3 constituting atoms including heteroatoms and excluding hydrogen, or differ only in 1-2 carbons for the carbon chain length of the backbone, so that the hollow particles and solid particles will be uniformly dispersed and the mar-proofness of the low refractive index layer will be improved.

In the process for production of an antireflection film according to the invention, the hard coat layer-forming composition preferably further comprises reactive inorganic fine particles that have crosslinking reactivity with at least the binder, preferably with reactive solid particles as the reactive inorganic fine particles in order to improve the hardness of the hard coat layer.

Effect of the Invention

The antireflection film of the invention has excellent antifouling properties, excellent fingerprint wiping and excellent mar-proofness on the surface of the low refractive index layer.

DESCRIPTION OF THE PREFERRED EMBODIMENTS

The antireflection film of the invention is an antireflection film comprising at least one functional layer and a low refractive index layer laminated in that order on a transparent base material,
characterized in that
the at least one functional layer is in contact with the low refractive index layer and comprises a binder and a leveling agent A having neither functional groups that react under ionizing radiation nor polar groups that react under heat, and
the low refractive index layer comprises, in addition to a binder and a leveling agent B that is crosslinked at least with the binder, the leveling agent A that has migrated from the at least one functional layer, and the migrated leveling agent A and the leveling agent B are uniformly distributed on the surface of the low refractive index layer.

The process for production of an antireflection film according to the invention is a process for production of an antireflection film comprising at least one functional layer and a low refractive index layer laminated in that order on a transparent base material, characterized by coating the transparent base material or a preformed functional layer with a functional layer-forming composition comprising a leveling agent A having neither functional groups that react under ionizing radiation nor polar groups that react under heat, and a binder, and half-curing it to form a functional layer in contact with the low refractive index layer, and further coating the half-cured functional layer with a low refractive index layer-forming composition comprising a binder and a leveling agent B which is reactive at least with the binder, and then completing the curing to form a low refractive index layer.

The term "functional layer" for the purpose of the invention means a layer with some function, that when laminated on a transparent base material produces an optical laminate that is more satisfactory than the base material itself. As examples of functional layers, there may be mentioned hard coat layers that impart hardness to base materials, primer layers that improve the adhesiveness between low refractive index layers and base materials, antistatic layers that impart antistatic performance and high refractive index layers that improve anti-reflection properties, as well as antistatic high refractive index layers, high-refractive-index hard coat layers, antistatic hard coat layers, and antistatic high-refractive-index hard coat layers, that exhibit combined performance, either as monolayers or multilayers.

The preferred film thickness of the functional layer is from 0.1 μm to 30 μm, and in that film thickness range, the concentration of leveling agent A that allows optimum migration is from 0.01 wt % to 5 wt % based on the total weight of the binder component of the functional layer. A concentration of greater than 0.01 wt % will allow migration to the low refractive index layer surface so that the desired antifouling performance is exhibited, but a concentration of greater than 5 wt % will result in excessive migration, causing increased haze and opacity.

The term "binder" for the purpose of the invention means a compound that comprises as an essential component, a polymerizable compound such as a monomer or oligomer with a functional group that reacts under ionizing radiation or a polar group that reacts under heat, with inclusion of a non-polymerizable polymer or polymerization initiator if necessary, and which after curing forms a matrix for the functional layer or low refractive index layer.

The term "uniformly distributed" for the purpose of the invention means that two or more leveling agents are present on the surface of the layer at a level that, despite some aggregation of similar leveling agents, does not produce phase separation between different leveling agents, and without causing opacity or haze. According to the invention, the leveling agent A and the leveling agent B are most satisfactorily in an uniformly distributed state on the surface of the low refractive index layer. Specifically, this means that leveling agents A and B are in a state of essentially homogeneous admixture, or in a state that each leveling agent, even if areas of aggregation are present, is mixed at a level that does not produce opacity in the low refractive index layer.

According to the invention, the term "half-cured" refers to a state in which some of the curable groups of the curable resin in the binder remain without being cured, so that the curing is incomplete. In this state, the solvent of the coating composition (coating solution) penetrates more easily and the resin components of the hard coat layer and low refractive index layer migrate through the half-cured migration layer (the boundary between the hard coat layer and the low refractive index layer) into the other layer, particularly with migration into the low refractive index layer by the leveling agent A that is non-reactive with the binder and has migrated into the low refractive index layer of the hard coat layer.

The leveling agent used in the invention has the function of improving the flatness (smoothness) of the surface of the layer containing said leveling agent, and appropriate selection of the type of leveling agent will help impart the surface of the hard coat layer or low refractive index layer with slidability that can contribute to enhanced antifouling properties and mar-proofness. If the leveling agent in the low refractive index layer and hard coat layer is a type such as the one mentioned above, aggregation and phase separation of different leveling agents in the low refractive index layer will be avoided, thus providing an effect of preventing transparency reduction due to layer opacity or haze increase.

Normally, the leveling agents will undergo phase separation if two (or more) different types of leveling agents are simply included in the hard coat layer-forming composition and low refractive index layer-forming composition and mixed in the composition before coating, or the final necessary function (antifouling property, fingerprint wiping, mar-proofness) may not be obtained, but migration of one of the leveling agents through a half-cured state allows the two different leveling agents (leveling agent A and leveling agent B) in the low refractive index layer to be evenly dispersed without phase separation and opacity, and particularly to be uniformly distributed on the surface of the low refractive index layer. While the reason for this is not fully understood, it is believed that when two or more different leveling agents are normally used in combination, each leveling agent is in the state of capable of moving (migrating) freely and similar leveling agents aggregate from the evenly dispersed state and produce phase separation, but by being in a half-curing state, the leveling agent B that has reactivity at least with the binder in the low refractive index layer-forming composition undergoes crosslinking reaction with the binder or leveling agent in the curing or cured low refractive index layer, thus impeding its movement (migration), while the leveling agent A moves (migrates) from the half-cured hard coat layer toward the surface of the low refractive index layer through the gaps, allowing it to be uniformly distributed on the surface.

A preferred construction for the antireflection film of the invention may be the basic structure of base material/hard coat layer/low refractive index layer, but the antireflection film may also be formed with monolayers or multilayer lamination with various functional layers in different orders between the base material and the low refractive index layer, such as:

base material/primer layer/hard coat layer/low refractive index layer base material/hard coat layer/high refractive index layer/low refractive index layer, base material/antistatic layer/hard coat layer/low refractive index layer, base material/hard coat layer/antistatic layer/low refractive index layer, base material/hard coat layer 1/hard coat layer 2/low refractive index layer, and such laminates with different structures are also within the scope of the invention. The basic construction of base material/hard coat layer/low refractive index layer will be described for convenience for the detailed explanation of the invention.

FIG. 1 is a schematic diagram showing a cross-sectional view of an embodiment of the basic construction of an antireflection film according to the invention. For convenience, the cross-sectional view in FIG. 1 shows the thickness direction (vertical direction in the drawing) magnified over the dimension in the direction of the plane (horizontal direction in the drawing). The antireflection film 1 shown in FIG. 1 has a hard coat layer 20 and a low refractive index layer 30 adjacent to the hard coat layer, formed on one side of a transparent base material 10, in that order nearer from the transparent base material. A migration layer 40 that has resulted from the hard coat layer 20 and the low refractive index layer 30 mingled with each other will usually be situated between them.

The transparent base material, hard coat layer, low refractive index layer and migration layer forming the antireflection film of the invention will now be explained in order.

<1. Transparent Base Material>

The materials of the transparent base material are not particularly restricted, and any ordinary materials conventionally used for antireflection films may be employed, and materials composed principally of cellulose acetate, cycloolefin polymer, acrylate-based polymer, or polyesters are preferable, for example. Here, "composed principally of" means that the component has the highest content among the constituent components of the base material.

As specific examples of cellulose acylates, there may be mentioned cellulose triacetate, cellulose diacetate and cellulose acetate butyrate. As examples of cycloolefin polymers, there may be mentioned norbornane-based copolymers, monocyclic olefin-based copolymers, cyclic conjugated diene-based polymers, vinylalicyclic hydrocarbon-based copolymer resins and the like. More specifically, there may be mentioned ZEONEX or ZEONOR (norbornane-based resin) by Zeon Corp., SUMILITE FS-1700 by Sumitomo Bakelite Co., Ltd., ARTON (modified norbornane-based resin) by JSR Corp., APEL (cyclic olefin copolymer) by Mitsui Chemicals, Inc., Topas (cyclic olefin copolymer) by Ticona and the OPTOREZ OZ-1000 series (alicyclic acrylic resins) by Hitachi Chemical Co., Ltd. As specific examples of acrylate-based polymers, there may be mentioned polymethyl(meth)acrylate, polyethyl(meth)acrylate, methyl(meth)acrylate, butyl(meth)acrylate copolymer and the like. As specific examples of polyesters, there may be mentioned polyethylene terephthalate and polyethylene naphthalate.

The term "(meth)acryloyl" used throughout the present specification refers to acryloyl and/or methacryloyl, the term "(meth)acrylate" refers to acrylate and/or methacrylate, and "(meth)acryl" refers to acryl and/or methacryl. The term "light" used throughout the present specification refers not only to visible light and electromagnetic waves with wavelengths in the non-visible light range, but also particle beams such as electron beams and radiation or ionizing radiation that include electromagnetic waves and particle beams.

When the transparent base material is used as a thin, highly flexible film for the invention, the thickness will normally be from 20 µm to 300 µm, and preferably from 30 µm to 200 µm. During formation of the hard coat layer on the transparent base material, the transparent base material may be subjected to physical treatment such as corona discharge treatment or oxidation treatment, or coating with a coating agent such as an anchoring agent or primer, in order to improve the adhesive property.

<2. Hard Coat Layer>

The hard coat layer used in the invention is a layer that imparts hardness to the antireflection film of the invention. The hard coat layer comprises a cured product of a hard coat layer-forming composition containing, as essential components, a curable binder containing at least a curable resin, and at least one type of non-reactive leveling agent (leveling agent A). The hard coat layer preferably contains inorganic fine particles in order to impart mar-proofness to the hard coat layer, and the inorganic fine particles are preferably reactive inorganic fine particles with reactive functional groups that are capable of crosslinking with at least the binder (matrix), as the curable resin that forms the hard coat layer. The curable resin of the hard coat layer, therefore, preferably is a curable resin (binder component) with reactive functional groups capable of crosslinking with the reactive functional groups of the reactive inorganic fine particles. The formation of the cured product by crosslinking between the reactive inorganic fine particles and the curable resin can further improve the mar-proofness of the hard coat layer.

As a preferred embodiment of the hard coat layer of the invention, there will now be described a hard coat layer-forming composition comprising components that include reactive inorganic fine particles A containing a reactive functional group (a) and the binder C that imparts adhesiveness to the base material and adjacent layers, and at least one type of non-reactive leveling agent A.

A "hard coat layer" is, generally, a layer that exhibits a hardness of at least "H" in a pencil hardness test according to JISK5600-5-4 (1999), but a hard coat layer used in the invention preferably has a hard coat layer surface hardness of at least "3H" in a pencil hardness test.

The film thickness of the hard coat layer is preferably from 5 µm to 30 µm from the viewpoint of mar-proofness.

The construciton materials of the hard coat layer of the invention will now be described.

<2-1. Reactive Inorganic Fine Particles A>

Inorganic fine particles are commonly included in hard coat layers to maintain transparency while improving mar-proofness. The inorganic fine particles with crosslinking reactivity undergo crosslinking reaction with the curable binder to form a crosslinked structure, to further improve the hard coat properties. The reactive inorganic fine particles A are inorganic fine particles having an organic component covering at least part of the surfaces of the inorganic fine particles serving as the core, and having reactive functional groups on the surfaces introduced by the aforementioned organic component. The reactive inorganic fine particles A include those having two or more inorganic fine particles as the core per particle. The reactive inorganic fine particles A may be reduced in particle size to increase the points of crosslinking in the matrix, with respect to their contents.

In order to notably improve the hardness for adequate mar-proofness of the hard coat layer of the invention, it preferably contains reactive inorganic fine particles A having an organic component covering at least part of the surface and having reactive functional groups (a) introduced by the organic component. The reactive inorganic fine particles A may also impart a function to the hard coat layer, and may be appropriately selected according to the purpose.

As examples of inorganic fine particles, there may be mentioned metal oxide fine particles such as silica, aluminum oxide, zirconia, titania, zinc oxide, germanium oxide, indium oxide, tin oxide, indium tin oxide, (ITO), antimony oxide or cerium oxide, and metal fluoride fine particles such as magnesium fluoride or sodium fluoride. There may also be used metal fine particles, metal sulfide fine particles or metal nitride fine particles.

Silica and aluminum oxide are preferred from the viewpoint of achieving high hardness. In order to achieve a relatively high refractive index layer for the hard coat layer relative to the adjacent low refractive index layer, fine particles such as zirconia, titania or antimony oxide may be appropriately selected to increase the refractive index during film formation. When it is desired to impart antistatic or conductive properties, indium tin oxide (ITO), tin oxide or the like may be appropriately selected for use. These may be used either alone or in combinations of two or more.

The surfaces of the inorganic fine particles normally have groups that cannot exist in that form inside the inorganic fine particles. These surface groups usually are relatively reactive functional groups. For example, in the case of a metal oxide they will be hydroxyl and oxy groups; in the case of a metal sulfide they will be thiol and thio groups; and in the case of a nitride they will be amino group, amide and imide groups.

The reactive inorganic fine particles A according to the invention are preferably solid particles without voids or a porous structure in the particle interiors, rather than particles with voids or a porous structure in the particle interiors, such as hollow particles. Hollow particles have voids or a porous composition in the particle interiors, and therefore exhibit lower hardness than solid particles. Consequently, the reactive inorganic fine particles A preferably employ solid particles that have high hardness.

The reactive inorganic fine particles A used in the invention have an organic component covering at least part of the surfaces, and have reactive functional groups on the surfaces introduced by the aforementioned organic component. Here, the organic component is a carbon-containing component. Modes wherein the organic component covers at least part of the surfaces include a mode in which a compound containing an organic component such as a silane coupling agent is reacted with the hydroxyl groups present on the surfaces of metal oxide fine particles, bonding the organic component to part of the surfaces, a mode in which an organic component is attached to the hydroxyl groups on the surfaces of metal oxide fine particles by interaction such as hydrogen bonding, and a mode in which one or more inorganic fine particles are included in the polymer particles.

The covering organic component inhibits aggregation between the inorganic fine particles and increases the number of reactive functional groups introduced to the inorganic fine particle surfaces, thus improving the film hardness, and therefore, they preferably cover essentially the entirety of the particle surfaces. From this viewpoint, the organic component covering the inorganic fine particles is preferably included to the reactive inorganic fine particles A to at greater than $1.00 \times 10^{-3}$ g/m². For the mode where the organic component is attached or bonded to the inorganic fine particle surfaces, the organic component covering the inorganic fine particles is more preferably included in the reactive inorganic fine particles A at greater than $2.00 \times 10^{-3}$ g/m² and even more preferably it is included in the reactive inorganic fine particles A at greater than $3.50 \times 10^{-3}$ g/m². For the mode where inorganic fine particles are included in the polymer particles, the organic component covering the inorganic fine particles is more preferably is included in the reactive inorganic fine particles A at greater than $3.50 \times 10^{-3}$ g/m², and even more preferably it is included in the reactive inorganic fine particles A at greater than $5.50 \times 10^{-3}$ g/m².

Normally, the proportion of the covering organic component can be determined, for example, by thermogravimetric analysis in air from room temperature to usually 800° C., as the constant mass value of weight reduction when the dry powder has undergone complete combustion in air.

The amount of organic component per unit area is determined by the following method. First, using differential thermogravimetry (DTG), the organic component weight is measured and divided by the inorganic component weight (organic component weight/inorganic component weight). Next, the volume of the entire inorganic component is calculated from the inorganic component weight and the specific gravity of the inorganic fine particles used. Assuming that the inorganic fine particles are spherical before covering, the volume and surface area per inorganic fine particle before covering are calculated from the mean particle size of the inorganic fine particles before covering. The volume of the entire inorganic component is then divided by the volume per inorganic fine particle before covering, to determine the number of reactive inorganic fine particles A. Further, dividing the organic component weight by the number of reactive inorganic fine particles A gives the amount of organic component per reactive inorganic fine particle A. Finally, the organic component weight per reactive inorganic fine particle A is divided by the surface area per inorganic fine particle before covering, to determine the amount of organic component per unit area.

From the viewpoint of improving hardness, the mean particle size of the reactive inorganic fine particles A is from 3 nm to 100 nm, preferably from 5 nm to 80 nm and even more preferably from 10 nm to 70 nm. From the viewpoint of improving hardness while maintaining the recovery for the resin alone without impairing transparency, the inorganic fine particles preferably have a narrow particle size distribution and are monodispersed.

For the hard coat layer of the invention, the mean particle size is the 50% particle size (d50: median diameter), where the particles in the solution are measured by the dynamic light scattering method and the particle size distribution is expressed as cumulative distribution. The mean particle size can be measured using a Microtrac particle size analyzer by Nikkiso Co., Ltd.

The fine particles according to the invention may be aggregated particles, and when they are aggregated particles, the secondary particle size must be within the specified range.

As a method for preparing the reactive inorganic fine particles A having an organic component covering at least part of their surfaces and having reactive functional groups on the surfaces introduced by the aforementioned organic component, there may be used any conventional method appropriately selected depending on the reactive functional group (a) that is to be introduced into the inorganic fine particles.

Particularly according to the invention, the covering organic component can be included in the reactive inorganic fine particles A in an amount of greater than $1.00 \times 10^{-3}$ g/m² unit area of the inorganic fine particles before covering, and from the viewpoint of inhibiting aggregation of the inorganic fine particles and improving the film hardness, it is preferred to select one of the following types of inorganic fine particles (i) (ii) and (iii) as appropriate.

(i) Inorganic fine particles having reactive functional groups on their surfaces, obtained by dispersing inorganic fine particles in water and/or an organic solvent as the dispersing medium, in the presence of one or more surface-modifying compounds with a molecular weight of less than 500, selected from the group consisting of saturated or unsaturated carboxylic acids, acid anhydrides, acid chlorides, esters or acid amides corresponding to the carboxylic acids, amino acids, imines, nitriles, isonitriles, epoxy compounds, amines, β-dicarbonyl compounds, silanes and functional group-containing metal compounds.

(ii) Inorganic fine particles having reactive functional groups on their surfaces, obtained by discharging a monomer comprising inorganic fine particles with particle sizes of from 3 nm to 100 nm dispersed in a hydrophobic vinyl monomer, into water through a hydrophilized porous membrane, to form an aqueous dispersion of inorganic fine particle-dispersed monomer droplets, and then polymerizing the dispersion.

(iii) Inorganic fine particles having reactive functional groups on their surfaces, obtained by bonding metal oxide fine particles with a compound containing the reactive functional group introduced into the inorganic fine particles before covering, a group represented by chemical formula (2) below and a silanol group or a group that produces a silanol group upon hydrolysis.

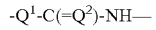 Chemical Formula (2)

(In chemical formula (2), $Q^1$ represents NH, O (oxygen atom) or S (sulfur atom), and $Q^2$ represents O or S).

Reactive inorganic fine particles A suitable for use according to the invention will now be described.

(i) Inorganic fine particles having reactive functional groups on their surfaces, obtained by dispersing inorganic fine particles in water and/or an organic solvent as the dispersing medium, in the presence of one or more surface-modifying compounds with a molecular weight of less than 500, selected from the group consisting of saturated or unsaturated carboxylic acids, acid anhydrides, acid chlorides, esters or acid amides corresponding to the carboxylic acids, amino acids, imines, nitriles, isonitriles, epoxy compounds, amines, β-dicarbonyl compounds, silanes and functional group-containing metal compounds.

Using reactive inorganic fine particles A of (i) above is advantageous in that the film hardness can be improved without lowering the organic component content.

The surface-modifying compound used for the reactive inorganic fine particles A of (i) above has a functional group that can chemically bond with a group on the surfaces of the inorganic fine particles under dispersion conditions, such as a carboxyl group, acid anhydride group, acid chloride group, acid amid group, ester, imino, nitrile, isonitrile, hydroxyl, thiol or epoxy group, primary, secondary or tertiary amino group, Si—OH group or silane hydrolyzable residue, or a C—H acid group such as a β-dicarbonyl compound. Here, the chemical bonding may, preferably, be a covalent bonding, ionic bonding or coordination bonding, or even hydrogen bonding. Coordination bonding may be in the formation of a complex. For example, Bronsted or Lewis acid-base material reaction, complex formation or esterification occurs between the functional groups of the surface-modifying compound and the groups on the inorganic fine particle surfaces. Surface-modifying compounds used for the reactive inorganic fine particles A of (i) above may be used alone or in combinations of two or more.

In addition to the at least one functional groups (hereinafter referred to as "first functional group") that can participate in chemical bonding with groups on the surfaces of the inorganic fine particles, the surface-modifying compound will also generally have molecular residues that can impart new properties to the inorganic fine particles after bonding to the surface-modifying compound via the functional groups. The molecular residues, or a portion of them, may be hydrophobic or hydrophilic and may serve for stabilization, compatibilization or activation of the inorganic fine particles, for example.

As examples of hydrophobic molecular residues, there may be mentioned alkyl, aryl, alkallyl, aralkyl and fluorine-containing alkyl groups that can produce inactivation or repulsion. As hydrophilic groups, there may be mentioned hydroxy, alkoxy and polyester groups.

The surface-introduced reactive functional group (a) that allows the reactive inorganic fine particles A to react with the binder C described hereunder is appropriately selected depending on the binder C. The reactive functional group (a) may be desirably a polymerizable unsaturated group for use, and preferably it is a photocuring unsaturated group and more preferably an ionizing radiation-curing unsaturated group. As specific examples, there may be mentioned ethylenic double bond-containing groups such as (meth)acryloyl, vinyl and allyl, and epoxy groups.

When the molecular residue of the surface-modifying compound contains the reactive functional group (a) that can react with the binder C, the first functional group in the surface-modifying compound can be reacted with the inorganic fine particle surfaces to introduce the reactive functional group (a) that can react with the binder C onto the surfaces of the reactive inorganic fine particles A of (i) above. For example, surface-modifying compounds with polymerizable unsaturated groups may be mentioned as suitable groups in addition to the first functional group.

Alternatively, the reactive functional group (a) that can react with the binder C may be introduced onto the surfaces of the reactive inorganic fine particles A of (i) above by including a second reactive functional group in the molecular residues of the surface-modifying compound and using the second reactive functional group as a scaffold. For example, preferably a group that can undergo hydrogen bonding (hydrogen bond-forming group) such as a hydroxyl or oxy group may be introduced as the second reactive functional group and the hydrogen bond-forming group of another surface-modifying compound reacted with the hydrogen bond-forming group introduced onto the fine particle surfaces, to introduce the reactive functional group (a) that can react with the binder C. That is, a preferred example of the surface-modifying compound is a compound with a hydrogen bond-forming group used in combination with the reactive functional group (a) that can react with the binder C, such as a polymerizable unsaturated group, and a compound with a hydrogen bond-forming group. As specific examples of hydrogen bond-forming groups, there may be mentioned functional groups such as hydroxyl, carboxyl, epoxy, glycidyl and amide groups, or amide bonds. An amide bond is one containing —NHC(O) or >NC(O)— in the bonding unit. Preferred among these for the hydrogen bond-forming group used in the surface-modifying compound of the invention are carboxyl, hydroxyl and amide groups.

The surface-modifying compound used in the reactive inorganic fine particles A of (i) above has a molecular weight of less than 500, more preferably less than 400 and especially not exceeding 200. By using such a low molecular weight, it is possible to rapidly occupy the fine particle surfaces and prevent aggregation between the inorganic fine particles.

The surface-modifying compound used in the reactive inorganic fine particles A of (i) above is preferably a liquid under the reaction conditions used to modify the surfaces, and is preferably soluble or at least emulsifiable in a dispersing medium. More preferably, it is soluble in the dispersing medium and uniformly distributed as dissociated molecules or molecular ions in the dispersing medium.

As saturated or unsaturated carboxylic acids, there may be mentioned those with 1-24 carbon atoms, such as formic acid, acetic acid, propionic acid, butyric acid, valeric acid, caproic acid, acrylic acid, methacrylic acid, crotonic acid, citric acid, adipic acid, succinic acid, glutaric acid, oxalic acid, maleic acid, fumaric acid, itaconic acid and stearic acid, as well as their corresponding acid anhydrides, chlorides, esters and amides, and caprolactam may be mentioned as an example. Using an unsaturated carboxylic acid allows introduction of a polymerizable unsaturated group.

Preferred amines are those having the chemical formula $Q_{3-n}NH_n$ (n=0, 1 or 2), where each residue Q independently represents alkyl with 1-12, especially 1-6 and preferably 1-4 carbon atoms (for example, methyl, ethyl, n-propyl, i-propyl or butyl) or aryl, alkallyl or aralkyl with 6-24 carbon atoms (for example, phenyl, naphthyl, tolyl or benzyl). Polyalkyleneamines may be mentioned as examples of preferred amines, and specifically methylamine, dimethylamine, trimethylamine, ethylamine, aniline, N-methylaniline, diphenylamine, triphenylamine, toluidine, ethylenediamine and diethylenetriamine.

Preferred β-dicarbonyl compounds have 4-12 and especially 5-8 carbon atoms, and as examples there may be mentioned diketones (acetylacetone and the like), 2,3-hexanedione, 3,5-heptanedione, acetoacetic acid, acetoacetic acid-$C_1$-$C_4$-alkyl esters (ethyl acetoacetate ester and the like), diacetyl and acetonylacetone.

As examples of amino acids, there may be mentioned β-alanine, glycine, valine, aminocaproic acid, leucine and isoleucine.

Preferred silanes are hydrolyzable organosilanes with at least one hydrolyzable group or hydroxy group and at least one non-hydrolyzable residue. As examples of hydrolyzable groups, there may be mentioned halogen, alkoxy and acyloxy groups. As non-hydrolyzable residues, there may be used non-hydrolyzable residues with a reactive functional group (a) and/or without a reactive functional group (a). A silane partially containing at least a fluorine-substituted organic residue may also be used.

There are no particular restrictions on the silane used, and as examples there may be mentioned $CH_2$=$CHSi(OOCCH_3)_3$, $CH_2$=$CHSiCl_3$, $CH_2$=$CHSi(OC_2H_5)_3$, $CH_2$=$CH$—$Si(OC_2H_4OCH_3)_3$, $CH_2$=$CH$—$CH_2$—$Si(OC_2H_5)_3$, $CH_2$=$CH$—$CH_2$—$Si(OOCCH_3)_3$, γ-glycidyloxypropyltrimethoxysilane (GPTS), γ-glycidyloxypropyldimethylchlorosilane, 3-aminopropyltrimethoxysilane (APTS), 3-aminopropyltriethoxysilane (APTES), N-(2-aminoethyl)-3-aminopropyltrimethoxysilane, N—[N'-(2'-aminoethyl)-2-aminoethyl]-3-aminopropyltrimethoxysilane, hydroxymethyltrimethoxysilane, 2-[methoxy(polyethyleneoxy)propyl]trimethoxysilane, bis-(hydroxyethyl)-3-aminopropyltriethoxysilane, N-hydroxyethyl-N-methylaminopropyltriethoxysilane, 3-(meth)acryloxypropyltriethoxysilane and 3-(meth)acryloxypropyltrimethoxysilane.

As metal compounds with functional groups, there may be mentioned metal compounds with a metal M from Groups IIIA-VA and/or Groups IIB-IVB of the Periodic Table. Alkoxides of zirconium and titanium: M(OR)4 (M=Ti, Zr) (wherein a portion of the OR groups are substituted with a complexing agent such as a β-dicarbonyl compound or monocarboxylic acid) may also be mentioned. Using a compound with a polymerizable unsaturated group (such as methacrylic acid) as a complexing agent allows introduction of a polymerizable unsaturated group.

The dispersing medium used is preferably water and/or an organic solvent. Distilled water (pure) is particularly preferred as the dispersing medium. Polar and non-polar aprotic solvents are preferred as organic solvents. As examples there may be mentioned alcohols including aliphatic alcohols with 1-6 carbon atoms (especially methanol, ethanol, n- and i-propanol and butanol); ketones such as acetone and butanone; esters such as ethyl acetate; ethers such as diethyl ether, tetrahydrofuran and tetrahydropyran; amides such as dimethylacetamide and dimethylformamide; sulfoxides and sulfones such as sulfolane and dimethyl sulfoxide; and aliphatic (optionally halogenated) hydrocarbons such as pentane, hexane and cyclohexane. These dispersing media may also be used as mixtures.

The dispersing medium preferably has a boiling point allowing it to be easily removed by distillation (optionally under reduced pressure), and it is preferably a solvent with a boiling point of lower than 200° C. and especially lower than 150° C.

For preparation of the reactive inorganic fine particles A of (i), the concentration of the dispersing medium will normally be 40-90 wt %, preferably 50-80 wt % and especially 55-75 wt %. The remaining dispersion will be composed of untreated inorganic fine particles and the aforementioned surface-modifying compound. The weight ratio of the inorganic fine particles/surface-modifying compound is preferably 100:1-4:1, more preferably 50:1-8:1 and even more preferably 25:1-10:1. Preparation of the reactive inorganic fine particles A of (i) is preferably carried out at from room temperature (about 20° C.) to the boiling point of the dispersing medium. Most preferably, the dispersion temperature is 50-100° C. The dispersion time will depend on the type of material used, but generally it is from several minutes to several hours, and for example, 1-24 hours.

(ii) Inorganic fine particles having reactive functional groups on their surfaces, obtained by discharging a monomer comprising inorganic fine particles with particle sizes from 3 nm to 100 nm dispersed in a hydrophobic vinyl monomer, into water through a hydrophilized porous membrane, to form an aqueous dispersion of inorganic fine particle-dispersed monomer droplets, and then polymerizing the dispersion.

Using reactive inorganic fine particles A according to (ii) above is advantageous from the viewpoint of the particle size distribution, in that the monodisperse property is increased and irregular performance when coarse particles are present can be minimized.

Since the reactive inorganic fine particles A used in the invention are inorganic fine particles with an organic component covering at least part of the surfaces and thus having reactive functional groups on their surfaces which are introduced by the organic component, either the reactive functional group (a) or a different reactive functional group that allows subsequent introduction of the desired reactive functional group (a) is included in the hydrophobic vinyl monomer used for polymerization during production of the reactive inorganic fine particles A of type (ii). For example, a hydrophobic vinyl monomer already containing a carboxyl group may be polymerized, and then glycidyl methacrylate reacted with the carboxyl group to introduce a polymerizable unsaturated group.

As specific examples of hydrophobic vinyl monomers, there may be mentioned aromatic vinyl compounds such as styrene, vinyltoluene, α-methylstyrene and divinylbenzene; unsaturated carboxylic acid esters such as methyl(meth)acrylate, 2-hydroxyethyl(meth)acrylate, t-butyl(meth)acrylate, n-hexyl(meth)acrylate, isobutyl(meth)acrylate, cyclohexyl (meth)acrylate, 2-ethylhexyl(meth)acrylate, lauryl(meth) acrylate, stearyl(meth)acrylate, benzyl(meth)acrylate, (poly) ethylene glycol mono- or di(meth)acrylate, (poly)propylene glycol mono- or di(meth)acrylate, 1,4-butanediol mono- or di-(meth)acrylate, trimethylolpropane mono-, di- or tri- (meth)acrylate and the like; allyl compounds such as diallyl phthalate, diallylacrylamide, triallyl (iso)cyanurate, triallyltrimellitate, and (poly)oxyalkyleneglycol di(meth)acrylates such as (poly)ethyleneglycol di(meth)acrylate and (poly)-propyleneglycol di(meth)acrylate. There may also be mentioned conjugated diene compounds such as butadiene, isoprene and chloroprene. There may further be mentioned reactive functional group-containing monomers such as acrylic acid, methacrylic acid, itaconic acid, fumaric acid, glycidyl methacrylate, vinylpyridine, diethylaminoethyl acrylate, N-methylmethacrylamide and acrylonitrile. Among these, monomers with high water-solubility such as acrylic acid, methacrylic acid and itaconic acid have high water solubility overall as monomers, and may be used in ranges that do not produce oil-droplet monomer emulsions in water.

The inorganic fine particles used for (ii) must have small particle sizes and must disperse satisfactorily in hydrophobic vinyl monomers. The particle sizes of the inorganic fine particles used are preferably less than 100 nm, preferably from 5 nm to 80 nm, and more preferably from 10 nm to 70 nm. If the inorganic fine particles are poorly compatible with the hydrophobic vinyl monomer, it is preferred for the fine particle surfaces to be subjected to prior surface treatment. Surface treatment may employ a known method such as dispersing agent treatment whereby a pigment dispersant is adsorbed onto the fine particle surfaces, coupling agent treatment with a silane coupling agent or titanate coupling agent, or polymer coating treatment by capsule polymerization or the like.

In order to emulsify the inorganic fine particle-dispersed hydrophobic vinyl monomer in water for (ii), it is discharged into water through a hydrophilized porous membrane. The pores must have a mean pore size of 0.01-5 μm and must have uniform pore sizes, and must run from the front to the back of the membrane. Glass is preferred as the material for the membrane, and specific examples include porous glass (SPG: Shirasu Porous Glass) obtained by microphase separation (by heat treatment) of $SiO_2$—$Al_2O_3$—$B_2O_3$—CaO glass prepared by firing Shirasu volcanic ash as the main starting material, and dissolving, removing the boric acid-rich phase with an acid.

For (ii) above, a surfactant or water-soluble polymer must be present as a stabilizer for the monomer droplets in the aqueous phase into which the inorganic fine particle-containing hydrophobic vinyl monomer is extruded through the porous membrane. If no stabilizer is used, the monomer droplets discharged through the membrane will fuse together, resulting in a wide particle size distribution. Preferred stabilizers include water-soluble polymer-based stabilizers such as polyvinyl alcohol, hydroxypropylcellulose and polyvinylpyrrolidone, for monomer droplets of about 1 μm or greater, and preferably an anionic surfactant or nonionic emulsifier is also added. For example, a combination of sodium lauryl sulfate as an emulsifier and 1-hexadecanol as a co-emulsifier firmly adsorbs onto the droplet surfaces to provide a significant stabilizing effect, and is particularly preferred as the stabilizer for (ii).

In most cases, an oil-soluble radical initiator is used for polymerization of the aqueous dispersion of emulsified inorganic fine particle-containing monomer droplets, for (ii) above. As examples of initiators to be used as oil-soluble radical initiators, there may be mentioned azo-based initiators such as azobisisobutyronitrile, aromatic peroxides such as benzoyl peroxide and 2,4-dichlorbenzoyl peroxide, and aliphatic peroxides such as isobutyl peroxide, diisopropylperoxy dicarbonate and di(2-ethylhexylperoxy)dicarbonate. These may be used by dissolution in the monomer phase before emulsification. A water-soluble radical polymerization inhibitor such as hydroquinone or iron chloride may also be added.

(iii) Inorganic fine particles having reactive functional groups on their surfaces, obtained by bonding metal oxide fine particles, as inorganic fine particles to serve as the core, with a compound containing the reactive functional group introduced into the inorganic fine particles before covering, a group represented by chemical formula (2) below and a silanol group or a group that produces a silanol group by hydrolysis.

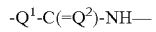

(In chemical formula (2), $Q^1$ represents NH, O (oxygen atom) or S (sulfur atom), and $Q^2$ represents O or S).

Using the reactive inorganic fine particles A of (iii) above is advantageous in that the organic component is increased and the dispersibility and film strength are further increased.

First, compounds containing a group represented by chemical formula (2) above and a silanol group or a group that produces a silanol group by hydrolysis (hereinafter also referred to as "reactive functional group-modified hydrolyzable silane") will be explained as a reactive functional group to be introduced into the inorganic fine particles before covering.

The reactive functional group (a) to be introduced into the inorganic fine particles, in the reactive functional group-modified hydrolyzable silane, is not particularly restricted so long as it is appropriately selected to be reactive with the binder C. It is one that is appropriate for introduction of the polymerizable unsaturated group.

In the reactive functional group-modified hydrolyzable silane, the group [-$Q^1$-C(=$Q^2$)-NH—] represented by chemical formula (2) above includes, specifically, the six groups [—O—C(=O)—NH—], [—O—C(=S)—NH—], [—S—C(=O)—NH—], [—NH—C(=O)—NH—], [—NH—C(=S)—NH—] and [—S—C(=S)—NH—].

These groups may be used either alone or in combinations of two or more. From the viewpoint of thermostability, it is preferred to use at least one from among the groups [—O—C(=O)—NH—], [—O—C(=S)—NH—] and [—S—C(=O)—NH—]. A group [-$Q^1$-C(=$Q^2$)-NH—] represented by chemical formula (2) generates suitable cohesion by hydrogen bonding between molecules to achieve curing, and thereby imparts properties such as excellent mechanical strength, adhesiveness with base materials and heat resistance.

As groups that produce silanol groups by hydrolysis, there may be mentioned alkoxy groups, aryloxy groups, acetoxy groups, amino groups and halogen atoms on silicon atoms, with alkoxysilyl and aryloxysilyl groups being preferred. The silanol group or the group that produces a silanol group by hydrolysis can bond with the metal oxide fine particles either by condensation reaction or by condensation reaction following hydrolysis.

As specific preferred examples of reactive functional group-modified hydrolyzable silanes, there may be mentioned compounds represented by chemical formula (3) below.

[Chemical Formula 3]

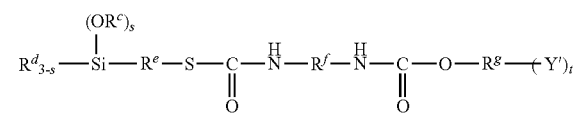

In chemical formula (3), $R^c$ and $R^d$ may be the same or different and represent hydrogen atoms or $C_1$-$C_8$ alkyl or aryl groups, and as examples there may be mentioned methyl, ethyl, propyl, butyl, octyl, phenyl and xylyl. The letter s represents 1, 2 or 3.

As examples of groups represented by [$(R^cO)_s R^d_{3-s}Si$—], there may be mentioned trimethoxysilyl, triethoxysilyl, triphenoxysilyl, methyldimethoxysilyl and dimethyl-methoxysilyl. Trimethoxysilyl and triethoxysilyl are preferred among such groups.

$R^e$ is a divalent organic group with a $C_1$-$C_{12}$ aliphatic or aromatic structure, and it may also include a straight-chain, branched or cyclic structure. As examples of such organic groups, there may be mentioned methylene, ethylene, propylene, butylene, hexamethylene, cyclohexylene, phenylene, xylylene and dodecamethylene. Preferred among these are methylene, propylene, cyclohexylene and phenylene.

$R^f$ is a divalent organic group, and it will generally be selected from among divalent organic groups with molecular weights of from 14 to 10,000 and preferably molecular weights of from 76 to 500. As examples there may be mentioned straight-chain polyalkylene groups such as hexamethylene, octamethylene and dodecamethylene; alicyclic or polycyclic divalent organic groups such as cyclohexylene and norbornylene; divalent aromatic groups such as phenylene, naphthylene, biphenylene and polyphenylene; and alkyl group-substituted or aryl group-substituted forms of the foregoing. These divalent organic groups may include atomic groups containing elements other than carbon and hydrogen, and may also include polyether bonds, polyester bonds, polyamide bonds and polycarbonate bonds, as well as groups represented by chemical formula (2) above.

$R^g$ is a (t+1)-valent organic group, and is preferably selected from among straight-chain, branched or cyclic saturated hydrocarbon and unsaturated hydrocarbon groups.

Y' represents a monovalent organic group with a reactive functional group. It may also be the aforementioned reactive functional group itself. For example, when the reactive functional group (a) is selected from among polymerizable unsaturated groups, there may be mentioned (meth)acryloyl(oxy), vinyl(oxy), propenyl(oxy), butadienyl(oxy), styryl(oxy), ethynyl(oxy), cinnamoyl(oxy), maleate and (meth)acrylamide groups. The letter t is a positive integer of preferably 1-20, even more preferably 1-10 and most preferably 1-5.

Synthesis of the reactive functional group-modified hydrolyzable silane used in the invention may be accomplished by the method described in Japanese Unexamined Patent Publication HEI No. 9-100111, for example. Specifically, a polymerizable unsaturated group, for example, may be introduced by (I) addition reaction between a mercaptoalkoxysilane, a polyisocyanate compound and an active hydrogen group-containing polymerizable unsaturated compound that can react with isocyanate groups. It may also be accomplished by (II) direct reaction between a compound with alkoxysilyl and isocyanate groups in its molecule, and the active hydrogen group-containing polymerizable unsaturated compound. It can also be accomplished by (III) direct synthesis by addition reaction between a compound with polymerizable unsaturated and isocyanate groups in its molecule, and a mercaptoalkoxysilane or aminosilane.

For production of the reactive inorganic fine particles A of (iii) above, there may be selected a method in which the reactive functional group-modified hydrolyzable silane is subjected to a separate hydrolysis procedure, and then mixed with inorganic fine particles, heated and stirred, a method in which hydrolysis of the reactive functional group-modified hydrolyzable silane is carried out in the presence of the inorganic fine particles, or a method in which the surface treatment of the inorganic fine particles is carried out in the presence of another component such as a polyvalent unsaturated organic compound, monovalent unsaturated organic compound, radiation polymerization initiator or the like, but hydrolysis of the reactive functional group-modified hydrolyzable silane in the presence of the inorganic fine particles is the preferred method.

The temperature for production of the reactive inorganic fine particles A of (iii) is normally from 20° C. to 150° C., and the treatment time is in the range of 5 minutes-24 hours.

In order to accelerate the hydrolysis, an acid, salt or base material may be added as a catalyst. As suitable acids, there may be mentioned organic acids and unsaturated organic acids; and as suitable base materials, there may be mentioned tertiary amines and quaternary ammonium hydroxide. These acid or base material catalysts may be added at 0.001-1.0 wt % and preferably 0.01-0.1 wt % based on the reactive functional group-modified hydrolyzable silane.

The reactive inorganic fine particles A for use may be powdered fine particles containing no dispersing medium, but from the viewpoint of omitting the dispersion step and increasing productivity, the fine particles are preferably in the form of a solvent-dispersed sol.

The content of the reactive inorganic fine particles A is preferably 5-70 wt % and more preferably 20-60 wt % based on the total solid content of the hard coat layer. At less than 5 wt % the hardness of the hard coat layer surface may not be sufficient, and at more than 70 wt % the adhesiveness at the interface between the hard coat layer and transparent base material may be insufficient.

<2-2. Curable Binder System for Hard Coat Layer>

The constituent components of the curable binder system for the hard coat layer of the invention are those other than the reactive inorganic fine particles A and the at least one leveling agent A as an essential component of the hard coat layer, and they include the essential component binder C as a curable resin, if necessary a curable binder component other than the binder C, a polymer component, a polymerization initiator, etc., which represent what becomes the matrix of the hard coat layer after curing.

<2-2-1. Binder C>

The binder C used in the invention is a curable resin that serves as part of the matrix when cured. The binder C preferably has a reactive functional group (b) with crosslinking reactivity for the reactive functional group (a) of the reactive inorganic fine particles A. If the binder C has the reactive functional group (b), the reactive functional group (a) and reactive functional group (b) will undergo crosslinking to form a network structure. This will enhance the hardness of the hard coat layer. The binder C preferably has three or more reactive functional groups (b) per molecule in order to obtain sufficient crosslinkability. The reactive functional group (b) for use may be a polymerizable unsaturated group, and preferably it is a photocuring unsaturated group and more preferably an ionizing radiation-curing unsaturated group. As specific examples, there may be mentioned ethylenic double bond-containing groups such as (meth)acryloyl, vinyl and allyl, and epoxy groups.

The curable organic resin of the binder C is preferably translucent to allow transmission of light as a coated film, and there may be appropriately employed ionizing radiation curable resins, as resins that cure by ionizing radiation, typically ultraviolet rays or an electron beam, as well as other publicly known curable resins, depending on the required performance. As ionizing radiation curable resins, there may be mentioned acrylate-based, oxetane-based and silicone-based resins.

From the viewpoint of increasing the hardness of the hard coat layer of the invention, it is preferred to use a combination of Polymer D containing polyalkylene oxide chains, represented by chemical formula (4) below, and Compound E having two or more reactive functional groups and having a molecular weight of less than 10,000.

Polymer D, Compound E and the reactive inorganic fine particles A are mutually reactive, and since Polymer C undergoes crosslinking with both Compound E and the reactive inorganic fine particles A, it may be expected to provide sufficient mar-proofness to the hard coat layer.

<2-2-1-1. Polyalkylene Oxide Chain-Containing Polymer D Represented by Chemical Formula (4)>

The polyalkylene oxide chain-containing Polymer D is represented by chemical formula (4) below, and it is a polyalkylene oxide chain-containing polymer having three or more reactive functional groups (b) at the ends and having a molecular weight of greater than 1000.

[Chemical Formula 4]

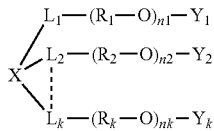

(4)

In chemical formula (4), X is a $C_{3-10}$ (not counting substituents) trivalent or greater organic group comprising one or a combination of straight-chain, branched or cyclic hydrocarbon chains, where the hydrocarbon chains optionally have substituents and heteroatoms are optionally present between the hydrocarbon chains. The letter k represents an integer of 3-10. $L_1$-$L_k$ each independently represents a divalent group including one or more selected from the group consisting of ether bonds, ester bonds and urethane bonds, or a direct bond. $R_1$-$R_k$ each independently represents a $C_{1-4}$ straight-chain or branched hydrocarbon group. The symbols n1, n2 . . . nk are each independent integers. $Y_1$-$Y_k$ each independently represents a compound residue with one or more reactive functional groups (b).

In the polyalkylene oxide chain-containing Polymer D represented by chemical formula (4), X corresponds to a short main chain with k bifurcation points from which the (O—$R_k$)$_{nk}$ portions of the linear polyalkylene oxide side chains extend.

Such hydrocarbon chains include saturated hydrocarbons such as —$CH_2$— and unsaturated hydrocarbons such as —CH=CH—. Cyclic hydrocarbon chains may consist of alicyclic compounds or aromatic compounds. Heteroatoms such as O or S may be present between the hydrocarbon chains, and ether bonds, thioether bonds, ester bonds or urethane bonds may also be present between the hydrocarbon chains. The hydrocarbon chains branching from straight-chain or cyclic hydrocarbon chains via heteroatoms are counted in the number of carbon atoms of the substituents explained hereunder.

As substituents that may be optionally present on the hydrocarbon chains, there may be mentioned, specifically, halogen atoms, hydroxyl, carboxyl, amino, epoxy, isocyanate, mercapto, cyano, silyl, silanol, nitro, acetyl, acetoxy, sulfone groups and the like, with no particular restriction to these. The substituents that are optionally present on the hydrocarbon chains may include hydrocarbon chains branched from the aforementioned straight-chain or cyclic hydrocarbon chains via heteroatoms, and as examples, there may be mentioned alkoxy groups (RO—, where R is a saturated or unsaturated straight-chain, branched or cyclic hydrocarbon chain), alkylthioether groups (RS—, where R is a saturated or unsaturated straight-chain, branched or cyclic hydrocarbon chain) and alkyl ester groups (RCOO—, where R is a saturated or unsaturated straight-chain, branched or cyclic hydrocarbon chain).

X is a $C_{3-10}$ (not counting the substituents) trivalent or greater organic group. If the number of carbon atoms excluding the substituents in X is less than three, it will be difficult for three or more of the linear polyalkylene oxide side chain (O—$R_k$)$_{nk}$ portions to be present. On the other hand, if the number of carbon atoms excluding substituents in X is greater than 10, there will be more flexible sections and the hardness of the cured film will be undesirably lowered. The number of carbon atoms excluding substituents is preferably 3-7 and even more preferably 3-5.

X is not particularly restricted so long as these conditions are satisfied. For example, it may have any of the following structures.

[Chemical Formula 5]

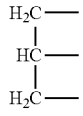 (x-1)

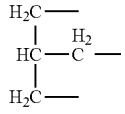 (x-2)

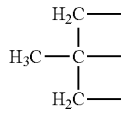 (x-3)

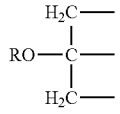 (x-4)

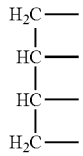 (x-5)

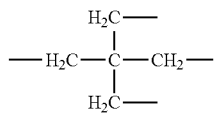 (x-6)

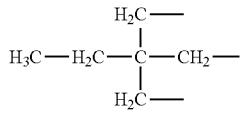 (x-7)

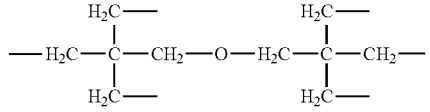 (x-8)

As preferred structures among these, there may be mentioned structures (x-1), (x-2), (x-3) and (x-7).

As starting materials for X, there are preferably used $C_{3-10}$ polyhydric alcohols having three or more hydroxyl groups in the molecule, such as 1,2,3-propanetriol(glycerol), trimethylolpropane, pentaerythritol and dipentaerythritol, $C_{3-10}$ polybasic carboxylic acids having three or more carboxyl groups in the molecule, and $C_{3-10}$ polyvalent amine acids having three or more amino groups in the molecule.

In chemical formula (4), k represents the number of polyalkylene oxide chains $(O—R_k)_{nk}$ in the molecule, and it is an integer of 3-10. If k is less than 3, i.e. two polyalkylene oxide chains are present, sufficient hardness will not be obtained. If k exceeds 10, there will be more flexible sections and the hardness of the cured film will be undesirably lowered. The value of k is preferably 3-7 and even more preferably 3-5.

In chemical formula (4), L1-Lk each independently represents a divalent group including one or more selected from the group consisting of ether bonds, ester bonds and urethane bonds, or a direct bond. The divalent group including one or more selected from the group consisting of ether bonds, ester bonds and urethane bonds may be an ether bond (—O—), ester bond (—COO—) or urethane bond (—NHCOO—). These bonds facilitate propagation of the molecular chains with a high degree of freedom, and can therefore provide compatibility with other resin components.

As examples of divalent groups including one or more selected from the group consisting of ether bonds, ester bonds and urethane bonds, there may be mentioned —O—R—O—, —O(C=O)—R—O—, —O(C=O)—R—(C=O)O—, —(C=O)O—R—O—, —(C=O)O—R—(C=O)O—, —(C=O)O—R—O(C=O)—, —NHCOO—R—O—, —NHCOO—R—O(C=O)NH—, —O(C=O)NH—R—O—, —O(C=O)NH—R—O(C=O)NH—, —NHCOO—R—O(C=O)NH—, —NHCOO—R—(C=O)O—, —O(C=O)NH—R—(C=O)O—, —NHCOO—R—O(C=O)— and —O(C=O)NH—R—O(C=O)—. Here, R represents a saturated or unsaturated straight-chain, branched or cyclic hydrocarbon chain.

As specific examples of such divalent groups, there may be mentioned residues with the exclusion of an active hydrogen from diols such as (poly)ethylene glycol and (poly)propylene glycol, dicarboxylic acids such as fumaric acid, maleic acid and succinic acid, or diisocyanates such as tolylene diisocyanate, hexamethylene diisocyanate and isoboron diisocyanate, although there is no limitation to these.

In chemical formula (4), $(O—R_k)_{nk}$ is a polyalkylene oxide chain, i.e. a linear side chain with alkylene oxide as the repeating unit. Here, $R_1$-$R_k$ each independently represents a $C_{1-4}$ straight-chain or branched hydrocarbon group. As alkylene oxides, there may be mentioned methylene oxide, ethylene oxide, propylene oxide and isobutylene oxide, with ethylene oxide and propylene oxide ($C_{2-3}$ straight-chain or branched hydrocarbon groups) being preferred.

The symbols n1, n2 ... nk for the number of repeating units of the alkylene oxide $R_k$—O are all independent integers. The symbols n1, n2 ... nk are not particularly restricted so long as the weight-average molecular weight of the entire molecule is greater than 1000. The symbols n1, n2 ... nk may be different, but the chain lengths are preferably similar from the viewpoint of maintaining the hardness of the formed hard coat layer while inhibiting cracking. Thus, the difference between n1, n2 ... nk is preferably about 0-100, more preferably about 0-50 and most preferably about 0-10. From the viewpoint of maintaining the hardness of the formed hard coat layer while inhibiting cracking, n1, n2 ... nk are preferably each integers of 2-500 and more preferably integers of 2-300.

$Y_1$-$Y_k$ each independently represents a reactive functional group (b) or a compound residue with one or more reactive functional groups (b). This will ensure that three or more reactive functional groups (b) are at the ends of the polyalkylene oxide chain-containing polymer.

As examples of $Y_1$-$Y_k$ when $Y_1$-$Y_k$ are reactive functional groups (b), there may be mentioned polymerizable unsaturated groups such as (meth)acryloyl.

As examples of reactive functional groups (b) when $Y_1$-$Y_k$ are compound residues with one or more reactive functional groups (b), there may be mentioned polymerizable unsaturated groups such as (meth)acryloyl, (meth)acryloyloxy, vinyl group ($CH_2$=CH—) and $CH_2$=CR— (where R is a hydrocarbon group). The compound residue is not particularly restricted so long as the reactive functional group (b) is appropriately selected for reaction with Compound D described hereunder and the reactive inorganic fine particles A. When $Y_1$-$Y_k$ are compound residues, the number of reactive functional groups (b) in $Y_1$-$Y_k$ may be one, although two or more can further increase the crosslink density and are preferred from the viewpoint of hardness of the hard coat layer.

When $Y_1$-$Y_k$ are compound residues with one or more reactive functional groups (b), the compound residues are residues with the exclusion of the reactive substituent or a portion of the reactive substituent (hydrogen, etc.) from a compound with at least one reactive functional groups (b) and another reactive substituent different from the reactive functional groups (b).

As examples of compound residues with ethylenic unsaturated groups, there may be mentioned, specifically, residues with the exclusion of a reactive substituent or a portion of a reactive substituent (hydrogen, etc.), other than the ethylenic unsaturated groups of the following compounds. For examples, there may be mentioned (meth)-acrylic acid, hydroxyethyl(meth)acrylate, hydroxypropyl-(meth)acrylate and pentaerythritol tri(meth)acrylate, with no limitation to these.

The molecular weight of the polyalkylene oxide chain-containing Polymer D in the invention is preferably greater than 1000, even more preferably greater than 5000 and most preferably greater than 10,000, from the viewpoint of imparting flexibility to the cured film and preventing cracks.

As examples of commercially available products that include a polyalkylene oxide chain-containing Polymer D represented by chemical formula (4) above, there may be mentioned the trade name BEAMSET 371 (product of Arakawa Chemical Industries, Ltd.), and the trade name DIABEAM UK-4153 (product of Mitsubishi Rayon Co., Ltd.; in chemical formula (4), X is (x-7), k is 3, $L_1$-$L_3$ are each direct bonds, $R_1$-$R_3$ is ethylene, the total of n1, n2 and n3 is 20, and $Y_1$-$Y_3$ are acryloyloxy groups).

The content of Polymer D is preferably 5-100 parts by weight and more preferably 10-50 parts by weight based on 100 parts by weight of Compound E described hereunder. If the content of Polymer D is 5 parts by weight or greater based on 100 parts by weight of Compound E described hereunder, it will be possible to impart flexibility and recovery properties to the cured film, while if it is 100 parts or less by weight it will be possible to maintain the hardness of the cured film.

<2-2-1-2. Compound E Having Two or More Reactive Functional Groups (b) and Having a Molecular Weight of Less than 10,000>

Compound E, which has two or more reactive functional groups (b) and a molecular weight of less than 10,000, together with the reactive inorganic fine particles A described above, improves the hardness of the cured resin composition film and provides a function of imparting sufficient marproofness. Compounds with the structure of Polymer D above are excluded from Compound E having two or more reactive functional groups (b) and a molecular weight of less than 10,000.

Compound E according to the invention may be appropriately selected from among a wide range of compounds having reactive functional groups (b) that can react with each other in the combination of Polymer D and the reactive inorganic fine particles A, and having sufficient mar-proofness. Compound E may be of a single type, or an appropriate mixture of two or more types.

Compound E having two or more reactive functional groups (b) and a molecular weight of less than 10,000 preferably has three or more reactive functional groups (b) in the molecule from the viewpoint of increasing the crosslink density of the cured film and imparting hardness. When Compound E is an oligomer with a molecular weight distribution, the number of reactive functional groups (b) is the average number.

The molecular weight of Compound E is preferably less than 5000 from the viewpoint of improving hardness.

Concrete examples will now be provided, with the understanding that Compound E used in the invention is not limited to these examples.

As specific examples compounds with polymerizable unsaturated groups, there may be mentioned polyfunctional (meth)acrylate-based monomers with two or more polymerizable unsaturated groups in the molecule, for example, difunctional (meth)acrylate compounds such as 1,6-hexanediol di(meth)acrylate, neopentylglycol di(meth)acrylate, ethyleneglycol di(meth)acrylate and isocyanuric acid-ethylene oxide-modified di(meth)acrylate; trifunctional (meth) acrylate compounds such as trimethylolpropane tri(meth) acrylate and its EO, PO and epichlorhydrin-modified products, pentaerythritol tri(meth)acrylate, glycerol tri(meth) acrylate and its EO, PO and epichlorhydrin-modified products, isocyanuric acid/EO-modified tri(meth)acrylate (ARONIX M-315 by ToaGosei Co., Ltd.), tris(meth)acryloyloxyethyl phosphate, (2,2,2-tri-(meth)acryloyloxymethyl) ethyl hydrogenphthalate, and glycerol tri(meth)acrylate and its EO, PO and epichlorhydrin-modified products; tetrafunctional (meth)acrylate compounds such as pentaerythritol tetra (meth)acrylate and its EO, PO and epichlorhydrin-modified products, and ditrimethylolpropane tetra(meth)acrylate; pentafunctional (meth)acrylate compounds such as dipentaerythritol penta(meth)acrylate and its EO, PO, epichlorhydrin, fatty acid, alkyl and urethane-modified products; and hexafunctional (meth)acrylate compounds such as dipentaerythritol hexa(meth)acrylate and its EO, PO, epichlorhydrin, fatty acid, alkyl and urethane-modified products, and sorbitol hexa(meth)acrylate and its EO, PO, epichlorhydrin, fatty acid, alkyl and urethane-modified products.

As examples of (meth)acrylate-based oligomers (or prepolymers), there may be mentioned epoxy(meth)acrylates obtained by addition reaction between glycidyl ethers and monomers with (meth)acrylic acid or carboxylic acid groups; urethane(meth)acrylates obtained by addition reaction between polyol and polyisocyanate reaction products and hydroxyl-containing (meth)acrylates, polyester acrylates obtained by esterification of (meth)acrylic acid with polyester polyols composed of polyols and polybasic acids; and polybutadiene(meth)acrylates which are (meth)acrylic compounds with polybutadiene or hydrogenated polybutadiene backbones. When the reactive functional groups (b) of the essential components according to the invention are polymerizable unsaturated groups, urethane(meth)acrylate is preferably used from the viewpoint of imparting hardness and flexibility to the cured film.

As examples of glycidyl ethers to be used for the aforementioned epoxy(meth)acrylates, there may be mentioned 1,6-hexanediglycidyl ether, polyethyleneglycolglycidyl ether, bisphenol A epoxy resin, naphthalene-based epoxy resin, cardo epoxy resins, glycerol triglycidyl ether and phenol-novolac-type epoxy resins.

As examples of polyols to be used for the aforementioned urethane(meth)acrylates, there may be mentioned 1,6-hexanediglycidyl ether, polyethylene glycol, polypropylene glycol, polytetramethylene glycol, polycaprolactonediol, polycarbonatediol, polybutadiene polyol and polyester diol. As polyisocyanates to be used for the aforementioned urethane (meth)acrylates, there may be mentioned tolylene diisocyanate, xylylene diisocyanate, diphenylmethane diisocyanate, tetramethylxylene diisocyanate, hexamethylene diisocyanate, isophorone diisocyanate and dicyclohexylmethane diisocyanate. As hydroxyl-containing (meth)acrylates to be used for the aforementioned urethane(meth)acrylates, there may be mentioned 2-hydroxyethyl(meth)acrylate, 2-hydroxypropyl(meth)acrylate, 4-hydroxybutyl(meth)acrylate, pentaerythritol(meth)acrylate and caprolactone-modified 2-hydroxyethyl(meth)acrylate.

As examples of polyols for formation of polyester polyols to be used for the aforementioned polyester acrylates, there may be mentioned ethylene glycol, polyethylene glycol, propylene glycol, polypropylene glycol, neopentyl glycol, 1,4-butanediol, trimethylolpropane and pentaerythritol, and as examples of polybasic acids, there may be mentioned succinic acid, adipic acid, sebacic acid, phthalic acid, isophthalic acid, terephthalic acid, trimellitic acid and pyromellitic acid.

As Compound E to be used in the invention, there may also be used polymers represented by chemical formula (5) below, having a molecular weight of less than 10,000.

[Chemical Formula 6]

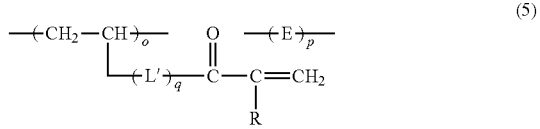

(5)

In chemical formula (5), L' represents a $C_{1-10}$ linking group and q represents 0 or 1. R represents hydrogen or a methyl group. E represents any vinyl monomer polymerization unit, and it may consist of a single component or more than one component. The letters o and p represent the molar percentages of each polymerization unit. The letter p may also be 0.

In chemical formula (5), L' represents a $C_{1-10}$ linking group, more preferably a $C_{1-6}$ linking group and most preferably a $C_{2-4}$ linking group, and it may have a straight-chain or branched structure, or even a cyclic structure, and may also contain heteroatoms selected from among O, N and S.

As preferred examples of the linking group L' in chemical formula (5), there may be mentioned *—$(CH_2)_2$—O—**, *—$(CH_2)_2$—NH—**, *—$(CH_2)_4$—O—**, *—$(CH_2)_6$—O—**, *—$(CH_2)_2$—O—$(CH)_2$—O—**, *—CONH—$(CH_2)_3$—O—**, *—$CH_2CH(OH)CH_2$—O—**, *—$CH_2CH_2OCONH(CH_2)_3$—O—**. Here, the "*" symbol denotes linking sites on the main chain of the polymer, and "**" denotes linking sites on the (meth)acryloyl group end.

In chemical formula (5), R represents hydrogen or a methyl group, but it is more preferably hydrogen from the viewpoint of curing reactivity. Also in chemical formula (5), o may be 100 mol %, i.e. it may be a single polymer. Even if o is 100 mol %, it may be a copolymer obtained using a mixture of two or more different polymerization units containing (meth) acryloyl groups represented by o mol %. The ratio of o and p is not particularly restricted, and may be appropriately selected from the viewpoint of hardness, solubility in solvents, transparency and the like.

In chemical formula (5), E represents any vinyl monomer polymerization unit, and is not particularly restricted and may be appropriately selected from the viewpoint of hardness, solubility in solvents, transparency and the like, while it may also be composed of a single or multiple vinyl monomers, depending on the purpose.

Specifically, there may be mentioned vinyl ethers such as methylvinyl ether, ethylvinyl ether, t-butylvinyl ether, cyclohexylvinyl ether, isopropylvinyl ether, hydroxyethylvinyl ether, hydroxybutylvinyl ether, glycidylvinyl ether and allylvinyl ether; vinyl esters such as vinyl acetate, vinyl propionate and vinyl butyrate; (meth)acrylates such as methyl (meth)acrylate, ethyl(meth)acrylate, hydroxyethyl(meth) acrylate, glycidyl methacrylate, allyl(meth)acrylate and (meth)acryloyloxy-propyltrimethoxysilane; styrene derivatives such as styrene and p-hydroxymethylstyrene; and unsaturated carboxylic acids such as crotonic acid, maleic acid and itaconic acid, as well as derivatives thereof.

There may also be used reactive oligomers with weight-average molecular weights of less than 10,000 and having ethylenic double bond groups at the ends or on side chains. As reactive oligomers, there may be mentioned ones whose backbone components are polymethyl(meth)acrylate, polystyrene, polybutyl(meth)acrylate, poly-(acrylonitrile/styrene), poly(2-hydroxymethyl(meth)-acrylate/methyl(meth) acrylate) or poly(2-hydroxymethyl(meth)acrylate/butyl (meth)acrylate), as well as copolymers of these resins with silicone resins.

Commercially available products may be used for the aforementioned compounds. As urethane acrylates with weight-average molecular weights of less than 10,000 and having two or more polymerizable unsaturated groups, there may be mentioned AH-600, AT-600, UA-306H, UA-306T and UA-306I, trade names of Kyoeisha Chemical Co., Ltd.; UV-1700B, UV-3000B, UV-3200B, UV-6300B, UV-6330B and UV-7000B, trade names of Nippon Synthetic Chemical Industry Co., Ltd.; BEAMSET 500 Series (502H, 504H, 550B), trade names of Arakawa Chemical Industries, Ltd.; U-6HA, U-15HA, UA-32P and U-324A, trade names of Shin-Nakamura Chemical Co., Ltd.; and M-9050, trade name of ToaGosei Co., Ltd. Urethane(meth)acrylates among the above that are preferred for combination with Polymer D according to the invention include urethane(meth)acrylates obtained by reacting isophorone diisocyanate monomers or multimers with pentaerythritol polyfunctional acrylate and dipentaerythritol polyfunctional acrylate. As an example of a commercially available urethane(meth)acrylates, there may be mentioned the trade name UV-1700B (product of Nippon Synthetic Chemical Industry Co., Ltd.).

As epoxy acrylates with weight-average molecular weights of less than 10,000 and having two or more polymerizable unsaturated groups, there may be mentioned the SP Series (SP-4060, 1450) and VR Series (VR-60, 1950; VR-90, 1100), trade names of Showa HighPolymer Co., Ltd.; UV-9100B and UV-9170B, trade names of Nippon Synthetic Chemical Industry Co., Ltd.; and EA-6320/PGMAc and EA-6340/PGMAc, trade names of Shin-Nakamura Chemical Co., Ltd.

As reactive oligomers with weight-average molecular weights of less than 10,000 and having two or more polymerizable unsaturated groups, there may be mentioned the Macromonomer Series AA-6, AS-6, AB-6 and AA-714SK, trade names of ToaGosei Co., Ltd.

<2-3. Leveling Agent A of Hard Coat Layer>

According to the invention, the leveling agent is an essential component of the hard coat layer, and at least one type thereof is a (non-reactive) leveling agent A that has neither functional groups that react under ionizing radiation nor polar groups that react under heat. It will therefore lack reactivity with any of the components contained in the hard coat or other layers, especially the low refractive index layer. It has the function of improving the flatness (smoothness) of the surface of the layer containing the leveling agent, and appropriate selection of the type of leveling agent will help impart the surface of the hard coat layer or low refractive index layer with functions such as antifouling properties, fingerprint wiping and mar-proofness.

As such leveling agents, there may be mentioned fluorine-based leveling agents, silicon-based leveling agents and olefin-based leveling agents, and as mentioned above, at least one type of leveling agent A is characterized by being non-reactive.

One leveling agent or a mixture of two or more different ones may be used in the curable binder system of the hard coat layer. Particularly preferred as leveling agents A to be included in the curable binder system of the hard coat layer are fluorinated compounds containing perfluoro groups.

According to the invention, a non-reactive fluorine-based leveling agent is a compound that necessarily contains a fluorinated alkyl group, and it is a non-reactive compound containing absolutely no functional groups that can react under ionizing radiation or heat. If the molecular weight of the non-reactive fluorine-based leveling agent is too low, it will tend to cause repulsion during coating and hamper workability, while if the molecular weight is too high, the compatibility with the binder in the hard coat layer-forming composition will be impaired, making it impossible to obtain a satisfactory coated film. The weight-average molecular weight will, therefore, usually be 5000-500,000, preferably 10,000-300, 000 and more preferably 20,000-200,000. The weight-average molecular weight may be measured by gel permeation chromatography (GPC), based on polystyrene. The solvent in the GPC mobile phase for use may be tetrahydrofuran or chloroform. The measuring column may be a combination of commercially available columns for tetrahydrofuran or chloroform. As examples of commercially available columns for tetrahydrofuran, there may be mentioned Shodex GPC KF-801, GPC KF-802, GPC KF-803, GPC KF-804, GPC KF-805, GPC KF-806 and GPC-KF800D (all trade names of the products of Showa Denko K.K.). The detectors used may be an RI (differential refractive index) detector and a UV detector. The solvent, column and detectors may be used in a GPC system such as Shodex GPC-101 (product of Showa Denko K.K.) for appropriate measurement of the weight-average molecular weight.

The fluorine-based leveling agent is preferably a fluorinated compound with a fluorinated alkyl group represented by the general formula $F(CF_2)_{2n}CH_2CH_2$— (where n is an integer of 1-10). The fluorinated alkyl group may either be a perfluoroalkyl group wherein all of the hydrogens of the alkyl group are replaced with fluorine atoms, or a group wherein a portion of the hydrogens of the alkyl group are replaced with fluorine atoms (for example, $HCF_2CF_2CF_2CF_2$—), and it may be straight-chain or branched. The fluorinated alkyl group may also contain oxygen atoms (for example, $CF_3$—$(OCF_2CF_2)_2$—).

As the fluorinated compounds, there may be mentioned, specifically, compounds represented by the following general formula:

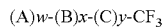

(wherein

A represents one or more groups selected from the group consisting of $CF_2$, $CFCF_2$, $C(CF_2)_2$ and $(CF_2)_{2n}CH_2CH_2$, B represents one or more groups selected from the group consisting of $OCF_2CF_2$, $OCF_2CF(CF_2)$, $OCF_2C(CF_2)_2$, $OCF(CF_2)CF(CF_2)$, $OCF(CF_2)C(CF_2)_2$, $OC(CF_2)_2CF(CF_2)$ and $OC(CF_2)_2C(CF_2)_2$.

C represents one or more groups selected from the group consisting of $OCH_2CH_2$, $OCH_2CH_2CH_2$ and $OC(O)(CH_2)z$, and w, x, y and z represent integers of 0-50).

The number of carbon atoms in the fluorinated alkyl group is normally an integer of 1-20, preferably of 3-12 and most preferably of 6-10, from the viewpoint of achieving high surface-active performance. It is preferably a straight-chain perfluoroalkyl group. Higher fluorine atom content in the compound will result in more excellent surface-active performance, but because surfactants with high fluorine atom contents have poor compatibility with resins and solvents, the fluorine atom content of the leveling agent compound will usually be 5-50%, preferably 7-35% and most preferably 10-30 wt %. The fluorine atom content may be calculated by burning the leveling agent compound for decomposition, extracting the decomposition product with water or alkali water, and quantifying the fluorine ion concentration by ion chromatography.

As examples of commercially available fluorinated compounds that satisfy the structure and performance described above, there may be mentioned among others, the MEGAFAC Series (MCF350-5, F445, F444, F455, F178, F470, F475, F479, F477, TF1025, F478, F178K) by Dainippon Ink & Chemicals, Inc., as well as the TSF Series by Momentive Materials Performance, Inc. Japan Joint Venture (Toshiba Silicone), the X22 Series and KF Series by Shin-Etsu Chemical Co., Ltd., and the SILOPRENE Series by Chisso Corp.

The total content of the leveling agent in the curable binder system of the hard coat layer is preferably from 0.01 wt % to 5 wt % and more preferably from 0.03 wt % to wt % based on the total weight of the binder when no reactive inorganic fine particles A are present, or based on the total weight of the reactive inorganic fine particles A and binder C. A content of greater than 0.01 wt % can impart sufficient flatness (smoothness) to the hard coat layer surface. A content of greater than 5 wt % will increase the amount of leveling agent A that migrates into the low refractive index layer described hereunder and tend to cause phase separation with the leveling agent B in the low refractive index layer-forming composition described hereunder, at the low refractive index layer surface, thus undesirably lowering the transparency due to increased opacity and haze of the low refractive index layer. By limiting the leveling agent content to from 0.03 wt % to 2 wt %, a portion of the leveling agent A in the hard coat layer-forming composition will migrate into the surface of the low refractive index layer and become uniformly distributed, when the hard coat layer is half-cured, the half-cured hard coat layer is subsequently coated with the low refractive index layer-forming composition described hereunder and then fully cured. This will allow the antireflection film composed of the hard coat layer and low refractive index layer to exhibit excellent antifouling properties, fingerprint wiping and mar-proofness on the film surface.

According to the invention, the concentration of the leveling agent may be measured using an XPS (X-ray Photoelectron Spectroscopy) apparatus (VG Theta Probe) by Thermo Electron Corp., for example.

<2-3-1. Polymerization Initiator>

According to the invention, radical polymerization initiators, cationic polymerization initiators and radical and cationic polymerization initiator combinations may be appropriately selected for use as components in the curable binder system, as necessary in order to initiate or promote polymerization of the radical-polymerizing functional groups or cationic polymerizable functional groups. These polymerization initiators are decomposed by light irradiation and/or heat to generate radicals or cations and promote radical polymerization and cationic polymerization.

The radical polymerization initiator may be one capable of under light irradiation and/or heat releasing a substance that initiates radical polymerization. As examples of photoradical polymerization initiators, there may be mentioned imidazole derivatives, bisimidazole derivatives, N-arylglycine derivatives, organic azide compounds, titanocenes, aluminate complexes, organic peroxides, N-alkoxypyridinium salts, thioxanthone derivatives and the like, and more specifically, 1,3-di(tert-butyldioxycarbonyl)benzophenone, 3,3',4,4'-tetrakis-(tert-butyldioxycarbonyl)benzophenone, 3-phenyl-5-isooxazolone, 2-mercaptobenzimidazole, bis(2,4,5-triphenyl)-imidazole, 2,2-dimethoxy-1,2-diphenylethan-1-one (IRGACURE 651, trade name of Ciba Specialty Chemicals Co., Ltd.), 1-hydroxy-cyclohexyl-phenyl-ketone (IRGACURE 184, trade name of Ciba Specialty Chemicals Co., Ltd.), 2-benzyl-2-dimethylamino-1-(4-morpholinophenyl)-butan-1-one (IRGACURE 369, trade name of Ciba Specialty Chemicals Co., Ltd.) and bis(η5-2,4-cyclopentadiene-1-yl)-bis(2,6-difluoro-3-(1H-pyrrole-1-yl)-phenyl)titanium) (IRGACURE 784, trade name of Ciba Specialty Chemicals Co., Ltd.), although there is no limitation to these.

The cationic polymerization initiator may be one capable of under light irradiation and/or heat releasing a substance that initiates cationic polymerization. As examples of cationic polymerization initiators, there may be mentioned sulfonic acid esters, imide sulfonates, dialkyl-4-hydroxysulfonium salts, aryl-p-nitrobenzyl sulfonate esters, silanol-aluminum complexes, (η6-benzene)(η5-cyclopentadienyl)iron(II) and the like, and more specifically, benzoin tosylate, 2,5-dinitrobenzyl tosylate and N-tosyphthalic acid imide, although there is no limitation to these.

Examples of radical polymerization initiators, which may also be used as cationic polymerization initiators, include aromatic iodonium salts, aromatic sulfonium salts, aromatic diazonium salts, aromatic phosphonium salts, triazine compounds, iron arene complexes and the like, and more specifically iodonium salts including chlorides, bromides, fluoroborates, hexafluorophosphates and hexafluoroantimonates of iodoniums such as diphenyliodonium, ditolyliodonium, bis(p-tert-butylphenyl)iodonium and bis(p-chlorophenyl)iodonium, sulfonium salts including chlorides, bromides, fluoroborates, hexafluorophosphates and hexafluoroantimonates of sulfoniums such as triphenyl-sulfonium, 4-tert-butyltriphenylsulfonium and tris(4-methylphenyl)sulfonium, and 2,4,6-substituted-1,3,5-triazine compounds such as 2,4,6-tris(trichloromethyl)-1,3,5-triazine, 2-phenyl-4,6-bis(trichloromethyl)-1,3,5-triazine and 2-methyl-4,6-bis(trichloromethyl)-1,3,5-triazine.

<2-3-2. Other Components>

The hard coat layer of the invention may also contain antistatic agents and anti-glare agents as other components to be added to the curable binder system as appropriate. Various additives such as sensitizing agents may also be included. Including an antistatic agent and/or anti-glare agent can further impart an antistatic property and/or anti-glare property to the hard coat layer of the invention.

<2-4. Hard Coat Layer-Forming Composition>

The hard coat layer-forming composition is prepared by dispersing the mixture of the curable resin and the at least one leveling agent (leveling agent A) as the essential components, in admixture with desired components as necessary, in a solvent by an ordinary preparation method. The composition may then be coated on a transparent base material and dried and cured to form a hard coat layer. A method for preparing the solvent and the hard coat layer-forming composition will now be explained.

<2-4-1. Solvent>

As specific examples of solvents, there may be mentioned alcohols such as methanol, ethanol, isopropyl alcohol, butanol, isobutyl alcohol, methyl glycol, methyl glycol acetate, methylcellosolve, ethylcellosolve and butylcellosolve; ketones such as acetone, methyl ethyl ketone, methyl isobutyl ketone, cyclohexanone and diacetone alcohol; esters such as methyl formate, methyl acetate, ethyl acetate, ethyl lactate and butyl acetate; nitrogen-containing compounds such as nitromethane, N-methylpyrrolidone and N,N-dimethylformamide; ethers such as diisopropyl ether, tetrahydrofuran, dioxane and dioxolane; halogenated hydrocarbons such as methylene chloride, chloroform, trichloroethane and tetrachloroethane; and other solvents such as dimethyl sulfoxide and propylene carbonate; as well as mixtures of the foregoing. As more preferred solvents, there may be mentioned methyl acetate, ethyl acetate, butyl acetate and methyl ethyl ketone.

Particularly preferred for use among these solvents are ketone-based organic solvents. Preparing the coating solution using a ketone-based solvent will facilitate thin and even coating onto the surface of transparent base materials or hard coat layers, and the evaporation rate of the solvent after coating will be suitable enough to prevent drying irregularities, thus facilitating formation of large-area coated films with uniform thicknesses.

As ketone-based solvents, there may be mentioned simple solvents comprising one type of ketone, mixed solvents comprising two or more ketones, and complex mixed solvents that contain other solvents in addition to one or more ketone-based solvents and that still retain the properties of the ketone solvents. Complex mixed solvents are preferred among these, in which case the ketone-based solvents are preferably used in a proportion of greater than wt % and especially greater than 80 wt % of the total solvent.

<2-4-2. Preparation of Hard Coat Layer-Forming Composition>

The hard coat layer-forming composition is usually prepared by mixing the curable resin and the at least one leveling agent (leveling agent A) as the essential components, in admixture with desired components as necessary, with a solvent by an ordinary preparation method, and dispersing the mixture. The mixing and dispersion may be carried out using a paint shaker or bead mill.

<3. Low Refractive Index Layer>

The low refractive index layer of the invention has a lower refractive index than the hard coat layer that is adjacent to the transparent base material side, and it has the function of increasing the visibility of the antireflection film comprising the hard coat layer and the low refractive index layer.

The low refractive index layer of the invention is obtained by coating, drying and curing the low refractive index layer-forming composition described hereunder, and it contains at least a curable binder containing a curable resin, and two or more leveling agents, as essential components of the layer. Of the two different leveling agents, at least one is the same as the one contained in the hard coat layer, i.e. leveling agent A, and at least one is leveling agent B which is reactive with the binder and crosslinks with the binder during the curing described hereunder. The low refractive index layer of the invention is obtained by half-curing the hard coat layer, and then coating the hard coat layer with the low refractive index layer-forming composition and fully curing the half-cured hard coat layer and the low refractive index layer-forming composition. At this time, the leveling agent A in the hard coat layer migrates from the half-cured hard coat layer into the low refractive index layer.

The curable resin of the low refractive index layer is preferably an ionizing radiation-curable resin (binder component). In order to lower the refractive index of the low refractive index layer, it is preferred to include low refractive index fine particles, and using hollow fine particles as the low refractive index fine particles is preferred in order to help lower the refractive index. Solid fine particles are also preferably included to increase the hardness of the low refractive index layer, which is insufficient with hollow fine particles alone.

As hollow fine particles and solid fine particles, there are preferably used reactive hollow fine particles and reactive solid fine particles modified with crosslink-forming groups on the surfaces of the fine particles that allow formation of crosslinking with the ionizing radiation curable resin, in order to improve the hardness of the low refractive index layer. Most preferably, the crosslink-forming groups of the reactive hollow fine particle surfaces and the crosslink-forming groups of the reactive solid fine particle surfaces either have the same structure or, even if they have differing structures, the structures are similar in that the ionizing radiation curable groups have the same backbone and differ only in the presence or absence of one $C_{1-3}$ hydrocarbon group, the bonding groups for the particle surfaces have the same backbone and differ only in the presence or absence of one $C_{1-3}$ hydrocarbon group, and the spacer portions have the same backbone and differ only in the presence or absence of one $C_{1-3}$ hydrocarbon group or one functional group with 1-3 constituting atoms including heteroatoms and excluding hydrogen, or differ only in 1-2 carbons for the carbon chain length of the backbone. Such crosslink-forming groups help prevent aggregation between the reactive hollow fine particles and aggregation between the reactive solid fine particles, so that the reactive hollow fine particles and the reactive solid fine particles will pack more evenly and densely to improve the hardness of the low refractive index layer.

As a preferred example for the low refractive index layer of the invention, there will now be described a low refractive index layer-forming composition comprising hollow fine particles and solid fine particles having the particle surfaces modified by crosslink-forming groups with numerous intersections, an ionizing radiation curable resin, and a curable binder containing at least one type of leveling agent B.

The low refractive index layer of the invention preferably has a refractive index of less than 1.45. A refractive index in this range can yield a low refractive index layer with anti-reflection performance that is satisfactory for practical use. The refractive index may be controlled by appropriate adjustment of the type of ionizing radiation curable resin, the materials and sizes of the hollow fine particles and solid fine particles and the mixing ratio of each material included in the low refractive index layer. The refractive index is preferably near the refractive index of air (=1), but in practice the lower limit for the refractive index will be 1.1. The refractive index may be measured by a known method in the prior art without any particular restrictions. For example, it may be calculated by simulation from a reflectance curve obtained using a spectrophotometer, or by measurement using an ellipsometer.

For the low refractive index layer of the invention, the mean particle size is the 50% particle size (d50: median diameter), where the particles in the solution are measured by the dynamic light scattering method before curing and the particle size distribution is expressed as cumulative distribution. The mean particle size can be measured using a Microtrac particle size analyzer by Nikkiso Co., Ltd. The mean particle size in the film can be measured using a transmission electron microscope (TEM). Specifically, the particles are observed at 50-2,000,000× magnification, and the average value for 100 observed particles is recorded as the mean particle size.

The film thickness of the low refractive index layer is preferably from 0.05 μm to 0.15 μm from the viewpoint of mar-proofness.

The structural materials of the low refractive index layer of the invention will now be described.

<3-1-1. Hollow Fine Particles>

The hollow fine particles of the invention are fine particles having an outer shell layer, where the interior surrounded by the outer shell layer is porous or hollow. Air (refractive index: 1) is present in the porous or hollow sections, and inclusion of hollow fine particles to the low refractive index layer can reduce the refractive index of the layer.

The material of the hollow fine particles of the invention may be inorganic or organic. An inorganic material is preferred in consideration of productivity and strength. In this case, the outer shell layer is formed of an inorganic material.

When the hollow fine particles are formed of an inorganic material, the material of the hollow fine particles is preferably at least one selected from the group consisting of metal oxides, metal nitrides, metal sulfides and metal halides. Using such materials for the hollow fine particles will yield fine particles having outer shells with high strength that are resistant to crushing by external pressure. More preferably, the material of the hollow fine particles is a metal oxide or metal halide, and most preferably a metal oxide or metal fluoride. Using such materials can provide hollow fine particles with high strength and a low refractive index.

As metal elements to be used in metal oxides, there are preferred Na, K, Mg, Ca, Ba, Al, Si and B, with Mg, Ca, Al and Si being more preferred. Using such metal elements will result in a low refractive index and can yield hollow fine particles that are easier to produce than with other elements. One type of metal element may be used, or two or more different ones may be used in combination.

As specific preferred examples of organic fine particles with voids there may be mentioned hollow polymer fine particles prepared by the technique disclosed in Japanese Unexamined Patent Publication No. 2002-80503.

When the hollow fine particles of the invention are formed of a metal oxide, it is particularly preferred to use hollow fine particles composed of silica (silicon dioxide: $SiO_2$), in consideration of the material refractive index and productivity. Hollow silica fine particles have fine voids in the interiors, and air having a refractive index of 1 is also present in the fine particle interiors. Consequently, the refractive indexes of the fine particles themselves are lower than the solid fine particles and the ionizing radiation curable resin, thus allowing the refractive index of the refractive index layer containing the fine particles to be reduced. In other words, the hollow silica fine particles with voids have a refractive index as low as 1.20-1.45 compared to hollow silica fine particles containing no air in the interior (refractive index n=~1.46), thus allowing the refractive index of the refractive index layer to be no greater than 1.45.

The thickness of the outer shell layers of the hollow fine particles of the invention is normally greater than 1 nm, and is preferably greater than 2 nm. An outer shell layer thickness in this range permits satisfactory covering of the fine particles, and can prevent infiltration of other components such as the ionizing radiation curable resin into the fine particles. As a result, the hollow or porous structure in the interiors is not reduced, making it easier to obtain the effect of the low refractive index. The thickness of the outer shell layers of the hollow fine particles is also usually less than 30 nm and is preferably less than 20 nm. An outer shell layer thickness in this range can provide a low refractive index effect without lowering the porosity of the fine particles.

<3-1-2. Process for Production of Hollow Fine Particles>

An example of a process for production of hollow silica fine particles will now be explained, as a process for production of hollow fine particles.

The type of hollow silica fine particles is not particularly restricted so long as they have a refractive index of less than 1.44. As such hollow silica fine particles, there may be mentioned the complex oxide sol or hollow silica fine particles disclosed in Japanese Unexamined Patent Publication HEI No. 7-133105 and Japanese Unexamined Patent Publication No. 2001-233611, for example. Such hollow silica fine particles may be produced, specifically, by the following first to third steps, as well as by the fourth step, described below.

As the first step, separate aqueous alkali solutions of a silica starting material and inorganic oxide starting material other than silica are prepared, or a mixed aqueous solution containing both starting materials is prepared. The aqueous solution is then gradually added to an aqueous alkali solution with a pH of greater than 10 while stirring, according to the proportion desired for the complex oxide. This yields colloidal particles composed of the complex oxide. A dispersion containing seed particles may be used as the starting material instead of the first step.

As used herein, seed particles are particles that can be used to form a hollow or porous structure during preparation of hollow fine particles, and the particles are used as seed to grow the particles into nucleus particles. Next, all or a portion of the nucleus particles are removed in the second step to form the hollow or porous structure. Using seed particles facilitates control of the particle sizes of the growing particles, to obtain fine nucleus particles with uniform particle sizes.

Next, in the second step, at least some of the elements other than silicon and oxygen are selectively removed from the colloidal particles composed of the complex oxide obtained in the previous step. Specifically, the elements in the complex oxide are removed by dissolution using a mineral acid or organic acid, or they are contacted with a cation-exchange resin for ion exchange removal. This yields colloidal particles of the complex oxide having a portion of the elements removed.

Subsequently, in the third step, a hydrolyzable organic silicon compound or silicic acid solution is added to the colloidal particles of the complex oxide from which a portion of the elements have been removed and which has been obtained in the previous step, to cover the surfaces of the colloidal particles with a polymer of the hydrolyzable organic silicon compound or silicic acid solution. This produces silica fine particles as a complex oxide sol, as described in the publications mentioned above.

As hydrolyzable organic silicon compounds, there may be used alkoxysilanes represented by the general formula $R_nSi$ (OR')$_{4-n}$ (where R and R' represent hydrocarbon groups such as alkyl, aryl, vinyl or acryl, and n=0, 1, 2 or 3). Most preferred for use are tetraalkoxysilanes such as tetramethoxysilane, tetraethoxysilane and tetraisopropoxysilane.

The method of addition may involve, for example, adding a solution containing a small amount of an alkali or acid added as a catalyst to a mixture of the alkoxysilane, purified water and alcohol, to the colloidal particles obtained in the second step, and hydrolyzing the alkoxysilane to produce a silicic acid polymer that is deposited on the surfaces of the colloidal particles. The alkoxysilane, alcohol and catalyst may also be added simultaneously to the colloidal particles. As alkali catalysts, there may be used ammonia, alkali metal hydroxides and amines. As acid catalysts, there may be used various inorganic acids and organic acids.

When the dispersing medium for the colloidal particles is water alone, or when the proportion of water with respect to the organic solvent is high, coating treatment can be accomplished with a silicic acid solution. A silicic acid solution is an aqueous solution of a low silicic acid polymer that has been dealkalized by ion exchange treatment of an aqueous solution of an alkali metal silicate such as water glass. When a silicic acid solution is used, a prescribed amount of the silicic acid solution is added to the colloidal particles and an alkali is simultaneously added for polymerization and gelling of the silicic acid solution, whereby the silicic acid polymer is deposited onto the colloidal particle surfaces. The silicic acid solution may also be used in combination with the alkoxysilane for coating treatment. The amount of organic silicon compound or silicic acid solution added is an amount sufficient to cover the surfaces of the colloidal particles with each polymer.

As a fourth step, the silica fine particles obtained from the third step are preferably subjected to hydrothermal treatment at 50-300° C. A hydrothermal treatment temperature of 50° C. or higher will effectively lower the content of the alkali metal oxide and/or ammonia in the finally obtained silica fine particles or silica fine particles dispersion, thus improving the shelf life of the coating solution and the strength of the coating. Also, limiting the hydrothermal treatment temperature to 300° C. or lower will improve the shelf life of the coating solution and the strength of the coating, and will prevent aggregation of the silica fine particles.

The silica fine particles obtained up to the third step will tend to have low molecular compounds as ionic impurities on the fine particle surfaces. The ionic impurities are those present in the fine particle starting material and derived from the additives added during the production steps. Removing the ionic impurities by hydrothermal treatment in the fourth step will help limit the level of impurities on the silica fine particle surfaces to below the prescribed level.

Specifically, the content of alkali metal oxides in the silica fine particles is preferably less than 10 ppm, even more preferably less than 5 ppm and most preferably less than 2 ppm. The alkali metal oxide content is most preferably less 5 ppm in order to improve the stability of the coating solution containing the silica fine particles. This will limit increase in the viscosity of the coating solution even when the coating solution is stored for long periods, thus resulting in an excellent shelf life. If the alkali metal oxide content is within the range specified above, it is presumed that this will more reliably produce reaction between the silica fine particle surfaces and the compound such as a silane coupling agent used to introduce the crosslink-forming groups, thus resulting in improved strength of the refractive index layer (this will be described below in regard to the silane coupling agent). Also, by limiting the alkali metal oxide content to less than 10 ppm, it is possible to improve the film formability and the strength of the obtained film. The alkali metal oxide content is the content of $M_2O$ (where M represents an alkali metal element), and it can usually be measured by atomic absorption or ICP MS.

The content of ammonia (including ammonium ion) in the silica fine particles is preferably less than 2000 ppm, even more preferably less than 1500 ppm and most preferably less than 1000 ppm. The ammonia content is most preferably less than 1500 ppm in order to improve the stability of the coating solution containing the silica fine particles. This will limit increase in the viscosity of the coating solution even when the coating solution is stored for long periods, thus resulting in excellent shelf life. If the ammonia content is within the range specified above, it is presumed that this will more reliably produce reaction between the silica fine particle surfaces and the compound such as a silane coupling agent used to introduce the crosslink-forming groups, thus resulting in improved strength of the refractive index layer. Also, by limiting the ammonia content to less than 2000 ppm, it is possible to improve the film formability and the strength of the obtained film. The content of ammonia (including ammonium ions) in the silica fine particles is the content as NH3, and it can usually be measured by chemical analysis.

The fourth step (hydrothermal treatment step) can be repeated several times in order to limit the content of impurity compounds in the silica fine particles to the range specified above. By repeating hydrothermal treatment, it is possible to reduce the content of alkali metal oxides and/or ammonia (including ammonium ions) in the obtained silica-based fine particles.

<3-2-1. Solid Fine Particles>

The solid fine particles of the invention are fine particles without pores or hollow sections in the fine particles. Because they lack voids, they are more resistant to pressure exerted on the fine particles (external pressure) than hollow fine particles, and thus have excellent pressure resistance. They can, therefore, improve the mar-proofness of the refractive index layer containing the solid fine particles.

The material of the solid fine particles of the invention may be inorganic or organic. An inorganic material is preferably used from the viewpoint of improving the strength of the refractive index layer against pressing force.

When the solid fine particles are formed of an inorganic material, the material of the solid fine particles is preferably at least one selected from the group consisting of metal oxides, metal nitrides, metal sulfides and metal halides. Using such materials for the solid fine particles can stably yield high-strength fine particles.

More preferably, the material of the solid fine particles is a metal oxide or metal halide, and most preferably a metal oxide or metal fluoride. Using such materials can further lower the refractive index, and provide more satisfactory performance as an anti-reflection layer.

As metal elements to be used for metal oxides, there are preferred Na, K, Mg, Ca, Ba, Al, Si and B, with Mg, Ca, Al and Si being more preferred. Using such metal elements can increase the strength and lower the refractive index. One type of metal element may be used, or two or more different ones may be used in combination.

According to the invention, the refractive index of the solid fine particles is preferably lower than the refractive index of the ionizing radiation curable resin in order to further lower the refractive index of the refractive index layer. The refractive index of silica ($SiO_2$) is 1.42-1.46, which is lower than the refractive index of 1.49-1.55 for an acrylic-based resin that is preferably used as the ionizing radiation curable resin. Therefore, silica ($SiO_2$) is most preferably used as the material of the solid fine particles.

<3-2-2. Process for Production of Solid Fine Particles>

The solid fine particles may be produced by a known production process in the prior art As examples of such processes, there may be mentioned chemical processes such as sol-gel processes and physical processes such as gas vapor deposition processes.

<3-3. Relationship Between Reactive Hollow Fine Particles and Reactive Solid Fine Particles>

According to one embodiment of the low refractive index layer of the invention, the mean particle size F of the reactive solid fine particles and the mean particle size G of the reactive hollow fine particles in the low refractive index layer preferably have the following relationship:

10 nm$\leq F \leq$40 nm;

30 nm$\leq G \leq$60 nm; and $F \leq G$ and more preferably $F+10 \leq G$.

The low refractive index layer of the invention preferably contains 5-50 parts by weight of hollow fine particles based on 100 parts by weight of solid fine particles. Within this range, the reactive solid fine particles fill in the gaps between the reactive hollow fine particles in the low refractive index layer, thus allowing more dense packing and providing a particularly high effect of improving the mar-proofness and especially steel wool resistance of the layer surface.

According to another embodiment of the low refractive index layer of the invention, the mean particle size F of the reactive solid fine particles and the mean particle size G of the reactive hollow fine particles in the low refractive index layer preferably have the following relationship:

30 nm$< F \leq$100 nm;

30 nm$\leq G \leq$60 nm; and $F > G$ and more preferably $F \geq G+10$.

The low refractive index layer of the invention preferably contains 5-50 parts by weight of hollow fine particles based on solid fine particles. This will increase the volume occupancy of the solid fine particles in the low refractive index layer, resulting in a notably high effect of reducing the reflectance of the low refractive index layer.

With hollow fine particles and solid fine particles used in conventional surface treatment, larger sizes of the solid fine particles than the hollow fine particles tend to produce aggregation between the similar fine particles because of the low affinity between different fine particles, and consequently, the haze of the refractive index layer surface is increased. In contrast, using hollow fine particles and solid fine particles with surface treatment according to the invention allows high affinity even between different fine particles even when the solid fine particles are larger than the hollow fine particles, thus providing increased homogeneity and more dense packing in the layer. Moreover, since fine particles with large particle sizes are combined, the gaps between fine particles are increased and air becomes included. Consequently, the low refractive index layer of the invention satisfying the aforementioned ranges exhibits a particularly high effect of reflectance reduction.

<3-4. Crosslink-Forming Group>

The fine particle surfaces of the hollow fine particles and solid fine particles according to the invention either have the same structure or, even if they have differing structures, the structures are modified with crosslink-forming groups that are similar in that the ionizing radiation curable groups have the same backbone and differ only in the presence or absence of one $C_{1-3}$ hydrocarbon group, the bonding groups for the fine particle surfaces have the same backbone and differ only in the presence or absence of one $C_{1-3}$ hydrocarbon group among the groups other than the spacers bonded to the bonding groups, and the spacer portions have the same backbone and differ only in the presence or absence of one $C_{1-3}$ hydrocarbon group or one functional group with 1-3 constituting atoms including heteroatoms and excluding hydrogen, or differ only in 1-2 carbons for the carbon chain length of the backbone. Coupling agents are examples of compounds for introduction of crosslink-forming groups into the fine particle surfaces, and silane coupling agents are preferred coupling agents. A silane coupling agent is composed of a bonding group for the fine particle surfaces, a space portion and an ionizing radiation curable group.

The solid fine particles and hollow fine particles having crosslink-forming groups help prevent aggregation between reactive hollow fine particles and aggregation between reactive solid fine particles, so that the reactive hollow fine particles and reactive solid fine particles will pack more evenly and densely to improve the hardness of the low refractive index layer.

As preferred silane coupling agents for use in the invention, there may be mentioned 3-methacryloxypropyltrimethoxysilane, 3-methacryloxypropyltriethoxysilane, 3-acryloxypropyltrimethoxysilane, 3-acryloxypropyltriethoxysilane, 3-methacryloxypropylmethyldimethoxysilane, 3-methacryloxypropylmethyldiethoxysilane, 2-methacryloxypropyltrimethoxysilane and 2-methacryloxypropyltriethoxysilane.

<3-4-1. Bonding Group>

Bonding groups are sites where the crosslink-forming groups bond to the hollow fine particles and solid fine particles, and they are groups that can form covalent bonds between the hollow fine particles and solid fine particles. As a specific example with 3-methacryloxypropyltrimethoxysilane as the silane coupling agent, the —$Si(OCH_3)_3$ portion 2 of the 3-methacryloxypropyltrimethoxysilane as the silane coupling agent 1 in chemical formula (6) below reacts by hydrolysis to form a bonding group.

[Chemical formula 7]

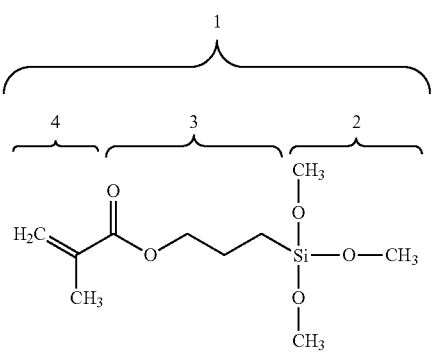

(6)

<3-4-2. Spacer Portion>

The spacer portion according to the invention is a site in the crosslink-forming group that connects the bonding group with the ionizing radiation curable group described below, and it has the function of imparting the crosslink-forming group with affinity for the ionizing radiation curable resin which is composed of an organic component. As a specific example with 3-methacryloxypropyltrimethoxysilane as the silane coupling agent, the —COO(CH$_2$)$_3$ portion 3 of the 3-methacryloxypropyltrimethoxysilane as the silane coupling agent 1 in chemical formula (6) above corresponds to the spacer portion.

<3-4-3. Ionizing Radiation Curable Group>

The ionizing radiation curable group according to the invention is a functional group that, under ionizing radiation, promotes polymerization reaction or crosslinking reaction with the ionizing radiation curable resin as an essential component for forming the low refraction layer, to accomplish curing. The curable group has the function of improving the refractive index layer strength by polymerization with the ionizing radiation curable resin.

As examples of such ionizing radiation curable groups, there may be mentioned groups that undergo such reactions as polymerization reactions including photoradical polymerization, photocationic polymerization or photoanionic polymerization, or addition polymerization and condensation polymerization that proceed by photodimerization. In particular, groups with ethylenic unsaturated bonds such as (meth)acryloyl, vinyl and allyl can undergo photoradical polymerization reaction by exposure to ionizing radiation such as ultraviolet rays or an electron beam, either directly or indirectly by the action of an initiator, and therefore their handling, including handling in the photocuring step, is easier. Among these, (meth)acryloyl is preferred as the ionizing radiation curable group since it allows excellent productivity and facilitates control of the mechanical strength of the cured refractive index layer.

In a specific example with 3-methacryloxypropyltrimethoxysilane as the silane coupling agent, the CH$_2$=C(CH$_3$)— portion 4 of the 3-methacryloxypropyltrimethoxysilane as the silane coupling agent 1 in chemical formula (6) above corresponds to the ionizing radiation curable group.

FIGS. 2 and 3 are schematic drawings of the mechanism of modification of the fine particle surfaces by the crosslink-forming groups, for a case where a silane coupling agent is used as the compound for introduction of the crosslink-forming group.

In FIG. 2, in the first stage, the silane coupling agent 101 undergoes hydrolysis 110 to produce crosslink-forming groups 102 with bonding groups, and then in the second stage, the crosslink-forming groups 102 participate in hydrogen bonding 111 with the polar groups 103 on the fine particle surface, thus forming crosslink-forming groups 104 by hydrogen bonding with the polar groups on the fine particle surface.

Then in the third stage, the hydrogen bonded crosslink-forming groups 104 are subjected to heating and dehydration reaction 112 to produce the desired fine particle 105 with the surface modified with crosslink-forming groups.

In FIG. 3, in the first stage, the silane coupling agent 101 undergoes hydrolysis 110 to produce crosslink-forming groups 102 with bonding groups, and then in the second stage, the crosslink-forming groups 102 participate in dehydrating condensation reaction 113 to produce dehydration condensed crosslink-forming groups 106.

Then in the third stage, the dehydration condensed crosslink-forming groups 106 participate in hydrogen bonding 111 with the polar groups 103 on the fine particle surface to form a dehydration condensed body 107 having crosslink-forming groups hydrogen bonded with the polar groups on the fine particle surface.

In the fourth stage, the dehydration condensed body 107 is subjected to heating and dehydration reaction 112 to produce the desired fine particle 108 having the surface modified with dehydration condensed crosslink-forming groups.

The amount of silane coupling agent used for treatment of the silica fine particles is preferably greater than 1 wt % and more preferably greater than 2 wt % based on the silica fine particles. This range will result in satisfactory affinity of the silica fine particles for the ionizing radiation-curable resin. On the other hand, the amount of silane coupling agent used for treatment of the silica fine particles is preferably less than 200 wt % and more preferably less than 150 wt % based on the silica fine particles. This range will satisfactorily suppress production of free silane coupling agent that has not participated in treatment of the silica fine particles, thus improving the recovery property against external impacts and helping to prevent cracks and damage.

The method of modifying the silica fine particle surfaces with the silane coupling agent is not particularly restricted so long as it can improve the dispersibility in the organic solvent and the affinity with the ionizing radiation curable resin, and any conventional treatment method may be employed. For example, a prescribed amount of silane coupling agent may be added to a dispersion of the silica fine particles, with acid treatment, alkali treatment or heat treatment if necessary, for modification of the silica fine particle surfaces.

When a silane coupling agent other than those mentioned above is used, its suitability may be determined based on whether the modified fine particle surfaces are hydrophobic or hydrophilic. As a specific method of determining suitability, the silane coupling agent may be used to modify the fine particle surfaces and then dried, after which an agate mortar may be used to produce a fine powder with a size of less than 1 mm, and its ability to float on water determined.

According to the invention, it is not necessary to introduce all of the silane coupling agent on the silica fine particle surfaces, and some of it may exist as monomer or condensate in the layer-forming composition containing the ionizing radiation curable resin. Since the silane coupling agent has excellent affinity with the ionizing radiation curable resin and silica fine particles, it can stably disperse the silica fine particles in the composition. The silane coupling agent becomes incorporated into the film and acts as a crosslinking agent during curing by ionizing radiation or heat, so that the performance of the refractive index layer can be more easily improved than when the entire amount of the silane coupling agent is introduced into the silica fine particle surfaces.

The above explanation assumes that the hollow fine particles and solid fine particles are formed by silica, but when the fine particles are formed of a material other than silica, surface modification that is suitable for each material may be carried out.

Even compounds other than coupling agents may be used as compounds for introduction of crosslink-forming groups according to the invention, so long as they are provided with the properties specified above.

<3-5. Curable Binder System of Low Refractive Index Layer>

The constituent components of the curable binder system of the low refractive index layer according to the invention are those other than the aforementioned reactive hollow fine particles, reactive solid fine particles and the at least one leveling agent (leveling agents B) of a different type from the leveling agent A in the hard coat layer-forming composition, which contain as an essential component, an ionizing radiation curable resin as the curable resin in the binder, if necessary with a curable resin other than the ionizing radiation curable resin, a non-polymerizable polymer component, a polymerization initiator and the like forming the matrix of the low refractive index layer after curing.

<3-5-1. Ionizing Radiation Curable Resin>

According to the invention, the ionizing radiation curable resin is a resin that can react and cure upon exposure to ionizing radiation. The resin is preferably translucent to allow transmission of light when formed into a coated film.

The content of the ionizing radiation curable resin in the low refractive index layer is preferably greater than 10 wt %, even more preferably greater than 20 wt % and most preferably greater than 30 wt %. It is also preferably less than 70 wt %, even more preferably less than 60 wt % and most preferably less than 50 wt %. Within this range, sufficient film strength for practical use will be exhibited while obtaining a low refractive index.

The material used to form the ionizing radiation curable resin may be any material that has a suitable refractive index for ensuring anti-reflection performance, that can ensure adhesion with the optically transparent base material, and that can ensure mechanical strength of the refractive index layer.

The ionizing radiation curable resin preferably contains a compound with at least one hydrogen bond-forming group in the molecule and with three or more ionizing radiation curable groups. As a result, at least a portion of the cured ionizing radiation curable resin will be formed of a compound with one or more hydrogen bond-forming groups and three or more ionizing radiation curable groups in the molecule.

Using a compound with an ionizing radiation curable group that cures by ionizing radiation and a hydrogen bond-forming group that thermosets alone or in combination with a curing agent, will facilitate chemical bonding such as crosslinking in the coated film and efficient curing of the coated film, when the low refractive index layer-forming composition containing the ionizing radiation curable resin has been coated and dried on the surface of the coated article and subjected to ionizing radiation exposure and heat. When the hollow fine particles and solid fine particles are formed of inorganic fine particles (especially silica), the hydroxyl groups on the surfaces of the fine particles and the aforementioned compound will readily form covalent bonds, thus helping to improve the strength of the low refractive index layer. In this case, crosslinking will be formed between the hollow fine particles or solid fine particles and the cured ionizing radiation curable resin.

As examples of ionizing radiation curable groups to be used in the compound with at least one hydrogen bond-forming group and three or more ionizing radiation curable groups in the molecule, there may be mentioned functional groups that undergo such reactions as polymerization reactions including photoradical polymerization, photocationic polymerization, and photoanionic polymerization, or addition polymerization that proceed by photodimerization, or condensation polymerization. In particular, groups with ethylenic unsaturated bonds such as (meth)acryloyl, vinyl and allyl can produce photoradical polymerization reaction by exposure to ionizing radiation such as ultraviolet rays or an electron beam, either directly or indirectly by the action of an initiator, and therefore their handling, including handling in the photocuring step, is easier. (Meth)acryloyl is preferred among such functional groups since it has excellent productivity and facilitates control of the mechanical strength of the cured refractive index layer.

As examples of hydrogen bond-forming groups to be used in the compound with at least one hydrogen bond-forming group and three or more ionizing radiation curable groups in the molecule, there may be mentioned alkoxy, hydroxyl, carboxyl, amino and epoxy groups. Hydroxyl is preferred among such functional groups because of its excellent affinity with inorganic fine particles (especially silica) when the hollow fine particles or solid fine particles are formed of inorganic fine particles, by which it can improve the dispersibility of the inorganic fine particles in the ionizing radiation curable resin. Hydroxyl groups are easily introduced into the compound, and when the hollow fine particles or solid fine particles are inorganic fine particles, adsorption onto the hydroxyl groups on the fine particle surfaces results in even dispersion in the coating solution and film. Therefore, the coating solution life is extended and it is possible to form a film that is resistant to loss of film transparency due to aggregation of hollow fine particles or solid fine particles, and that is resistant to reduction in film strength.

The compound with at least one hydrogen bond-forming group and three or more ionizing radiation curable groups in the molecule can normally be a compound with hydrogen bond-forming groups such as hydroxyl groups. The hydrogen bond-forming groups may be present in part of the monomer as by-products of synthesis. Specifically, there may be mentioned di(meth)acrylates such as ethyleneglycol di(meth)acrylate and pentaerythritol di(meth)acrylate monostearate; tri(meth)acrylates such as trimethylolpropane tri(meth)acrylate and pentaerythritol tri(meth)acrylate; and polyfunctional (meth)acrylates such as pentaerythritol tetra(meth)acrylate derivatives and dipentaerythritol penta(meth)acrylates.

In addition to these, there may also preferably be used oligomers containing hydrogen bond-forming groups and having a number-average molecular weight (polystyrene-based number-average molecular weight measured by GPC (Gel Permeation Chromatography)) of less than 20,000, such as epoxy acrylate resins with hydroxyl residues (for example, EPDXY ESTER by Kyoeisha Chemical Co., Ltd. or LIPDXY by Showa HighPolymer Co., Ltd.), urethane acrylate resins (resins obtained by polyaddition of various monomers with isocyanato and hydroxyl groups via urethane bonds; for example, "SHIKOHR" by Nippon Synthetic Chemical Industry Co., Ltd. and "URETHANE ACRYLATE" by Kyoeisha Chemical Co., Ltd.).

These monomers and oligomers have excellent effects of increasing film crosslink density, and because their number-average molecular weights are less than 20,000, they exhibit high flowability and excellent coating suitability.

If necessary, there may also preferably be used (co)polymers containing monomers with hydrogen bond-forming groups, which are reactive polymers having number-average molecular weights of greater than 20,000 and having (meth)acrylate groups on the main chain or side chains. Such reactive polymers for use may be commercially available products such as MACROMONOMER (product of ToaGosei Co., Ltd.), or a copolymer of methyl methacrylate and glycidyl methacrylate may be pre-polymerized and the glycidyl groups of the copolymer and the carboxyl groups of methacrylic acid or acrylic acid subsequently condensed to obtain a reactive polymer with (meth)acrylate groups. According to the invention, "(co)polymer" means a polymer and/or copolymer.

Also according to the invention, a monomer and/or oligomer with a number-average molecular weight of less than 20,000 and a polymer with a number-average molecular weight of more than 20,000 may appropriately be combined to easily adjust the various properties of the refractive index layer.

The content of the compound with at least one hydrogen bond-forming group and three or more ionizing radiation curable groups in the molecule is preferably greater than 10 parts by weight and even more preferably greater than 30 parts by weight, based on 100 parts by weight of the ionizing radiation curable resin. The content of the compound is also preferably less than 100 parts by weight based on 100 parts by weight of the coating solution. The mechanical strength of the refractive index layer can be increased if the content is within this range.

<3-6. Leveling Agent of Low Refractive Index Layer>

The low refractive index layer of the invention also contains a leveling agent A in the hard coat layer-forming composition in addition to the leveling agent B in the low refractive index layer-forming composition before curing, for the reasons explained above. The leveling agent B included in the curable binder system of the low refractive index layer is preferably a reactive silicon-based leveling agent exhibiting reactivity with at least the binder and having compatibility with any of the ionizing radiation-curable resin, reactive hollow fine particles and reactive solid fine particles.

If the molecular weight of the reactive silicon-based leveling agent is too low (a molecular weight of less than 5000), it will not migrate easily into the layer surface and the function will not be exhibited. If the molecular weight is too high (a molecular weight of greater than 100,000), compatibility with the binder in the low refractive index layer-forming composition will be poor and a satisfactory coated film will not be obtained. The weight-average molecular weight will, therefore, usually be 5000-100,000, preferably 10,000-50,000 and more preferably 10,000-20,000. The weight-average molecular weight may be measured in the same manner as for the non-reactive fluorine-based leveling agent mentioned above.

As silicon-based leveling agents, there are preferred compounds having the structure represented by the following chemical formula (1).

[Chemical Formula 8]

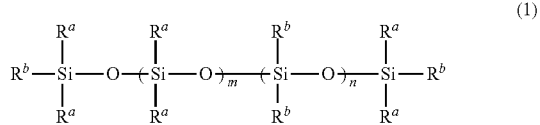

(1)

In the formula, $R^a$ represents a $C_{1-20}$ alkyl group such as methyl or phenyl, $R^b$ represents a $C_{1-20}$ alkyl, $C_{1-3}$ alkoxy or polyether-modified group which is either unsubstituted or substituted with an amino, epoxy, carboxyl, hydroxyl, acryloyl and/or methacryloyl group, and each $R^a$ and $R^b$ may be the same or different. The letters m and n both represent integers of 0-200.

In the compound represented by chemical formula (1), the $R^a$ groups, $R^b$ groups and Ra and $R^b$ groups may be mutually identical or different. As an example, one $R^a$ in chemical formula (1) may be methyl and the remaining $R^a$ groups ethyl, and one $R^b$ may be propyl and the remaining $R^b$ groups methyl. As another example, all of the $R^a$ groups in chemical formula (1) may be methyl, and all of the $R^b$ groups may be ethyl.

These silicon compounds may be used alone or in combinations of two or more, depending on the expected effect. By appropriately combining such compounds, it is possible to adjust the properties including antifouling properties, water and oil repellency, slidability, rubfastness, durability and leveling properties, in order to exhibit the desired function.

Silicon compounds with a basic backbone having the chemical formula shown above are generally known to have low surface tension and exhibit excellent water-repellency and releasability, but introducing various functional groups on the side chains or at the ends can impart additional effects. For example, introduction of amino, epoxy, carboxyl, hydroxyl, (meth)acryloyl or alkoxy groups can improve reactivity, thus facilitating formation of crosslinking by chemical reaction with the ionizing radiation-curable resin (binder).

Such silicon compounds can be obtained as commercial products, and for example, various modified silicone oils can be purchased according to the desired purpose, such as the polyether-modified silicone oil TSF4460 (trade name of GE Toshiba Silicone) or X22-164E (trade name of Shin-Etsu Chemical Co., Ltd.).

The content of leveling agent B in the low refractive index layer-forming composition is preferably from 0.01 wt % to 5 wt %, and more preferably from 0.03 wt % to 3 wt %. A content of more than 0.01 wt % can impart sufficient flatness and slidability to the low refractive index layer surface. If it is more than 5 wt %, phase separation will tend to occur with the leveling agent A which migrates from the half-cured hard coat layer into the low refractive index layer, and this will undesirably lead to reduced transparency due to increased opacity and haze of the low refractive index layer.

The low refractive index layer may also contain binder components other than the ionizing radiation curable resin described above, if necessary. In addition, the low refractive index layer-forming composition described hereunder may further contain components such as solvents, polymerization initiators, curing agents, crosslinking agents, ultraviolet screeners, ultraviolet absorbers and the like. Polymerization initiators and curing agents will now be explained as examples of such materials.

<3-7. Other Components>

A polymerization initiator is not necessarily required according to the invention. However, when the ionizing radiation curable resin and the ionizing radiation curable groups of other optional binder components do not easily undergo direct polymerization reaction by ionizing radiation exposure, a suitable initiator is preferably used in consideration of the reaction system comprising the reactive hollow fine particles, reactive solid fine particles and other binder components.

For example, a photoradical polymerization initiator is used when the ionizing radiation curable group of the ionizing radiation-curable resin composition is a (meth)acryloyl group. As examples of photoradical polymerization initiators, there may be mentioned acetophenones, benzophenones, ketals, anthraquinones, thioxanthones, azo compounds, peroxides, 2,3-dialkyldione compounds, disulfide compounds, thiuram compounds, fluoroamine compounds and the like. More specifically, there may be mentioned 1-hydroxy-cyclohexyl-phenyl-ketone, 2-methyl-1-[4-(methylthio)phenyl]-2-morpholinopropan-1-one, benzyldimethylketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, 2-hydroxy-1-{4-[4-(2-hydroxy-2-methyl-propionyl)-benzyl]-phenyl}-2-methyl-propan-1-one and benzophenone. Preferred among these are 1-hydroxy-cyclohexyl-phenyl-ketone, and 2-methyl-1-[4-(methylthio)phenyl]-2-morpholinopropan-1-one or 2-hydroxy-1-{4-[4-(2-hydroxy-2-methyl-propionyl)-benzyl]- phenyl}-2-methyl-propan-1-one, because they initiate and promote polymerization reaction under ionizing radiation exposure. Any of the aforementioned photoradical polymerization initiators may be used alone, or in combination.

Commercial products may be used, such as the trade name IRGACURE 127 (IRGACURE is a registered trade name) by Ciba Specialty Chemicals, Inc. as 2-hydroxy-1-{4-[4-(2-hydroxy-2-methyl-propionyl)-benzyl]-phenyl}-2-methyl-propan-1-one.

When a photoradical polymerization initiator is used, it is preferably added at from 3 parts by weight to 15 parts by weight based on 100 parts by weight as the total of the binder composed mainly of the ionizing radiation curable resin.

A curing agent is usually added to promote thermosetting reaction of the hydrogen bond-forming groups present in part of the ionizing radiation curable resin. When the hollow fine particles and solid fine particles are formed of silica, and at least a portion of the solid fine particles is to be used as surface-treated silica fine particles, a curing agent is added to promote thermosetting reaction of the silanol groups present on the surface, the silane coupling agent used for the surface treatment and the unreacted portion of the silane coupling agent condensate.

When the thermosetting polar groups are hydroxyl groups, the curing agent will usually be a compound with basic groups such as methylolmelamine, or a compound with hydrolyzable groups that generate hydroxyl groups by hydrolysis, such as a metal alkoxide. Amine, nitrile, amide and isocyanate groups are preferred as basic groups, and alkoxy groups are preferred as hydrolyzable groups. In the latter case, aluminum compounds represented by chemical formula (7) below and/or their derivatives are particularly preferred for satisfactory compatibility with hydroxyl groups.

$$AlR_3 \qquad \text{Chemical formula (7)}$$

[In chemical formula (7), the residues $R_3$ may be the same or different and may be halogens, alkyl with no greater than 10 and preferably no greater than 4 carbon atoms, alkoxy, acyloxy or hydroxy, all or some of which groups may be replaced with chelate ligands.]

These compounds may be selected from among aluminum compounds and/or oligomers and/or complexes derived therefrom, as well as inorganic or organic acid aluminum salts.

Specifically, there may be mentioned aluminum-sec-butoxide, aluminum-iso-propoxide, and their acetylacetones, ethyl acetoacetates, alkanolamines or glycols, and complexes with their derivatives.

When a curing agent is used, it is preferably added at from 0.05 part by weight to 30.0 parts by weight based on 100 parts by weight of the curable binder system composed mainly of the ionizing radiation curable resin.

<3-8. Low Refractive Index Layer-Forming Composition>

The low refractive index layer-forming composition is prepared by dispersing a mixture of the ionizing radiation curable resin and the at least one leveling agent B different from the leveling agent A in the hard coat layer-forming composition, as the essential components described above, with various desired components as necessary, in a solvent by an ordinary preparation method. The composition may then be coated on the half-cured hard coat layer and dried and cured to form the low refractive index layer. A method for preparing the solvent and the low refractive index layer-forming composition will now be explained.

<3-8-1. Solvent>

When a relatively large amount of the ionizing radiation curable resin is used as the binder, the monomer and/or oligomer in the resin will be able to also function as a liquid medium, and therefore a coating solution may be prepared without using a solvent. Therefore, a solvent may be used to suitably dissolve and disperse the solid components, and to adjust the concentration to prepare a layer-forming composition with excellent coatability.

The solvent used to dissolve and disperse the solid components of the low refractive index layer is not particularly restricted, and there may be mentioned various organic solvents including alcohols such as isopropyl alcohol, methanol and ethanol; ketones such as methyl ethyl ketone, methyl isobutyl ketone and cyclohexanone; esters such as ethyl acetate and butyl acetate; halogenated hydrocarbons; and aromatic hydrocarbons such as toluene and xylene; as well as mixtures of the foregoing.

Preferred for use among these solvents are ketone-based organic solvents. Preparing the layer-forming composition using a ketone-based solvent will facilitate thin and even coating onto the surface of transparent base materials, and the evaporation rate of the solvent after coating will be suitable enough to prevent drying irregularities, thus facilitating formation of large-area coated films with uniform thicknesses.

Another reason that ketone-based organic solvents are preferred for the solvent is that they allow uniform coating and prevent coating unevenness during formation of low refractive index layers on hard coat layers having microirregularities on the surface.

As ketone-based solvents, there may be mentioned a single solvent comprising one type of ketone, a mixed solvent comprising two or more different ketones, and a complex mixed solvent that contains other solvents in addition to one or more different ketone-based solvents and still retain the properties of the ketone solvents. Complex mixed solvents are preferred among these, in which case the ketone-based solvents are preferably used in a proportion of greater than 70 wt % and especially greater than 80 wt % of the total solvent.

The amount of solvent may be appropriately adjusted to a concentration that allows homogeneous dissolution and dispersion of the components, prevents aggregation of the hollow fine particles or solid fine particles even when allowed to stand after preparation, and is not too dilute during coating. The amount of solvent added is preferably reduced to prepare a high-concentration composition, within a range that satisfies these conditions. This will permit storage with small volumes and dilution to a suitable concentration for use in the coating operation. By using the solvent at 50-95.5 parts by weight with respect to 0.5-50 parts by weight of the total solid content of the low refractive index layer, and more preferably using the solvent at 70-90 parts by weight with respect to 10-30 parts by weight of the total solid content of the low refractive index layer, based on 100 parts by weight of the total of the solid content and solvent in the low refractive index layer, it is possible to obtain a low refractive index layer-forming composition with particularly excellent dispersion stability and suitability for long-term storage.

<3-8-2. Preparation of Low Refractive Index Layer Composition>

The low refractive index layer-forming composition will usually be prepared by dispersing a mixture of the ionizing radiation curable resin and the at least one leveling agent (leveling agent B) different from the leveling agent A in the hard coat layer-forming composition, as the essential components described above, with various desired components as necessary, in a solvent by an ordinary preparation method. The mixing and dispersion may be accomplished using a paint shaker or bead mill.

<4. Migration Layer>

The migration layer in the antireflection film of the invention is the region where the hard coat layer and the low refractive index layer are mingled with each other for its formation. The migration layer is formed by coating one side of the transparent base material with the hard coat layer-forming composition and half-curing it, and then coating the half-cured hard coat layer with the low refractive index layer-forming composition and fully curing it. The migration layer forms in most cases by the half-curing step.

The hard coat layer components and low refractive index layer components infiltrate into the migration layer, producing an effect of increasing the adhesiveness between the hard coat layer and the low refractive index layer, and imparting mar-proofness. When the difference in hardness between the hard coat layer and the low refractive index layer is extreme (a hard coat layer and a soft low refractive index layer), the formed migration layer has a hardness that is intermediate between that of the hard coat layer and the low refractive index layer and thus exhibits a cushion property, thereby improving the mar-proofness of the low refractive index layer without allowing stress to concentrate on the low refractive index layer.

The migration layer can be confirmed by a TEM photograph of the cross-section in the direction of thickness of the antireflection film. In the TEM photograph, the migration layer is seen as a regional layer differing in light and shade from the hard coat layer and low refractive index layer.

<5. Process for Production of Antireflection Film>

The process for production of an antireflection film according to the invention is characterized by coating one side of a transparent base material with a hard coat layer-forming composition comprising a binder and at least one leveling agent A, and half-curing it, and then coating the half-cured hard coat layer with a low refractive index layer-forming composition comprising a binder and a leveling agent B that is different from the one included in the hard coat layer-forming composition, and then completing the curing.

In the half-cured state, the solvent of the composition easily permeates and the leveling agent and components other than the leveling agent composing the hard coat layer and low refractive index layer migrate between the layers, through the half-cured migration layer.

Normally, the leveling agents will undergo phase separation if two (or more) different leveling agents are simply included in the hard coat layer-forming composition and low refractive index layer-forming composition and mixed in the composition before coating, or the final necessary function (antifouling property, fingerprint wiping, mar-proofness) may not be obtained, but migration of one of the leveling agents through a half-cured state allows the two different leveling agents (leveling agent A and leveling agent B) in the low refractive index layer to be evenly distributed without phase separation and opacity, and particularly to be uniformly distributed on the surface of the low refractive index layer. While the reason for this is not fully understood, it is believed that when two or more different leveling agents are normally used in combination, each leveling agent moves (migrates) freely and similar leveling agents aggregate from the evenly distributed state and produce phase separation, but by being in a half-cured state, the leveling agent B that has reactivity at least with the binder in the low refractive index layer-forming composition undergoes crosslinking reaction with the binder or leveling agent in the curing or cured low refractive index layer, thus impeding its movement (migration), whereas the leveling agent A moves (migrates) from the half-cured hard coat layer toward the surface of the low refractive index layer, allowing it to be uniformly distributed on the surface.

Therefore, when two or more different leveling agents are used in combination, the process for production of a reflective film according to the invention can reduce haze of the low refractive index layer while adequately exhibiting the properties of all the combined leveling agents (for example, leveling agents A and B). As an example of lowering haze in a mirror-surface, clear antireflection film with no irregularities on the surface, the haze can be maintained at about the same level as a transparent base material film (0.2-0.4%, measured according to JIS K-7136 using a HM-150 Hazemeter (Murakami Color Research Laboratory Co., Ltd.)), while exhibiting satisfactory anti-reflection performance or transmittance.

The process for production of an antireflection film according to the invention will now be explained in detail.

<5-1. Coating of Hard Coat Layer-Forming Composition and Preparation of Half-Cured Hard Coat Layer>

A transparent base material is coated with the hard coat layer-forming composition by bar coating or the like, and after removing the solvent by drying, an ultraviolet irradiation apparatus (light source: H bulb, product of Fusion UV Systems, Japan) is used for half-curing of the hard coat layer by ultraviolet irradiation at a dose of 10 mJ/cm$^2$.

<5-2. Coating of Low Refractive Index Layer-Forming Composition and Full Curing of Hard Coat Layer and Low Refractive Index Layer>

The half-cured hard coat layer is coated with the low refractive index layer-forming composition by bar coating or the like, and after removing the solvent by drying, an ultraviolet irradiation apparatus (light source: H bulb, product of Fusion UV Systems, Japan) is used for full curing of the hard coat layer and low refractive index layer by ultraviolet irradiation at a dose of 200 mJ/cm$^2$, to obtain an antireflection film.

The invention is not limited to the mode described above. This mode was explained merely for illustration, and any mode that has a construction essentially identical in terms of the technical concept described in the claims of the present invention and exhibits the same function and effect is also encompassed by the technical scope of the invention.

EXAMPLES

The present invention will now be explained in further detail through examples and comparative examples.

However, it is to be understood that the invention is not restricted by the examples. The "parts" referred to throughout the examples are based on weight, unless otherwise specified.

<6-1. Preparation of Low Refractive Index Layer Particles>

Production Example 1-1

Preparation of Surface-Modified Hollow Particles
(Surface-Modified Hollow Silica Fine Particles LM(1))

An isopropanol dispersion of hollow silica fine particles with a mean particle size of 50 nm (product of Catalysts & Chemicals Industrial Co., Ltd.), as hollow particles, was subjected to solvent substitution from isopropyl alcohol to methyl isobutyl ketone (hereinafter also abbreviated as MIBK) using a rotary evaporator, to obtain a 20 wt % dispersion of silica fine particles. Next, 5 wt % 3-methacryloxypropylmethyldimethoxysilane was added to 100 wt % of the methyl isobutyl ketone dispersion, and the mixture was heat treated at 50° C. for 1 hour to obtain a 20 wt % methyl isobutyl ketone dispersion of surface-treated hollow silica fine particles.

The surface-modified hollow silica fine particles LM(1) obtained in this manner were measured using a Microtrac particle size analyzer by Nikkiso Co., Ltd. and were found to have a mean particle size of d50=50 nm.

Production Example 1-2

Preparation of Surface-Modified Solid Particles (Surface-Modified Solid Silica Fine Particles LS(1))

To 100 parts by weight of a methyl isobutyl ketone dispersed silica sol with a mean particle size of 12 nm (MIBK-ST:, trade name of Nissan Chemical Industries, Ltd.: silica solid content: 20 wt %) as solid particles, there was added 5 wt % 3-methacryloxypropylmethyldimethoxysilane, and the mixture was heat treated at 50° C. for 1 hour to obtain a 20 wt % methyl isobutyl ketone dispersion of surface-treated solid silica fine particles.

The surface-modified solid silica fine particles LS(1) obtained in this manner were measured using the aforementioned particle size analyzer and were found to have a mean particle size of d50=12 nm.

Production Example 2

<6-2. Preparation of Reactive Inorganic Fine Particles A(1) for Hard Coat Layer>
(1) Removal of Surface Adsorbed Ions Water-dispersed colloidal silica with a particle size of 90 nm (SNOWTEX ZL, trade name of Nissan Chemical Industries, Ltd., pH 9-10) was subjected to ion exchange for 3 hours using 400 g of a cation-exchange resin (DIAION SK1B, product of Mitsubishi Chemical Corp.), and then 200 g of an anion exchange resin (DIAION SA20A, product of Mitsubishi Chemical Corp.) was used for 3 hours of ion exchange, followed by washing to obtain an aqueous dispersion of inorganic fine particles with a solid concentration of 20 wt %.

The $Na_2O$ content of the inorganic fine particle aqueous dispersion was 7 ppm for each inorganic fine particle.
(2) Surface Treatment (Introduction of Monofunctional Monomer)

To 10 g of the inorganic fine particle aqueous dispersion treated in (1) above there were added 150 ml of isopropanol, 4.0 g of 3,6,9-trioxadecanoic acid and 4.0 g of methacrylic acid, and the mixture was stirred for 30 minutes.

The obtained mixture was stirred while heating at 60° C. for 5 hours, to obtain an inorganic fine particle dispersion having methacryloyl groups introduced on the fine particle surfaces. Distilled water and isopropanol were distilled off from the obtained inorganic fine particle dispersion using a rotary evaporator, and methyl ethyl ketone was added to avoid drying with a final remaining water or isopropanol residue of 0.1 wt %, to obtain a silica-dispersed methyl ethyl ketone solution with a solid content of 50 wt %.

The reactive inorganic fine particles A(1) obtained in this manner were measured using the aforementioned particle size analyzer and were found to have a mean particle size of d50=90 nm. The amount of organic component covering the fine particle surfaces was $4.05 \times 10^{-3}$ $g/m^2$, as a result of measurement by thermogravimetric analysis.

Production Example 3

<6-3. Synthesis of Antistatic Agent>
In a flask equipped with a stirrer, reflux condenser, dropping funnel and nitrogen inlet tube, there were placed 50 parts of an alkyl methacrylate (mixed alkyl ester comprising dodecyl methacrylate and tridecyl methacrylate, average molecular weight: 263) (SLMA), 10 parts of methyl methacrylate (MMA), 40 parts of N,N-dimethylaminoethyl methacrylate (DMMA) and 210 parts of ethanol, with 1.2 parts of azobisisobutyronitrile as a catalyst, and reaction was conducted at 80° C. for 6 hours under a nitrogen atmosphere. Upon completion of polymerization, 80 parts of benzyl chloride was added dropwise to the obtained copolymer solution, and further reaction at 60° C. for 8 hours produced an antistatic agent containing a cationic copolymer. The number-average molecular weight of the antistatic agent measured by GPC was 2,300.

Production Example 4

<6-4-1. Preparation of Low Refractive Index Layer-Forming Composition>

A low refractive index layer-forming composition was prepared by mixing the following components.

Surface-modified hollow silica fine particles LM(1) with a mean particle size of d50=50 nm (methyl isobutyl ketone containing 20 wt % hollow silica fine particles): 15.0 parts by weight Surface-modified solid silica fine particles LS(1) with a mean particle size of d50=12 nm (methyl isobutyl ketone containing 20 wt % solid silica fine particles): 0.4 part by weight Ionizing radiation curable resin 1: Pentaerythritol triacrylate (PETA): 1.2 parts by weight Ionizing radiation curable resin 2: Dipentaerythritol hexaacrylate (DPHA): 0.4 part by weight Reactive silicon-based leveling agent: X-22-164E (trade name of Shin-Etsu Chemical Co., Ltd.): 0.15 part by weight Polymerization initiator: IRGACURE 127 (trade name of Ciba Specialty Chemicals Co., Ltd.): 0.1 part by weight Solvent: Methyl isobutyl ketone: 83.5 parts by weight Production Example 5

<6-4-2. Preparation of Low Refractive Index Layer-Forming Composition>

A low refractive index layer-forming composition was prepared by mixing the following components.

Surface-modified hollow silica fine particles LM(1) with a mean particle size of d50=50 nm (methyl isobutyl ketone containing 20 wt % hollow silica fine particles): 15.0 parts by weight Ionizing radiation curable resin 1: Pentaerythritol triacrylate (PETA): 0.68 part by weight Ionizing radiation curable resin 2: OPSTAR JM5010 (trade name of JSR: refractive index: 1.41, solid content: 10 wt %, methyl ethyl ketone solution): 15.8 parts by weight Reactive silicon-based leveling agent: X-22-164E: 0.15 part by weight Polymerization initiator: IRGACURE 127: 0.1 part by weight Solvent: Methyl isobutyl ketone: 68.5 parts by weight Production Example 6

<6-4-3. Preparation of Low Refractive Index Layer-Forming Composition>

A low refractive index layer-forming composition was prepared by mixing the following components.

Surface-modified hollow silica fine particles LM(1) with a mean particle size of d50=50 nm (methyl isobutyl ketone containing 20 wt % hollow silica fine particles): 15.0 parts by weight
Ionizing radiation curable resin 1: Pentaerythritol triacrylate (PETA): 0.68 part by weight
Ionizing radiation curable resin 2: OPSTAR JM5010: 15.8 parts by weight
Non-reactive silicon-based leveling agent: BYK-300 (trade name of Byk-Chemie Corp.): 0.15 part by weight
Polymerization initiator: IRGACURE 127: 0.1 part by weight
Solvent: Methyl isobutyl ketone: 68.5 parts by weight Production Example 7

<6-4-4. Preparation of Low Refractive Index Layer-Forming Composition>

The reactive silicon-based leveling agent components in the composition of Production Example 4 were replaced by the following to prepare a low refractive index layer-forming composition.
Surface-modified hollow silica fine particles LM(1) with a mean particle size of d50=50 nm (methyl isobutyl ketone containing 20 wt % hollow silica fine particles): 15.0 parts by weight
Surface-modified solid silica fine particles LS(1) with a mean particle size of d50=12 nm (methyl isobutyl ketone containing 20 wt % solid silica fine particles): 0.4 part by weight
Ionizing radiation curable resin 1: Pentaerythritol triacrylate (PETA): 1.2 part by weight
Ionizing radiation curable resin 2: Dipentaerythritol hexaacrylate (DPHA): 0.4 part by weight
Reactive silicon-based leveling agent: Polyether-modified silicone oil TSF4460 (trade name of Momentive Materials Performance Japan, Inc.): 0.15 part by weight
Polymerization initiator: IRGACURE 127: 0.1 part by weight
Solvent: Methyl isobutyl ketone: 83.5 parts by weight Production Example 8

<6-4-5. Preparation of Low Refractive Index Layer-Forming Composition>

The non-reactive silicon-based leveling agent components in the composition of Production Example 6 were replaced by the following to prepare a low refractive index layer-forming composition.
Surface-modified hollow silica fine particles LM(1) with a mean particle size of d50=50 nm (methyl isobutyl ketone containing 20 wt % hollow silica fine particles): 15.0 parts by weight
Ionizing radiation curable resin 1: Pentaerythritol triacrylate (PETA): 0.68 part by weight
Ionizing radiation curable resin 2: OPSTAR JM5010: 15.8 parts by weight
Non-reactive silicon-based leveling agent: FM4421 (trade name of Chisso Corp.): 0.15 part by weight
Polymerization initiator: IRGACURE 127: 0.1 part by weight
Solvent: Methyl isobutyl ketone: 68.5 parts by weight Production Example 9

<6-4-6. Preparation of Low Refractive Index Layer-Forming Composition>

The non-reactive silicon-based leveling agent components in the composition of Production Example 6 and their addition amounts were replaced by the following to prepare a low refractive index layer-forming composition.
Surface-modified hollow silica fine particles LM(1) with a mean particle size of d50=50 nm (methyl isobutyl ketone containing 20 wt % hollow silica fine particles): 15.0 parts by weight
Ionizing radiation curable resin 1: Pentaerythritol triacrylate (PETA): 0.68 part by weight
Ionizing radiation curable resin 2: OPSTAR JM5010: 15.8 parts by weight
Non-reactive fluorine-based leveling agent (MEGAFAC MCF-445 (ethylene oxide-added, trade name of Dainippon Ink and Chemicals, Inc.): 0.07 part by weight
Non-reactive silicon-based leveling agent: KF-6004 (polyether-modified, trade name of Shin-Etsu Chemical Co., Ltd.): 0.07 part by weight
Polymerization initiator: IRGACURE 127: 0.1 part by weight
Solvent: Methyl isobutyl ketone: 68.5 parts by weight Production Example 10

<6-4-7. Preparation of Low Refractive Index Layer-Forming Composition>

The reactive silicon-based leveling agent components in the composition of Production Example 4 were replaced by the following to prepare a low refractive index layer-forming composition.
Surface-modified hollow silica fine particles LM(1) with a mean particle size of d50=50 nm (methyl isobutyl ketone containing 20 wt % hollow silica fine particles): 15.0 parts by weight
Surface-modified solid silica fine particles LS(1) with a mean particle size of d50=12 nm (methyl isobutyl ketone containing 20 wt % solid silica fine particles): 0.4 part by weight
Ionizing radiation curable resin 1: Pentaerythritol triacrylate (PETA): 1.2 parts by weight
Ionizing radiation curable resin 2: Dipentaerythritol hexaacrylate (DPHA): 0.4 part by weight
Reactive fluorine-based leveling agent: OPTOOL DAC (trade name of Daikin Industries, Ltd.): 0.15 part by weight
Polymerization initiator: IRGACURE 127: 0.1 part by weight
Solvent: Methyl isobutyl ketone: 83.5 parts by weight Production Example 11

<6-4-8. Preparation of Low Refractive Index Layer-Forming Composition>

A non-reactive fluorine-based leveling agent was added to the components of Production Example 4 to prepare a low refractive index layer-forming composition.
Surface-modified hollow silica sol LM(1) with a mean particle size of d50=50 nm (methyl isobutyl ketone containing 20 wt % hollow silica fine particles): 15.0 parts by weight
Surface-modified solid silica fine particles LS(1) with a mean particle size of d50=12 nm (methyl isobutyl ketone containing 20 wt % solid silica fine particles): 0.4 part by weight
Ionizing radiation curable resin: Pentaerythritol triacrylate (PETA): 1.2 parts by weight
Ionizing radiation curable resin: Dipentaerythritol hexaacrylate (DPHA): 0.4 part by weight
Reactive silicon-based leveling agent: X-22-164E: 0.15 part by weight
Non-reactive fluorine-based leveling agent: MEGAFAC MCF-350 (trade name of Dainippon Ink and Chemicals, Inc.): 0.03 part by weight
Polymerization initiator: IRGACURE 127: 0.1 part by weight
Solvent: Methyl isobutyl ketone: 83.5 parts by weight Production Example 12

<6-4-9. Preparation of Low Refractive Index Layer-Forming Composition>

A low refractive index layer-forming composition was prepared, lacking only the reactive silicon-based leveling agent in the composition of Production Example 4.
Surface-modified hollow silica sol LM(1) with a mean particle size of d50=50 nm (methyl isobutyl ketone containing 20 wt % hollow silica fine particles): 15.0 parts by weight
Surface-modified solid silica fine particles LS(1) with a mean particle size of d50=12 nm (methyl isobutyl ketone containing 20 wt % solid silica fine particles): 0.4 part by weight
Ionizing radiation curable resin 1: Pentaerythritol triacrylate (PETA): 1.2 part by weight
Ionizing radiation curable resin 2: Dipentaerythritol hexaacrylate (DPHA): 0.4 part by weight
Polymerization initiator: IRGACURE 127: 0.1 part by weight
Solvent: Methyl isobutyl ketone: 83.5 parts by weight Production Example 13

<6-4-10. Preparation of Hard Coat Layer-Forming Composition>
A hard coat layer-forming composition was prepared by mixing the following components.
Reactive silica fine particles A (methyl isobutyl ketone containing 35 wt % solid silica fine particles): 25.0 parts by weight
Binder C: Urethane acrylate (SHIKOH UV1700-B: trade name of Nippon Synthetic Chemical Industry Co., Ltd.): 25.0 parts by weight
Non-reactive fluorine-based leveling agent: MEGAFAC MCF-350: 0.03 part by weight
Polymerization initiator: IRGACURE 184 (trade name of Ciba Specialty Chemicals Co., Ltd.): 0.2 part by weight
Solvent: Methyl ethyl ketone: 49.8 parts by weight Production Example 14

<6-4-11. Preparation of Hard Coat Layer-Forming Composition>
A hard coat layer-forming composition was prepared, lacking only the non-reactive fluorine-based leveling agent in the composition of Production Example 13.
Reactive silica fine particles A (methyl isobutyl ketone containing 35 wt % solid silica fine particles): 25.0 parts by weight
Binder C: Urethane acrylate (SHIKOH UV1700-B): 25.0 parts by weight
Polymerization initiator: IRGACURE 184: 0.2 part by weight
Solvent: Methyl ethyl ketone: 49.8 parts by weight Production Example 15

<6-4-12. Preparation of Hard Coat Layer-Forming Composition>
A reactive silicon-based leveling agent was added to the composition of Production Example 13 to prepare a hard coat layer-forming composition.
Reactive silica fine particles A (methyl isobutyl ketone containing 35 wt % solid silica fine particles): 25.0 parts by weight
Binder C: Urethane acrylate (SHIKOH UV1700-B): 25.0 parts by weight
Reactive silicon-based leveling agent: X-22-164E: 0.15 part by weight
Non-reactive fluorine-based leveling agent: MEGAFAC MCF-350: 0.03 part by weight
Polymerization initiator: IRGACURE 184: 0.2 part by weight
Solvent: Methyl ethyl ketone: 49.8 parts by weight Production Example 16

<6-4-13. Preparation of Hard Coat Layer-Forming Composition>
A hard coat layer-forming composition was prepared by mixing the following components.
Antistatic component synthesized in Production Example 3: 0.27 part by weight
Ionizing radiation curable resin 1: Pentaerythritol triacrylate (PETA): 1.3 part by weight
Ionizing radiation curable resin 2: BS577 (trade name of Arakawa Chemical Industries, Ltd.): 1.3 part by weight
Ionizing radiation curable resin 3: M9050 (trade name of ToaGosei Co., Ltd.): 2.7 parts by weight
Non-reactive fluorine-based leveling agent: MEGAFAC MCF350: 0.1 part by weight
Polymerization initiator: IRGACURE 184: 0.22 part by weight
Solvent: Methyl ethyl ketone: 17 parts by weight Production Example 17

<6-4-14. Preparation of Hard Coat Layer-Forming Composition>
A hard coat layer-forming composition was prepared, changing only the non-reactive fluorine-based leveling agent in the composition of Production Example 16.
Antistatic component synthesized in Production Example 3: 0.27 part by weight
Ionizing radiation curable resin: Pentaerythritol triacrylate (PETA): 1.3 parts by weight
Ionizing radiation curable resin: BS577: 1.3 part by weight
Ionizing radiation curable resin: M9050: 2.7 parts by weight
Non-reactive fluorine-based leveling agent: MEGAFAC 178 (trade name of Dainippon Ink and Chemicals, Inc.): 0.1 part by weight
Polymerization initiator: IRGACURE 184: 0.22 part by weight
Solvent: Methyl ethyl ketone: 17 parts by weight Production Example 18

<6-4-15. Preparation of Hard Coat Layer-Forming Composition>
A hard coat layer-forming composition was prepared, lacking only the non-reactive fluorine-based leveling agent in the composition of Production Example 16.
Antistatic component synthesized in Production Example 3: 0.27 part by weight
Ionizing radiation curable resin 1: Pentaerythritol triacrylate (PETA): 1.3 parts by weight
Ionizing radiation curable resin 2: BS577: 1.3 parts by weight
Ionizing radiation curable resin 3: M9050: 2.7 parts by weight
Polymerization initiator: IRGACURE 184: 0.22 part by weight
Solvent: Methyl ethyl ketone: 17 parts by weight Production Example 19

<6-4-16. Preparation of Hard Coat Layer-Forming Composition>
A hard coat layer-forming composition was prepared by mixing the following components.
Antistatic component synthesized in Production Example 3: 0.27 part by weight
Ionizing radiation curable resin 1: Pentaerythritol triacrylate (PETA): 1.3 parts by weight
Ionizing radiation curable resin 2: BS577: 1.3 parts by weight
Ionizing radiation curable resin 3: M9050: 2.7 parts by weight
Reactive fluorine-based leveling agent: FA-108 (trade name of Kyoeisha Chemical Co., Ltd.): 0.005 part by weight Polymerization initiator: IRGACURE 184: 0.22 part by weight
Solvent: Methyl ethyl ketone: 17 parts by weight Production Example 20

<6-4-17. Preparation of Hard Coat Layer-Forming Composition>
A hard coat layer-forming composition was prepared, changing only the non-reactive fluorinated leveling agent in the composition of Production Example 13.
Reactive silica fine particles A (methyl isobutyl ketone containing 35 wt % solid silica fine particles): 25.0 parts by weight
Binder C: Urethane acrylate (SHIKOH UV1700-B): 25.0 parts by weight
Non-reactive fluorine-based leveling agent: MEGAFAC F445 (trade name of Dainippon Ink and Chemicals, Inc.): 0.03 part by weight
Polymerization initiator: IRGACURE 184: 0.2 part by weight
Solvent: Methyl ethyl ketone: 49.8 parts by weight Production Example 21

<6-4-18. Preparation of Hard Coat Layer-Forming Composition>
A hard coat layer-forming composition was prepared, changing only the non-reactive fluorinated leveling agent in the composition of Production Example 13.
Reactive silica fine particles A (methyl isobutyl ketone containing 35 wt % solid silica fine particles): 25.0 parts by weight
Binder C: Urethane acrylate (SHIKOH UV1700-B): 25.0 parts by weight
Non-reactive silicon-based leveling agent: X-22-3710 (trade name of Shin-Etsu Chemical Co., Ltd.): 0.03 part by weight
Polymerization initiator: IRGACURE 184: 0.2 part by weight
Solvent: Methyl ethyl ketone: 49.8 parts by weight Production Example 22

<6-4-19. Preparation of Hard Coat Layer-Forming Composition>
A hard coat layer-forming composition was prepared by mixing the following components.
Ionizing radiation curable resin: Dipentaerythritol hexaacrylate (DPHA): 4 parts by weight
Methyl ethyl ketone dispersion of zirconia particles (UEP, product of Daiichi Kigenso Kagaku Kogyo Co., Ltd., primary particle size: 20-30 nm) (solid content: 40%): 10 parts by weight
Non-reactive fluorine-based leveling agent: MEGAFAC MCF-350: 0.05 part by weight
Solvent: Methyl ethyl ketone: 6 parts by weight Example 1

<6-5-1. Coating of Hard Coat Layer-Forming Composition and Preparation of Half-Cured Hard Coat Layer>
A hard coat layer-forming composition having the composition of Production Example 13 above was bar coated onto an 80 μm-thick triacetatecellulose (TAC) film (product of Fuji Film Co.), and after removing the solvent by drying, an ultraviolet irradiation apparatus (light source: H bulb, product of Fusion UV Systems, Japan) was used for ultraviolet irradiation at a dose of 10 mJ/cm$^2$, to obtain a half-cured hard coat layer.

<6-5-2. Coating of Low Refractive Index Layer-Forming Composition and Full Curing of Hard Coat Layer and Low Refractive Index Layer>
The low refractive index layer-forming composition of Production Example 4 was bar coated onto the obtained base material/half-cured hard coat layer film and dried to remove the solvent, and then the aforementioned ultraviolet irradiation apparatus was used for ultraviolet irradiation at a dose of 200 mJ/cm$^2$ to full curing of the coated film, to obtain an antireflection film having the construction: base material/hard coat layer/low refractive index layer.
The film thickness of the low refractive index layer was set so that the minimum value of the reflectance measured using a spectrophotometer by Shimadzu Corp. (UV-3100PC) was near a wavelength of 550 nm.
Since nearly all of the PETA and DPHA polymerizes, the content of solid silica particles with respect to this ionizing radiation curable resin may be considered to be essentially equal to the content of solid silica particles with respect to the ionizing radiation curable resin.

Example 2

<6-6-1. Coating of Hard Coat Layer-Forming Composition and Preparation of Half-Cured Hard Coat Layer>
A hard coat layer-forming composition having the composition of Production Example 16 above was bar coated onto an 80 μm-thick triacetatecellulose (TAC) film, and after removing the solvent by drying, the aforementioned ultraviolet irradiation apparatus was used for ultraviolet irradiation at a dose of 10 mJ/cm$^2$, to obtain a half-cured hard coat layer.
<6-6-2. Coating of Low Refractive Index Layer-Forming Composition and Full Curing of Hard Coat Layer and Low Refractive Index Layer>
The low refractive index layer-forming composition of Production Example 5 was bar coated onto the obtained base material/half-cured hard coat layer film and dried to remove the solvent, and then the aforementioned ultraviolet irradiation apparatus was used for ultraviolet irradiation at a dose of 200 mJ/cm$^2$ to full curing of the coated film, to obtain an antireflection film having the construction: base material/hard coat layer/low refractive index layer.

Example 3

<6-7-1. Coating of Hard Coat Layer-Forming Composition and Preparation of Half-Cured Hard Coat Layer>
A hard coat layer-forming composition having the composition of Production Example 22 above was bar coated onto a 100 μm-thick polyethylene terephthalate (PET) film (A2401, product of Toyobo, Ltd.), and after removing the solvent by drying, the aforementioned ultraviolet irradiation apparatus was used for ultraviolet irradiation at a dose of 10 mJ/cm$^2$, to obtain a half-cured hard coat layer.
<6-7-2. Coating of Low Refractive Index Layer-Forming Composition and Full Curing of Hard Coat Layer and Low Refractive Index Layer>
The low refractive index layer-forming composition of Production Example 5 was bar coated onto the obtained base material/half-cured hard coat layer film and dried to remove the solvent, and then the aforementioned ultraviolet irradiation apparatus was used for ultraviolet irradiation at a dose of 200 mJ/cm$^2$ to full curing of the coated film, to obtain an antireflection film having the construction: base material/hard coat layer/low refractive index layer.

Example 4

<6-8-1. Coating of Hard Coat Layer-Forming Composition and Preparation of Half-Cured Hard Coat Layer>
A hard coat layer-forming composition having the composition of Production Example 20 above was bar coated onto an 80 µm-thick triacetatecellulose (TAC) film, and after removing the solvent by drying, the aforementioned ultraviolet irradiation apparatus was used for ultraviolet irradiation at a dose of 10 mJ/cm², to obtain a half-cured hard coat layer.
<6-8-2. Coating of Low Refractive Index Layer-Forming Composition and Full Curing of Hard Coat Layer and Low Refractive Index Layer>
The low refractive index layer-forming composition of Production Example 7 was bar coated onto the obtained base material/half-cured hard coat layer film and dried to remove the solvent, and then the aforementioned ultraviolet irradiation apparatus was used for ultraviolet irradiation at a dose of 200 mJ/cm² to full curing of the coated film, to obtain an antireflection film having the construction: base material/hard coat layer/low refractive index layer.

Example 5

<6-9-1. Coating of Antistatic Hard Coat Layer-Forming Composition and Preparation of Half-Cured Hard Coat Layer>
An antistatic hard coat layer-forming composition having the composition of Production Example 16 above was bar coated onto an 80 µm-thick triacetatecellulose (TAC) film, and after removing the solvent by drying, the aforementioned ultraviolet irradiation apparatus was used for ultraviolet irradiation at a dose of 10 mJ/cm², to obtain a half-cured antistatic hard coat layer. The film thickness of the obtained antistatic hard coat layer was 3 µm.
<6-9-2. Additional Coating of Hard Coat Layer-Forming Composition and Preparation of Half-Cured Hard Coat Layer>
The hard coat layer-forming composition of Production Example 13 was bar coated onto the obtained base material/antistatic hard coat layer film and dried to remove the solvent, and then the aforementioned ultraviolet irradiation apparatus was used for ultraviolet irradiation at a dose of 10 mJ/cm² for further half-curing of the coated film, to obtain the construction: base material/antistatic hard coat layer/hard coat layer film. The total film thickness of the obtained two-layer hard coat layer was 18 µm.
<6-9-3. Coating of Low Refractive Index Layer-Forming Composition and Full Curing of Two-Layer Hard Coat Layer and Low Refractive Index Layer>
The low refractive index layer-forming composition of Production Example 4 was bar coated onto the obtained base material/half-cured antistatic hard coat layer/half-cured hard coat layer film and dried to remove the solvent, and then the aforementioned ultraviolet irradiation apparatus was used for ultraviolet irradiation at a dose of 200 mJ/cm² to full curing of the coated film, to obtain an antireflection film having the construction: base material/antistatic hard coat layer/hard coat layer/low refractive index layer. The film thickness of the obtained low refractive index layer was 0.1 µm.
Even with two hard coat layers, the overall performance was satisfactory with no opacity, similar to a single layer.

Comparative Example 1

<6-10-1. Coating of Hard Coat Layer-Forming Composition and Formation of Fully-Cured Hard Coat Layer>
A hard coat layer-forming composition having the composition of Production Example 13 above was bar coated onto an 80 µm-thick triacetatecellulose (TAC) film, and after removing the solvent by drying, the aforementioned ultraviolet irradiation apparatus was used for ultraviolet irradiation at a dose of 200 mJ/cm², to obtain a fully-cured hard coat layer.

<6-10-2. Coating of Low Refractive Index Layer-Forming Composition and Full Curing of Low Refractive Index Layer>
The low refractive index layer-forming composition of Production Example 4 was bar coated onto the obtained base material/fully-cured hard coat layer film and dried to remove the solvent, and then the aforementioned ultraviolet irradiation apparatus was used for ultraviolet irradiation at a dose of 200 mJ/cm² to full curing of the low refractive index layer-forming composition, to obtain an antireflection film having the construction: base material/hard coat layer/low refractive index layer.
Since the hard coat layer was fully cured, the non-reactive fluorine-based leveling agent could not migrate and the fingerprint wiping was reduced.

Comparative Example 2

<6-11-1. Coating of Hard Coat Layer-Forming Composition and Preparation of Half-Cured Hard Coat Layer>
A hard coat layer-forming composition having the composition of Production Example 15 above was bar coated onto an 80 µm-thick triacetatecellulose (TAC) film, and after removing the solvent by drying, the aforementioned ultraviolet irradiation apparatus was used for ultraviolet irradiation at a dose of 10 mJ/cm², to obtain a half-cured hard coat layer.
<6-11-2. Coating of Low Refractive Index Layer-Forming Composition and Full Curing of Hard Coat Layer and Low Refractive Index Layer>
The low refractive index layer-forming composition of Production Example 12 was bar coated onto the obtained base material/half-cured hard coat layer film and dried to remove the solvent, and then the aforementioned ultraviolet irradiation apparatus was used for ultraviolet irradiation at a dose of 200 mJ/cm² to full curing of the coated film, to obtain an antireflection film having the construction: base material/hard coat layer/low refractive index layer.
Since the reactive silicon-based leveling agent was present in the hard coat layer, it could not migrate into the surface of the low refractive index layer and the fingerprint wiping, mar-proofness and antifouling property were reduced.

Comparative Example 3

<6-12-1. Coating of Hard Coat Layer-Forming Composition and Preparation of Half-Cured Hard Coat Layer>
A hard coat layer-forming composition having the composition of Production Example 14 above was bar coated onto an 80 µm-thick triacetatecellulose (TAC) film, and after removing the solvent by drying, the aforementioned ultraviolet irradiation apparatus was used for ultraviolet irradiation at a dose of 10 mJ/cm², to obtain a half-cured hard coat layer.
<6-12-2. Coating of Low Refractive Index Layer-Forming Composition and Full Curing of Hard Coat Layer and Low Refractive Index Layer>
The low refractive index layer-forming composition of Production Example 11 was bar coated onto the obtained base material/half-cured hard coat layer film and dried to remove the solvent, and then the aforementioned ultraviolet irradiation apparatus was used for ultraviolet irradiation at a dose of 200 mJ/cm² to full curing of the coated film, to obtain an antireflection film having the construction: base material/hard coat layer/low refractive index layer.
Since the non-reactive fluorine-based leveling agent and reactive silicon-based leveling agent were both present in the low refractive index layer, they were not uniformly distributed at the surface, and therefore the overall performance was reduced and opacity was exhibited due to lack of compatibility.

Comparative Example 4

<6-13-1. Coating of Hard Coat Layer-Forming Composition and Formation of Half-Cured Hard Coat Layer>

A hard coat layer-forming composition having the composition of Production Example 17 above was bar coated onto an 80 μm-thick triacetatecellulose (TAC) film, and after removing the solvent by drying, the aforementioned ultraviolet irradiation apparatus was used for ultraviolet irradiation at a dose of 10 mJ/cm², to obtain a half-cured hard coat layer.

<6-13-2. Coating of Low Refractive Index Layer-Forming Composition and Full Curing of Low Refractive Index Layer>

The low refractive index layer-forming composition of Production Example 6 was bar coated onto the obtained base material/half-cured hard coat layer film and dried to remove the solvent, and then the aforementioned ultraviolet irradiation apparatus was used for ultraviolet irradiation at a dose of 200 mJ/cm² to full curing of the low refractive index layer-forming composition, to obtain an antireflection film having the construction: base material/hard coat layer/low refractive index layer. Because the silicon-based leveling agent in the low refractive index layer was non-reactive, the two different leveling agents could not be uniformly distributed at the surface, the overall performance was reduced, and opacity was exhibited due to lack of compatibility with the migrating non-reactive F-type leveling agent.

Comparative Example 5

<6-14-1. Coating of Hard Coat Layer-Forming Composition and Formation of Half-Cured Hard Coat Layer>

A hard coat layer-forming composition having the composition of Production Example 19 above was bar coated onto an 80 μm-thick triacetatecellulose (TAC) film, and after removing the solvent by drying, the aforementioned ultraviolet irradiation apparatus was used for ultraviolet irradiation at a dose of 10 mJ/cm², to obtain a half-cured hard coat layer.

<6-14-2. Coating of Low Refractive Index Layer-Forming Composition and Full Curing of Low Refractive Index Layer>

The low refractive index layer-forming composition of Production Example 8 was bar coated onto the obtained base material/half-cured hard coat layer film and dried to remove the solvent, and then the aforementioned ultraviolet irradiation apparatus was used for ultraviolet irradiation at a dose of 200 mJ/cm² to full curing of the low refractive index layer-forming composition, to obtain an antireflection film having the construction: base material/hard coat layer/low refractive index layer. Since the reactive fluorine-based leveling agent was present in the hard coat, the fluorine-based leveling agent could not migrate into the low refractive index layer surface and the fingerprint wiping was reduced.

Comparative Example 6

<6-15-1. Coating of Hard Coat Layer-Forming Composition and Formation of Half-Cured Hard Coat Layer>

A hard coat layer-forming composition having the composition of Production Example 18 above was bar coated onto an 80 μm-thick triacetatecellulose (TAC) film, and after removing the solvent by drying, the aforementioned ultraviolet irradiation apparatus was used for ultraviolet irradiation at a dose of 10 mJ/cm², to obtain a half-cured hard coat layer.

<6-15-2. Coating of Low Refractive Index Layer-Forming Composition and Full Curing of Low Refractive Index Layer>

The low refractive index layer-forming composition of Production Example 9 was bar coated onto the obtained base material/half-cured hard coat layer film and dried to remove the solvent, and then the aforementioned ultraviolet irradiation apparatus was used for ultraviolet irradiation at a dose of 200 mJ/cm² to full curing of the low refractive index layer-forming composition, to obtain an antireflection film having the construction: base material/hard coat layer/low refractive index layer. Since the non-reactive fluorine-based leveling agent and reactive silicon-based leveling agent were present in the low refractive index layer, only the silicon-based leveling agent readily entered the surface, resulting in a non-uniform condition and reduced fingerprint wiping. No opacity was exhibited, due to compatibility between the two different leveling agents.

Comparative Example 7

<6-16-1. Coating of Hard Coat Layer-Forming Composition and Formation of Half-Cured Hard Coat Layer>

A hard coat layer-forming composition having the composition of Production Example 21 above was bar coated onto an 80 μm-thick triacetatecellulose (TAC) film, and after removing the solvent by drying, the aforementioned ultraviolet irradiation apparatus was used for ultraviolet irradiation at a dose of 10 mJ/cm², to obtain a half-cured hard coat layer.

<6-16-2. Coating of Low Refractive Index Layer-Forming Composition and Full Curing of Low Refractive Index Layer>

The low refractive index layer-forming composition of Production Example 10 was bar coated onto the obtained base material/half-cured hard coat layer film and dried to remove the solvent, and then the aforementioned ultraviolet irradiation apparatus was used for ultraviolet irradiation at a dose of 200 mJ/cm² to full curing of the low refractive index layer-forming composition, to obtain an antireflection film having the construction: base material/hard coat layer/low refractive index layer.

Since the non-reactive silicon-based leveling agent was present in the hard coat layer and the reactive fluorine-based leveling agent was present in the low refractive index layer, the fluorine-based leveling agent crosslinked with the binder, thus further preventing it from entering the surface, and therefore only the silicon-based leveling agent migrated into the low refractive index layer surface from the hard coat layer; this was assumed to be the cause of the reduced fingerprint wiping.

<6-17-1. Rubfastness Evaluation Test (Steel Wool Resistance)>

The obtained antireflection film was rubbed 20 times using #0000 steel wool under a 200 g weight, and the presence of scratches was visually examined. The evaluation was made on the following scale.

⊚: Absolutely no scratch found.
○: Fine scratches (no more than five) found.
Δ: Notable scratches, but no peeling.
x: Peeling.

<6-17-2. Antifouling Property Evaluation Test>

An oil-based ink marker was used to draw on the obtained antireflection film surface, and the condition after wiping with a BENCOT M-3 by Asahi Kasei Corp. was observed. The evaluation was made on the following scale.

⊚: Ink repelled and easily wiped off.
○: Ink repelled, and wiped off with strong rubbing.
Δ: Portion of ink remained without being wiped off.
x: Ink could not be wiped off.

(6-17-3. Fingerprint Wiping Test)

A fingerprint on the obtained antireflection film surface was rubbed off using a BENCOT M-3 by Asahi Kasei Corp., and the ease of removal was visually judged. The evaluation was made on the following scale.

○: Fingerprint completely removed.
Δ: Fingerprint removed but with remaining trace, or trace removed but with initial smearing of fingerprint.
x: Fingerprint not removed.

(6-17-4. Opacity Evaluation Test)

The following evaluation was conducted to determine whether the obtained antireflection film lacked opacity and had satisfactory transparency. An optical pressure-sensitive adhesive (for example, an acrylic pressure-sensitive adhesive for an optical film, such as DA-1000 by Hitachi Chemical Co., Ltd.) was affixed to a black acrylic sheet, and the following samples were prepared.

Reference sample: Black acrylic sheet/optical pressure-sensitive/transparent base material film Evaluation samples: Black acrylic sheet/optical pressure-sensitive/transparent base material film/hard coat/low refractive index layers (antireflection films prepared in examples and comparative examples)

The samples prepared in the examples and comparative examples were used as the evaluation samples, and visually observed together with the reference sample, evaluating whether whiteness was increased compared to the base material alone.

When the haze of the examples and comparative examples was measured according to JIS K-7136 using a Hazemeter HM-150 (Murakami Color Research Laboratory Co., Ltd.), the samples without opacity in the opacity evaluation test were found to have hazes of 0.2-0.4%, whereas those with opacity had hazes of as high as 0.9% in Comparative Example 3 and 0.7% in Comparative Example 4, concurring with the visual examination that they were unusable as products.

The evaluation results for the four tests described above are shown in Table 1. Table 2 shows the relationship between the antireflection films of the examples and comparative examples and the methods of forming the hard coat layers and low refractive index layers in each of the examples.

TABLE 1

|  | Fingerprint wiping | Steel wool resistance | Opacity | Antifouling property |
|---|---|---|---|---|
| Example 1 | ○ | ⊚ | None | ⊚ |
| Comp. Example 1 | X | ○ | None | ○ |
| Comp. Example 2 | X | Δ | None | X |
| Comp. Example 3 | X | X | Opacity | Δ |
| Example 2 | ○ | ⊚ | None | ⊚ |
| Example 3 | ○ | ⊚ | None | ⊚ |
| Example 4 | ○ | ⊚ | None | ⊚ |
| Example 5 | ○ | ⊚ | None | ⊚ |
| Comp. Example 4 | X | X | Opacity | Δ |
| Comp. Example 5 | X | ○ | None | ○ |
| Comp. Example 6 | Δ | ○ | None | ○ |
| Comp. Example 7 | X | ○ | None | ○ |

TABLE 2

|  | Hard coat layer production process | Low refractive index layer production process |
|---|---|---|
| Example 1 | Production Example 13 | Production Example 4 |
| Comp. Example 1 | Production Example 13 | Production Example 4 |
| Comp. Example 2 | Production Example 15 | Production Example 12 |
| Comp. Example 3 | Production Example 14 | Production Example 11 |
| Example 2 | Production Example 16 | Production Example 5 |
| Example 3 | Production Example 22 | Production Example 5 |
| Example 4 | Production Example 20 | Production Example 7 |
| Example 5 | Production Example 16, Production Example 13 | Production Example 4 |
| Comp. Example 4 | Production Example 17 | Production Example 6 |
| Comp. Example 5 | Production Example 19 | Production Example 8 |
| Comp. Example 6 | Production Example 18 | Production Example 9 |
| Comp. Example 7 | Production Example 21 | Production Example 10 |

Reference Example

The construction of an antireflection film according to the invention and a process for its production are shown schematically in FIG. 4 and FIG. 5. FIG. 4 shows, at left, the half-cured state of a base material/half-cured hard coat layer film that has been half-cured after coating the hard coat layer-forming composition on the transparent base material. The leveling agent A (indicated by circles) is uniformly distributed in the hard coat layer. At the right there is shown the base material/half-cured hard coat layer/low refractive index layer film state obtained by coating the base material/half-cured hard coat layer film with the low refractive index layer. In this drawing, the leveling agent A in the half-cured hard coat layer begins to migrate toward the top of the drawing (i.e., the interface with the air). As it migrates, the concentration of the leveling agent A is reduced in the base material while it is increased in the low refractive index layer, thus producing a concentration gradation in the layer. The leveling agent B (indicated by triangles) is uniformly distributed in the low refractive index layer.

FIG. 5 shows, at left, the fully curing state of the base material/half-cured hard coat layer/low refractive index layer film. This drawing depicts migration of the leveling agent A from the hard coat layer which is in a half-cured state into the low refractive index layer. Leveling agent B simultaneously undergoes crosslinking with the binder in the low refractive index layer while the non-crosslinked portions begin to migrate toward the surface of the low refractive index layer. Leveling agent B becomes concentrated at the surface, but because of the portions that have undergone crosslinking and are unable to migrate, the concentration of leveling agent B does not increase further after a fixed amount has migrated to the surface. At right there is shown the fully cured state of the base material/fully cured hard coat layer/low refractive index layer film. Leveling agent A passes through the gaps of the crosslinked sections of leveling agent B, and migrates into the low refractive index layer and even to the surface. Thus, leveling agent A permeates to the surface of the low refractive index layer together with leveling agent B that is already present there, thus forming a cured migration layer in which leveling agents A and B are uniformly distributed. The surface of the low refractive index layer is imparted with the performance of the leveling agents A and B, and therefore exhibits an antifouling property, fingerprint wiping and marproofness.

The construction of an antireflection film according to an example of the prior art and a process for its production are shown schematically in FIG. 6. FIG. 6 shows, at left, a state when a composition for formation of a functional layer (for example, a hard coat layer) on a transparent base material has been half-cured and a low refractive index layer composition coated thereover. The leveling agent A (indicated by circles) and leveling agent B (indicated by triangles) are essentially uniformly distributed in the low refractive index layer. At right there is shown the fully cured state of the base material/functional layer/low refractive index layer film. In the drawing, both leveling agents A and B have migrated toward the interface with air (i.e., top of the drawing), and the concentration of the leveling agents is reduced in the base material while being increased at the interface with air, thus producing a concentration gradation in the layer. Since silicon has the property of more readily appearing at the surface of the low refractive index layer than fluorine during curing, although the reason for this is unclear, migration of the leveling agent B (reactive silicon leveling agent) occurs more easily than the leveling agent A (non-reactive F-based leveling agent), and therefore the surface has a higher concentration of leveling agent B. Consequently, leveling agent A does not appear as readily at the surface, and it is essentially leveling agent B alone that is present at the surface of the low refractive index layer. Therefore, instead of exhibiting the performance of both leveling agents A and B at the surface of the low refractive index layer, only the performance of one leveling agent (that is, leveling agent B) is exhibited, such that all of the properties including antifouling property, fingerprint wiping and mar-proofness cannot be expected.

BRIEF DESCRIPTION OF THE DRAWINGS

FIG. 6 is a schematic view of the construction of an antireflection film according to an example of the prior art and a process for its production.

EXPLANATION OF SYMBOLS

Figure 1:
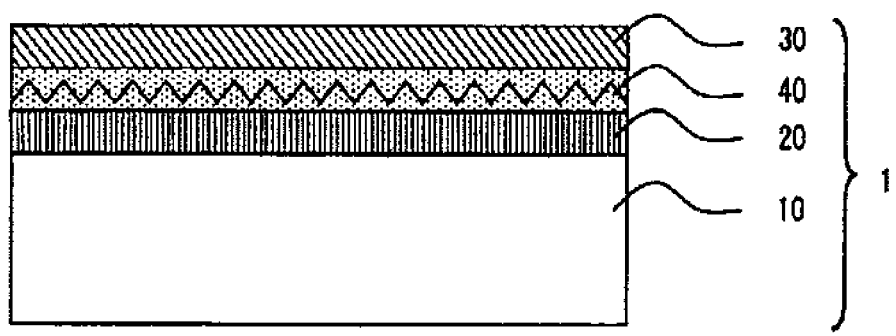
FIG. 1 is a schematic view of an example of the cross-section of an antireflection film according to the invention.
Figure 2:
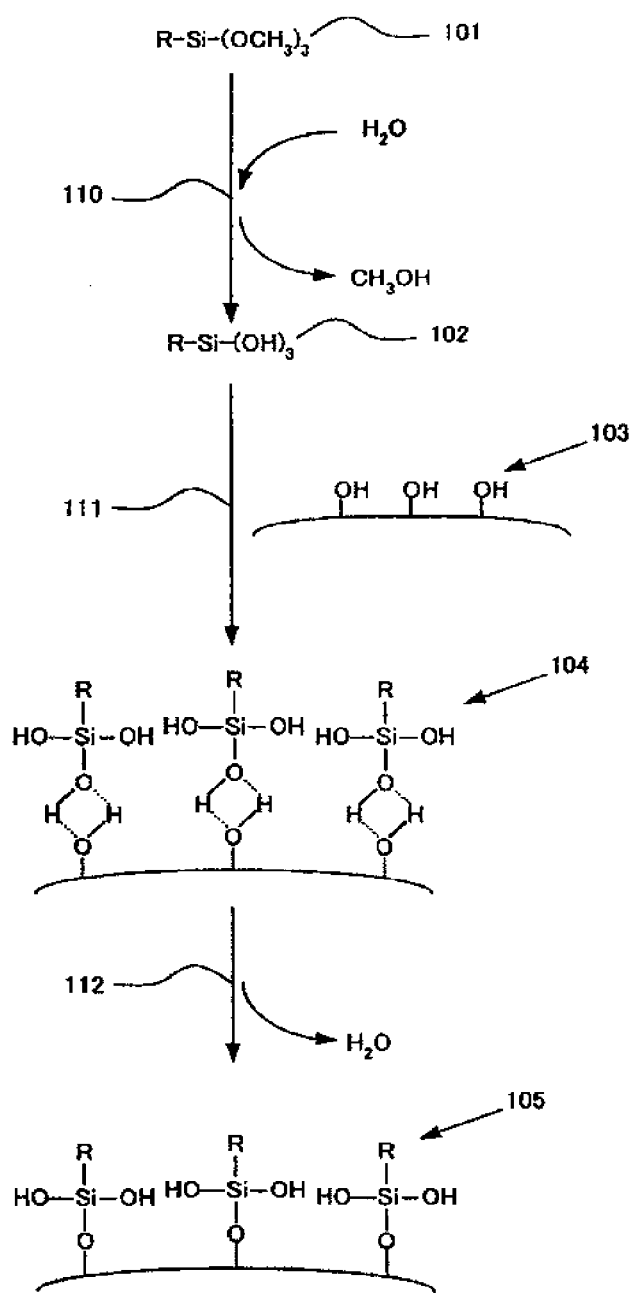
FIG. 2 is a schematic view of the mechanism for modification of particle surfaces by crosslink-forming groups according to the invention.
Figure 3:
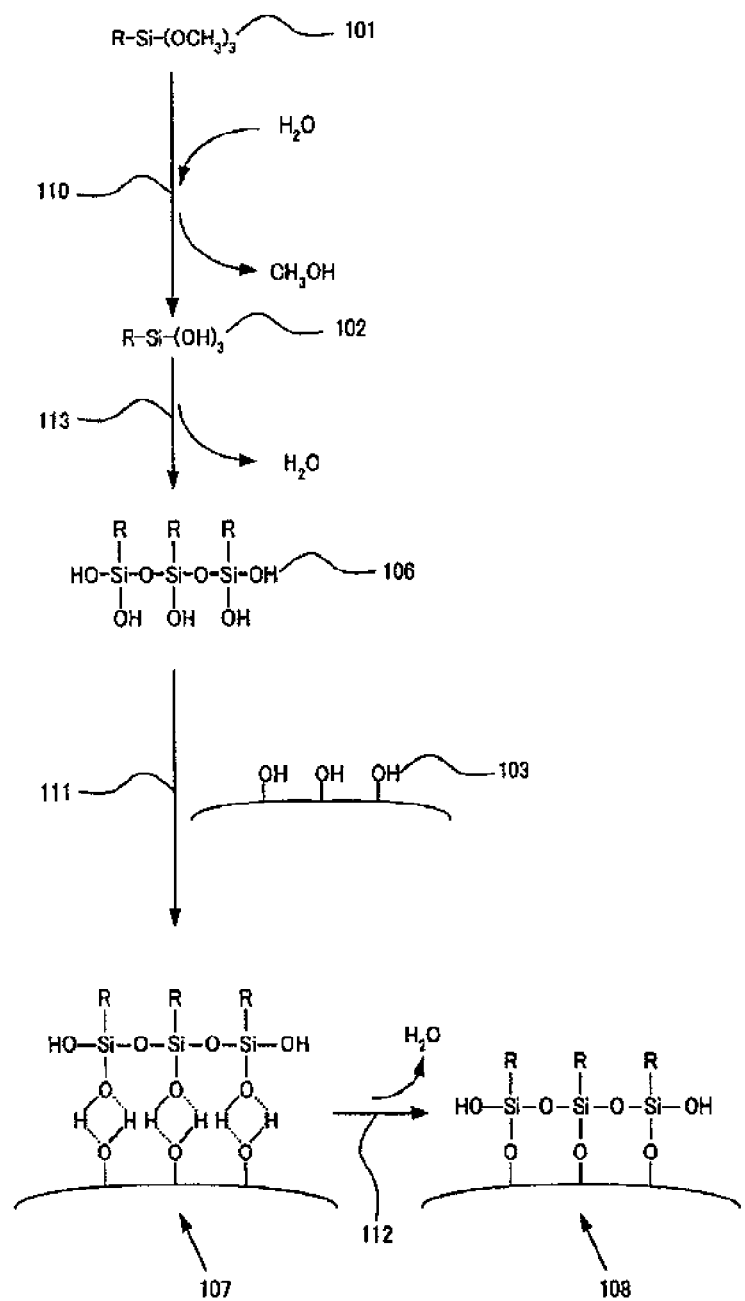
FIG. 3 is a schematic view of another mechanism for modification of particle surfaces by crosslink-forming groups according to the invention.
Figure 4:
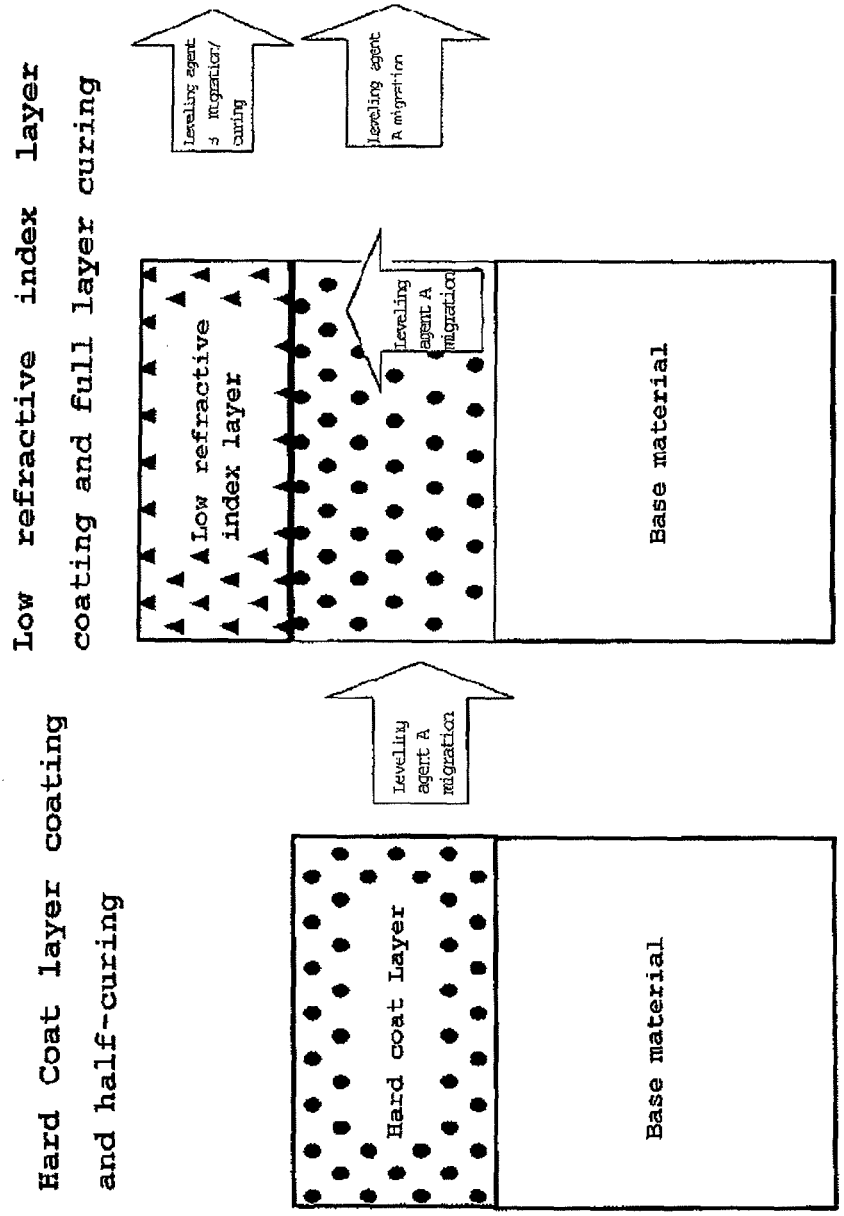
FIG. 4 is a schematic view of the construction of an antireflection film according to the invention and a process for its production (base material/half-cured hard coat layer/low refractive index layer film and its formation).
Figure 5:
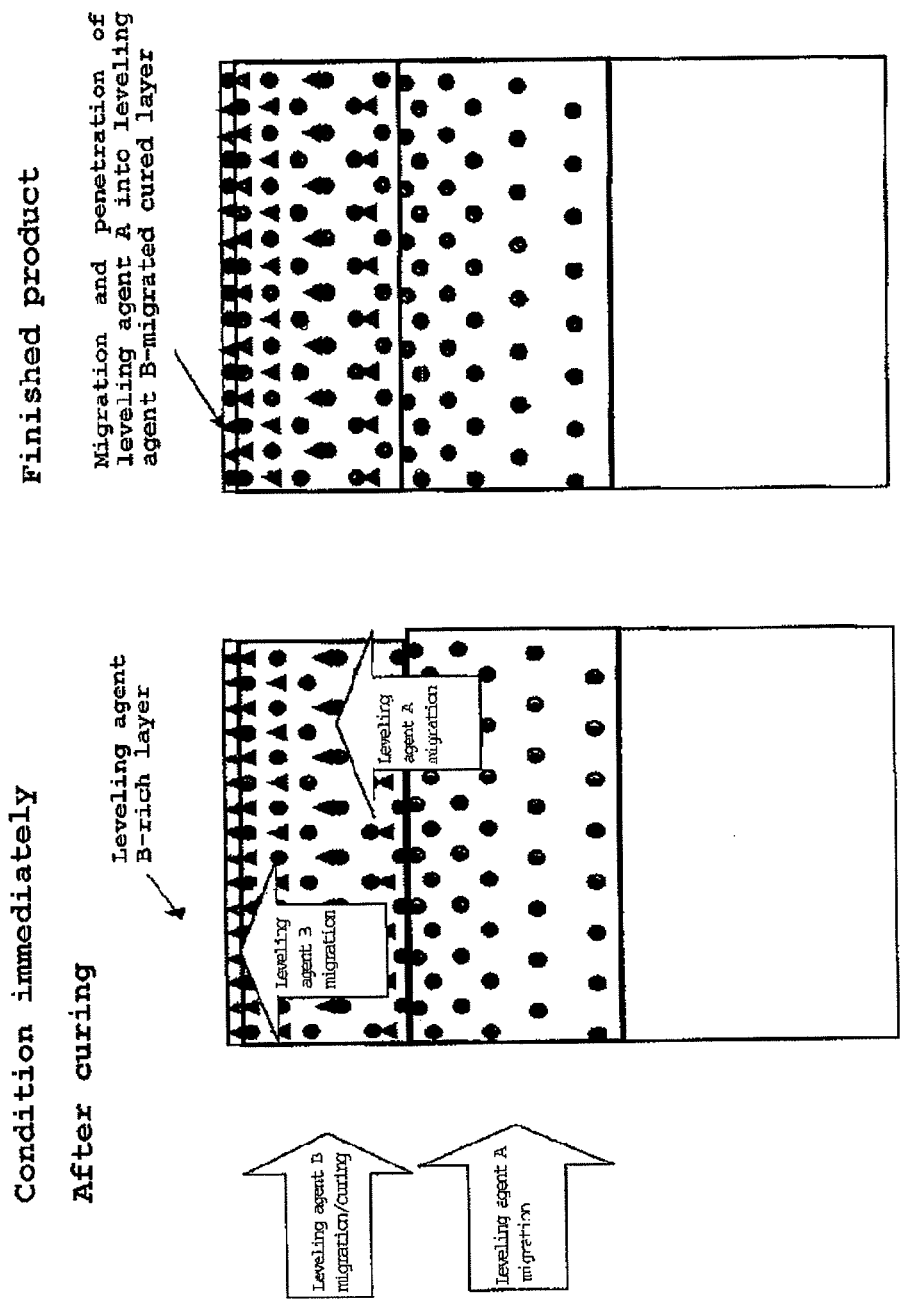
FIG. 5 is a schematic view of the construction of an antireflection film according to the invention and a process for its production (base material/fully-cured hard coat layer/low refractive index layer film and its formation).

| | |
|---|---|
| 1 | Antireflection film |
| 10 | Transparent base material |
| 20 | Hard coat layer |
| 30 | Low refractive index layer |
| 40 | Migration layer |

What is claimed is:

1. A process for production of an antireflection film comprising at least one functional layer and a low refractive index layer laminated in that order on a transparent base material, the process comprising:
    coating the transparent base material or a preformed functional layer with a functional layer-forming composition comprising a leveling agent A containing neither functional groups that react under ionizing radiation nor polar groups that react under heat, and a binder; half-curing it to form a functional layer;
    further coating the half-cured functional layer with a low refractive index layer-forming composition containing a binder and a leveling agent B which is reactive at least with the binder; and
    then completing the curing to form the low refractive index layer.

2. A process for production of an antireflection film according to claim 1, wherein the leveling agent A migrates to the surface of the low refractive index layer so that the leveling agent A and the leveling agent B are uniformly distributed on the surface of the low refractive index layer.

3. A process for production of an antireflection film according to claim 2, wherein the leveling agent A is a non-reactive fluorine-based leveling agent and the leveling agent B is a reactive silicon-based leveling agent.

* * * * *